United States Patent
Ginn

(10) Patent No.: US 12,472,069 B2
(45) Date of Patent: Nov. 18, 2025

(54) METHODS FOR SACROILIAC JOINT STABILIZATION

(71) Applicant: Tenon Medical, Inc., Los Gatos, CA (US)

(72) Inventor: Richard S Ginn, Gilroy, CA (US)

(73) Assignee: Tenon Medical, Inc., Los Gatos, CA (US)

( * ) Notice: Subject to any disclaimer, the term of this patent is extended or adjusted under 35 U.S.C. 154(b) by 863 days.

(21) Appl. No.: 17/740,568

(22) Filed: May 10, 2022

(65) Prior Publication Data

US 2022/0273447 A1     Sep. 1, 2022

Related U.S. Application Data

(63) Continuation-in-part of application No. 17/463,779, filed on Sep. 1, 2021, now Pat. No. 12,427,027, which
(Continued)

(51) Int. Cl.
    *A61F 2/30*           (2006.01)
    *A61B 5/055*        (2006.01)
    (Continued)

(52) U.S. Cl.
CPC .......... *A61F 2/30988* (2013.01); *A61B 5/055* (2013.01); *A61B 5/062* (2013.01); *A61B 6/032* (2013.01); *A61B 6/485* (2013.01); *A61B 8/0841* (2013.01); *A61B 17/1604* (2013.01); *A61B 17/1664* (2013.01); *A61B 17/1671* (2013.01); *A61B 17/70* (2013.01); *A61B 17/7055* (2013.01); *A61B 17/7074* (2013.01); *A61B 17/8858* (2013.01); *A61B 34/20* (2016.02); *A61F 2/4455* (2013.01); *A61F 2/4601* (2013.01); *A61F 2/4611* (2013.01); *A61B 2576/00* (2013.01); *A61F 2002/30121* (2013.01); *A61F 2002/30123* (2013.01); *A61F 2002/30166* (2013.01); *A61F 2002/30593* (2013.01); *A61F 2002/30995* (2013.01)

(58) Field of Classification Search
CPC ......... A61F 2/4455; A61F 2002/30995; A61B 17/1671; A61B 17/1757
See application file for complete search history.

(56) References Cited

U.S. PATENT DOCUMENTS

| | | | | |
|---|---|---|---|---|
| 4,444,181 A | * | 4/1984 | Wevers | A61B 17/8019 606/75 |
| 4,501,269 A | * | 2/1985 | Bagby | A61D 1/00 606/279 |

(Continued)

*Primary Examiner* — Lynnsy M Summitt
(74) *Attorney, Agent, or Firm* — Francis Law Group

(57) ABSTRACT

Methods are described for conducting minimally invasive medical interventions utilizing instruments and assemblies thereof to stabilize and/or fixate a dysfunctional sacroiliac (SI) joint. In one embodiment, a drill assembly is advanced from a posterior approach into the SI joint to create a pilot SI joint opening, portions of which being disposed in the sacrum and ilium bone structures. After the pilot SI joint opening is created, a SI joint prosthesis is inserted into the pilot SI joint opening, wherein the SI joint prosthesis is positioned in the dysfunctional SI joint at a distance of at least 3.0 mm away from the SI joint dorsal recess.

34 Claims, 38 Drawing Sheets

Related U.S. Application Data is a continuation-in-part of application No. 13/857,977, filed on Apr. 5, 2013, now Pat. No. 11,273,042, which is a continuation of application No. 13/192,289, filed on Jul. 27, 2011, now abandoned.

(60) Provisional application No. 61/368,233, filed on Jul. 27, 2010.

(51) Int. Cl.
*A61B 5/06* (2006.01)
*A61B 6/00* (2006.01)
*A61B 6/03* (2006.01)
*A61B 8/08* (2006.01)
*A61B 17/16* (2006.01)
*A61B 17/70* (2006.01)
*A61B 17/88* (2006.01)
*A61B 34/20* (2016.01)
*A61F 2/44* (2006.01)
*A61F 2/46* (2006.01)

(56) References Cited

U.S. PATENT DOCUMENTS

| | | | | |
|---|---|---|---|---|
| 4,570,623 A * | 2/1986 | Ellison | A61B 17/68 606/75 |
| 4,714,469 A * | 12/1987 | Kenna | A61F 2/4611 606/247 |
| 4,834,757 A * | 5/1989 | Brantigan | A61F 2/42 623/17.11 |
| 4,946,378 A * | 8/1990 | Hirayama | A61F 2/442 606/247 |
| 5,390,683 A * | 2/1995 | Pisharodi | A61F 2/4455 606/279 |
| 5,397,364 A * | 3/1995 | Kozak | A61B 17/025 606/247 |
| 5,425,772 A * | 6/1995 | Brantigan | A61F 2/447 606/247 |
| 5,445,639 A * | 8/1995 | Kuslich | A61B 17/1671 606/180 |
| 5,449,359 A * | 9/1995 | Groiso | A61B 17/8872 411/460 |
| 5,454,814 A * | 10/1995 | Comte | A61B 17/0642 606/75 |
| 5,458,638 A * | 10/1995 | Kuslich | A61F 2/446 606/907 |
| 5,522,899 A * | 6/1996 | Michelson | A61F 2/4455 606/279 |
| 5,593,409 A * | 1/1997 | Michelson | A61F 2/4611 606/247 |
| 5,609,636 A * | 3/1997 | Kohrs | A61F 2/4455 606/279 |
| 5,669,909 A * | 9/1997 | Zdeblick | A61F 2/4455 606/247 |
| 5,683,394 A * | 11/1997 | Rinner | A61F 2/4455 606/279 |
| 5,779,707 A * | 7/1998 | Bertholet | A61B 17/8625 606/301 |
| 5,888,223 A * | 3/1999 | Bray, Jr. | A61F 2/4611 606/247 |
| 5,904,719 A * | 5/1999 | Errico | A61F 2/446 623/17.16 |
| 5,928,239 A * | 7/1999 | Mirza | A61B 17/1668 606/167 |
| 5,968,098 A * | 10/1999 | Winslow | A61F 2/446 606/248 |
| 6,045,579 A * | 4/2000 | Hochshuler | A61F 2/4455 606/247 |
| 6,053,916 A * | 4/2000 | Moore | A61F 2/30988 606/86 R |
| 6,059,787 A * | 5/2000 | Allen | A61B 17/0642 606/75 |
| 6,096,080 A * | 8/2000 | Nicholson | A61F 2/28 623/17.16 |
| 6,123,705 A * | 9/2000 | Michelson | A61B 17/1671 623/17.16 |
| 6,143,031 A * | 11/2000 | Knothe | A61F 2/4455 606/247 |
| 6,165,219 A * | 12/2000 | Kohrs | A61F 2/446 623/17.11 |
| 6,197,037 B1 * | 3/2001 | Hair | A61B 17/688 606/151 |
| 6,224,631 B1 * | 5/2001 | Kohrs | A61F 2/446 623/17.11 |
| 6,245,072 B1 * | 6/2001 | Zdeblick | A61B 1/3135 623/17.11 |
| 6,336,928 B1 * | 1/2002 | Guerin | A61B 17/7059 606/299 |
| 6,371,987 B1 * | 4/2002 | Weiland | A61F 2/4455 623/17.11 |
| 6,383,221 B1 * | 5/2002 | Scarborough | A61F 2/30771 623/901 |
| 6,413,278 B1 * | 7/2002 | Marchosky | A61B 17/1671 623/17.11 |
| 6,436,139 B1 * | 8/2002 | Shapiro | A61F 2/446 623/17.11 |
| 6,440,170 B1 * | 8/2002 | Jackson | A61F 2/4611 606/247 |
| 6,497,707 B1 * | 12/2002 | Bowman | A61B 17/0401 606/218 |
| 6,613,091 B1 * | 9/2003 | Zdeblick | A61L 31/047 623/17.11 |
| 6,641,613 B2 * | 11/2003 | Sennett | A61B 17/1757 623/17.11 |
| 6,666,888 B1 * | 12/2003 | Jackson | A61F 2/446 623/17.11 |
| 6,723,126 B1 * | 4/2004 | Berry | A61F 2/4455 606/247 |
| 6,743,256 B2 * | 6/2004 | Mason | A61F 2/447 623/17.11 |
| 6,743,257 B2 * | 6/2004 | Castro | A61F 2/442 623/17.16 |
| 6,746,451 B2 * | 6/2004 | Middleton | A61B 17/1664 606/180 |
| 6,761,738 B1 * | 7/2004 | Boyd | A61F 2/4455 623/17.11 |
| 6,767,367 B1 * | 7/2004 | Michelson | A61F 2/447 623/17.11 |
| 6,800,093 B2 * | 10/2004 | Nicholson | A61B 17/1757 623/23.5 |
| 6,835,208 B2 * | 12/2004 | Marchosky | A61F 2/4455 623/17.11 |
| D503,801 S * | 4/2005 | Jackson | D24/155 |
| 6,942,698 B1 * | 9/2005 | Jackson | A61F 2/4611 606/279 |
| 6,984,245 B2 * | 1/2006 | McGahan | A61F 2/4465 623/17.11 |
| 7,201,775 B2 * | 4/2007 | Gorensek | A61F 2/446 623/17.11 |
| 7,235,101 B2 * | 6/2007 | Berry | A61F 2/4455 623/17.14 |
| 7,291,170 B2 * | 11/2007 | Huppert | A61F 2/4455 623/17.11 |
| 7,326,251 B2 * | 2/2008 | McCombe | A61F 2/447 623/17.16 |
| 7,452,369 B2 * | 11/2008 | Barry | A61F 2/4405 606/279 |
| 7,591,852 B2 * | 9/2009 | Prosser | A61F 2/4611 623/17.11 |
| 7,648,509 B2 * | 1/2010 | Stark | A61F 2/4601 606/90 |
| 7,708,761 B2 * | 5/2010 | Petersen | A61L 27/3608 606/247 |
| 7,749,225 B2 * | 7/2010 | Chappuis | A61B 17/1617 606/167 |
| 7,794,500 B2 * | 9/2010 | Felix | A61F 2/447 623/17.11 |

(56) References Cited

U.S. PATENT DOCUMENTS

| | | | | |
|---|---|---|---|---|
| 7,837,732 B2 | * | 11/2010 | Zucherman | A61F 2/446 623/17.11 |
| 7,846,206 B2 | * | 12/2010 | Oglaza | A61B 17/8858 623/17.11 |
| 7,867,265 B2 | * | 1/2011 | Beutter | A61B 17/0642 606/75 |
| 7,887,589 B2 | * | 2/2011 | Glenn | A61F 2/4425 623/17.14 |
| 7,914,530 B2 | * | 3/2011 | Michelson | A61B 17/8888 623/17.11 |
| 7,918,891 B1 | * | 4/2011 | Curran | A61F 2/442 623/17.16 |
| 7,922,765 B2 | * | 4/2011 | Reiley | A61B 17/70 606/279 |
| 8,021,392 B2 | * | 9/2011 | Petersen | A61B 17/1757 606/247 |
| 8,021,427 B2 | * | 9/2011 | Spoonamore | A61F 2/4611 623/17.14 |
| 8,062,294 B2 | * | 11/2011 | Reynolds | A61B 17/8052 606/301 |
| 8,066,773 B2 | * | 11/2011 | Muhanna | A61F 2/4425 623/17.14 |
| 8,080,046 B2 | * | 12/2011 | Suddaby | A61B 17/1637 623/17.11 |
| 8,088,163 B1 | * | 1/2012 | Kleiner | A61F 2/442 623/17.11 |
| 8,133,283 B2 | * | 3/2012 | Wilson | A61B 17/1782 606/86 R |
| 8,143,042 B2 | * | 3/2012 | Bettinger | C08G 63/6854 435/395 |
| 8,157,865 B2 | * | 4/2012 | Hochschuler | A61F 2/4455 606/279 |
| 8,162,981 B2 | * | 4/2012 | Vestgaarden | A61B 17/7064 606/247 |
| 8,221,428 B2 | * | 7/2012 | Trieu | A61B 17/7076 606/104 |
| 8,226,721 B2 | * | 7/2012 | Belliard | A61F 2/4425 623/17.15 |
| 8,287,572 B2 | * | 10/2012 | Bae | A61F 2/447 606/279 |
| 8,343,189 B2 | * | 1/2013 | Assell | A61F 2/4405 606/279 |
| 8,348,950 B2 | * | 1/2013 | Assell | A61B 17/32002 606/79 |
| 8,388,667 B2 | * | 3/2013 | Reiley | A61B 17/8695 606/301 |
| 8,414,648 B2 | * | 4/2013 | Reiley | A61B 17/1615 606/279 |
| 8,419,722 B2 | * | 4/2013 | Richards | A61B 17/00491 604/82 |
| 8,425,570 B2 | * | 4/2013 | Reiley | A61B 17/866 606/279 |
| 8,430,929 B2 | * | 4/2013 | Tribus | A61F 2/4611 623/17.11 |
| 8,444,693 B2 | * | 5/2013 | Reiley | A61F 2/4455 623/17.11 |
| 8,470,004 B2 | * | 6/2013 | Reiley | A61B 17/1671 606/279 |
| 8,491,656 B2 | * | 7/2013 | Schoedinger, III | A61F 2/4611 623/17.16 |
| 8,523,945 B1 | * | 9/2013 | Wensel | A61B 17/70 623/17.11 |
| 8,551,171 B2 | * | 10/2013 | Johnson | A61B 17/844 606/279 |
| 8,551,175 B1 | * | 10/2013 | Wensel | A61F 2/447 623/17.11 |
| 8,617,244 B2 | * | 12/2013 | Reichen | A61F 2/4455 623/17.11 |
| 8,679,123 B2 | * | 3/2014 | Kinmon | A61B 17/0642 606/75 |
| 8,709,042 B2 | * | 4/2014 | Greenhalgh | A61F 2/4611 606/279 |
| 8,709,045 B1 | * | 4/2014 | Folsom | A61B 17/1615 606/247 |
| 8,721,722 B2 | * | 5/2014 | Shah | A61F 2/4611 623/17.11 |
| 8,740,912 B2 | * | 6/2014 | Stark | A61B 17/17 606/90 |
| 8,790,368 B2 | * | 7/2014 | Sullivan | A61F 2/0811 606/325 |
| 8,808,377 B2 | * | 8/2014 | Donner | A61F 2/4455 623/17.11 |
| 8,852,280 B2 | * | 10/2014 | Armstrong | A61F 2/4455 623/17.11 |
| D717,951 S | * | 11/2014 | Cheney | D24/155 |
| 8,888,826 B2 | * | 11/2014 | Kinmon | A61B 17/8004 606/301 |
| 8,951,254 B2 | * | 2/2015 | Mayer | A61B 17/1617 623/18.11 |
| 8,961,571 B2 | * | 2/2015 | Lee | A61F 2/4601 606/279 |
| 9,005,291 B2 | * | 4/2015 | Loebl | A61F 2/4611 623/17.15 |
| 9,039,768 B2 | * | 5/2015 | Voellmicke | A61F 2/4611 606/86 A |
| 9,107,745 B2 | * | 8/2015 | Bouduban | A61F 2/0811 |
| 9,125,649 B2 | * | 9/2015 | Bruewer | A61B 17/07207 |
| 9,186,155 B2 | * | 11/2015 | Katzman | A61B 17/1671 |
| 9,204,973 B2 | * | 12/2015 | Aflatoon | A61F 2/447 |
| 9,254,130 B2 | * | 2/2016 | Hollis | A61B 17/68 |
| 9,333,090 B2 | * | 5/2016 | Donner | A61B 17/7055 |
| 9,359,472 B2 | * | 6/2016 | Nicholson | A61K 45/06 |
| 9,408,711 B2 | * | 8/2016 | Burkinshaw | A61F 2/4465 |
| 9,480,511 B2 | * | 11/2016 | Butters | A61F 2/4202 |
| 9,498,351 B2 | * | 11/2016 | Vigliotti | A61F 2/447 |
| 9,566,103 B2 | * | 2/2017 | Mayer | A61B 17/17 |
| 9,585,756 B2 | * | 3/2017 | Mayer | A61B 17/70 |
| 9,592,131 B2 | * | 3/2017 | Sandstrom | A61F 2/30767 |
| 9,610,172 B2 | * | 4/2017 | Butler | A61F 2/4465 |
| 9,615,856 B2 | * | 4/2017 | Arnett | A61B 17/0642 |
| 9,675,395 B2 | * | 6/2017 | Averous | A61B 17/0644 |
| 9,700,356 B2 | * | 7/2017 | Donner | A61B 17/86 |
| 9,700,434 B2 | * | 7/2017 | Bae | A61F 2/4611 |
| 9,724,447 B2 | * | 8/2017 | Karp | A61L 15/26 |
| 9,763,800 B2 | * | 9/2017 | Finley | A61F 2/4225 |
| 9,788,961 B2 | * | 10/2017 | Donner | A61B 17/7055 |
| 9,826,986 B2 | * | 11/2017 | Donner | A61B 17/7055 |
| 9,888,911 B2 | * | 2/2018 | Siegal | A61B 17/025 |
| 10,166,022 B2 | * | 1/2019 | Early | A61B 17/0642 |
| 10,182,921 B2 | * | 1/2019 | Georges | A61F 2/4455 |
| 10,201,427 B2 | * | 2/2019 | Mauldin | A61F 2/4455 |
| 10,238,382 B2 | * | 3/2019 | Terrill | A61B 17/0642 |
| 10,278,742 B2 | * | 5/2019 | Pavlov | A61F 2/447 |
| 10,285,689 B2 | * | 5/2019 | Finley | A61B 17/15 |
| 10,292,825 B2 | * | 5/2019 | Kahmer | A61F 2/447 |
| 10,376,206 B2 | * | 8/2019 | Sand | A61B 5/6847 |
| 10,376,367 B2 | * | 8/2019 | Fallin | A61B 17/8004 |
| 10,376,379 B2 | * | 8/2019 | Songer | A61F 2/4455 |
| 10,383,733 B2 | * | 8/2019 | Early | A61B 17/7059 |
| 10,492,841 B2 | * | 12/2019 | Hartdegen | A61B 17/8085 |
| 10,512,548 B2 | * | 12/2019 | Messerli | A61F 2/447 |
| 10,603,055 B2 | * | 3/2020 | Donner | A61B 17/1739 |
| D892,331 S | * | 8/2020 | Hollis | D24/155 |
| 10,729,555 B1 | * | 8/2020 | Rappaport | A61F 2/4465 |
| 10,779,816 B2 | * | 9/2020 | Goldstein | A61B 17/8095 |
| 10,918,729 B2 | * | 2/2021 | Harris | A61L 27/48 |
| 11,006,949 B2 | * | 5/2021 | Daniel | A61B 17/8872 |
| 11,103,239 B2 | * | 8/2021 | Isch | A61B 17/0642 |
| 11,124,762 B2 | * | 9/2021 | Gabriele | A61L 27/18 |
| 11,160,670 B2 | * | 11/2021 | Kuyler | A61F 2/4611 |
| 11,179,149 B2 | * | 11/2021 | Hartdegen | A61B 17/68 |
| 11,197,767 B2 | * | 12/2021 | Hessler | A61F 2/447 |
| 11,202,626 B2 | * | 12/2021 | Hartdegen | A61B 17/808 |
| 11,576,785 B1 | * | 2/2023 | Cummins | A61F 2/4611 |
| 11,752,011 B2 | * | 9/2023 | Stuart | A61F 2/447 623/17.11 |
| 11,866,523 B2 | | 1/2024 | Gabriele | C08F 2/10 |
| 2001/0020186 A1 | * | 9/2001 | Boyce | A61F 2/4455 606/279 |

(56) References Cited

U.S. PATENT DOCUMENTS

| | | | |
|---|---|---|---|
| 2002/0038123 A1* | 3/2002 | Visotsky | A61B 17/8095 606/907 |
| 2004/0193271 A1* | 9/2004 | Fraser | A61F 2/442 623/17.11 |
| 2004/0260286 A1* | 12/2004 | Ferree | A61F 2/4455 606/247 |
| 2005/0149192 A1* | 7/2005 | Zucherman | A61B 17/1671 623/17.11 |
| 2005/0222683 A1* | 10/2005 | Berry | A61F 2/442 623/17.13 |
| 2005/0273108 A1* | 12/2005 | Groiso | A61B 17/0642 606/75 |
| 2006/0054171 A1* | 3/2006 | Dall | A61B 90/11 128/898 |
| 2006/0058802 A1* | 3/2006 | Kofoed | A61B 17/562 606/75 |
| 2006/0178745 A1* | 8/2006 | Bartish | A61F 2/442 623/17.13 |
| 2007/0093839 A1* | 4/2007 | Beckendorf | A61B 17/0642 606/75 |
| 2007/0156241 A1* | 7/2007 | Reiley | A61B 17/56 623/17.11 |
| 2007/0239278 A1* | 10/2007 | Heinz | A61F 2/4425 623/17.15 |
| 2007/0270879 A1* | 11/2007 | Isaza | A61B 17/1739 606/104 |
| 2007/0299529 A1* | 12/2007 | Rhodes | A61F 2/389 623/20.32 |
| 2008/0140082 A1* | 6/2008 | Erdem | A61B 17/8805 606/92 |
| 2008/0221623 A1* | 9/2008 | Gooch | A61B 17/686 606/302 |
| 2008/0319443 A1* | 12/2008 | Focht | A61B 17/0642 606/75 |
| 2009/0024174 A1* | 1/2009 | Stark | A61B 17/7055 606/321 |
| 2009/0099602 A1* | 4/2009 | Aflatoon | A61F 2/4405 606/301 |
| 2009/0138015 A1* | 5/2009 | Conner | A61F 2/4684 606/90 |
| 2009/0149884 A1* | 6/2009 | Snyder | A61F 2/0805 606/228 |
| 2009/0254090 A1* | 10/2009 | Lizee | A61B 17/0642 606/75 |
| 2009/0259261 A1* | 10/2009 | Reiley | A61B 17/7055 606/329 |
| 2010/0158978 A1* | 6/2010 | Markland | A61K 9/12 424/490 |
| 2010/0268228 A1* | 10/2010 | Petersen | A61B 17/1671 606/60 |
| 2010/0286785 A1* | 11/2010 | Grayson | A61F 2/447 623/17.16 |
| 2011/0040362 A1* | 2/2011 | Godara | A61B 18/1482 607/116 |
| 2011/0046737 A1* | 2/2011 | Teisen | A61B 17/1671 606/86 A |
| 2011/0098709 A1* | 4/2011 | Malandain | A61B 17/1617 606/79 |
| 2011/0098816 A1* | 4/2011 | Jacob | A61B 17/7055 623/17.11 |
| 2011/0098817 A1* | 4/2011 | Eckhardt | A61B 17/7055 623/17.11 |
| 2011/0142790 A1* | 6/2011 | Chen | A61L 27/446 424/78.37 |
| 2011/0160866 A1* | 6/2011 | Laurence | A61F 2/4611 623/17.16 |
| 2011/0184518 A1* | 7/2011 | Trieu | A61B 17/562 623/17.11 |
| 2011/0184520 A1* | 7/2011 | Trieu | A61B 17/562 623/17.11 |
| 2011/0230966 A1* | 9/2011 | Trieu | A61B 17/562 623/17.11 |
| 2011/0238181 A1* | 9/2011 | Trieu | A61B 17/7055 623/17.11 |
| 2011/0295272 A1* | 12/2011 | Assell | A61B 17/32002 606/131 |
| 2011/0301407 A1* | 12/2011 | Deitch | A61F 2/0045 600/30 |
| 2012/0083883 A1* | 4/2012 | Ginn | A61B 17/8858 623/17.11 |
| 2012/0116454 A1* | 5/2012 | Edidin | A61B 17/1757 606/279 |
| 2012/0130374 A1* | 5/2012 | Bouduban | A61F 2/0805 606/75 |
| 2012/0191191 A1* | 7/2012 | Trieu | A61B 17/864 623/17.11 |
| 2012/0215315 A1* | 8/2012 | Hochschuler | A61F 2/4455 623/17.16 |
| 2012/0253406 A1* | 10/2012 | Bae | A61F 2/4611 606/279 |
| 2012/0271351 A1* | 10/2012 | Vestgaarden | A61B 17/7064 606/279 |
| 2012/0296428 A1* | 11/2012 | Donner | A61B 17/7043 623/17.11 |
| 2012/0323285 A1* | 12/2012 | Assell | A61B 17/8625 606/305 |
| 2012/0330420 A1* | 12/2012 | Brodke | A61L 27/32 623/17.16 |
| 2013/0030456 A1* | 1/2013 | Assell | A61B 17/32002 606/170 |
| 2013/0053852 A1* | 2/2013 | Greenhalgh | A61B 17/1659 606/83 |
| 2013/0053902 A1* | 2/2013 | Trudeau | A61B 17/8685 606/313 |
| 2013/0085535 A1* | 4/2013 | Greenhalgh | A61B 17/7055 606/301 |
| 2013/0172736 A1* | 7/2013 | Abdou | G16H 50/30 606/279 |
| 2013/0173004 A1* | 7/2013 | Greenhalgh | A61F 2/4455 623/17.16 |
| 2013/0237988 A1* | 9/2013 | Mauldin | A61B 17/1604 606/84 |
| 2013/0245764 A1* | 9/2013 | Mauldin | A61F 2/44 623/17.11 |
| 2013/0267836 A1* | 10/2013 | Mauldin | A61B 17/1671 606/96 |
| 2013/0267961 A1* | 10/2013 | Mauldin | A61B 17/68 606/99 |
| 2013/0267989 A1* | 10/2013 | Mauldin | A61M 29/00 606/86 R |
| 2013/0296953 A1* | 11/2013 | Mauldin | A61B 17/7055 606/328 |
| 2014/0018809 A1* | 1/2014 | Allen | A61B 17/0642 606/75 |
| 2014/0066991 A1* | 3/2014 | Marik | A61B 17/8625 606/279 |
| 2014/0088707 A1* | 3/2014 | Donner | A61F 2/30988 623/17.11 |
| 2014/0135850 A1* | 5/2014 | Parent | A61B 17/8872 606/304 |
| 2014/0200618 A1* | 7/2014 | Donner | A61F 2/4611 606/281 |
| 2014/0207240 A1* | 7/2014 | Stoffman | A61B 17/68 623/18.11 |
| 2014/0276830 A1* | 9/2014 | Cheney | A61B 17/0644 264/138 |
| 2014/0277463 A1* | 9/2014 | Yerby | A61F 2/4611 623/17.11 |
| 2016/0081810 A1* | 3/2016 | Reiley | A61B 17/1757 623/17.11 |
| 2016/0100870 A1* | 4/2016 | Lavigne | A61B 17/8625 606/304 |
| 2017/0156879 A1* | 6/2017 | Janowski | A61F 2/4611 |
| 2018/0050128 A1* | 2/2018 | Gabriele | A61L 26/008 |
| 2019/0071537 A1* | 3/2019 | Pereira | C08G 63/918 |
| 2021/0169660 A1* | 6/2021 | Reckling | A61B 17/1739 |
| 2021/0393408 A1* | 12/2021 | Ginn | A61F 2/4611 |
| 2021/0393409 A1* | 12/2021 | Ginn | A61F 2/4455 |

(56) References Cited

U.S. PATENT DOCUMENTS

| | | | |
|---|---|---|---|
| 2022/0071644 A1* | 3/2022 | Donner | A61B 17/144 |
| 2022/0273447 A1* | 9/2022 | Ginn | A61B 17/848 |
| 2022/0273448 A1* | 9/2022 | Ginn | A61F 2/4455 |
| 2022/0296378 A1* | 9/2022 | Ginn | A61F 2/4601 |
| 2022/0304814 A1* | 9/2022 | Ginn | A61B 6/485 |
| 2022/0346964 A1* | 11/2022 | Spenciner | A61F 2/40 |
| 2023/0000631 A1* | 1/2023 | Ginn | A61B 17/1664 |
| 2023/0032203 A1* | 2/2023 | Maxwell | A61B 17/869 |
| 2023/0255623 A1* | 8/2023 | Ritz | A61B 17/0642 606/75 |

* cited by examiner

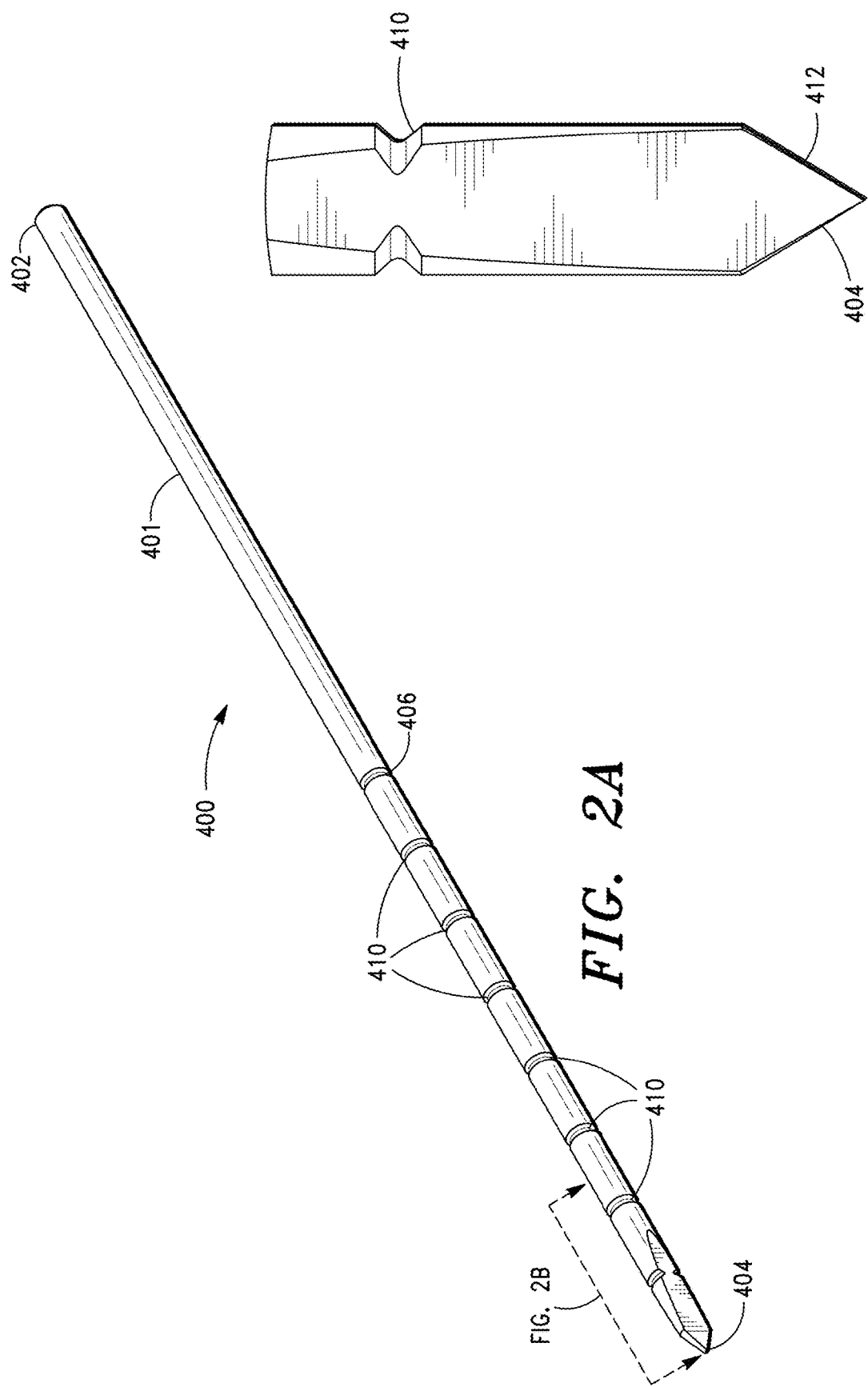

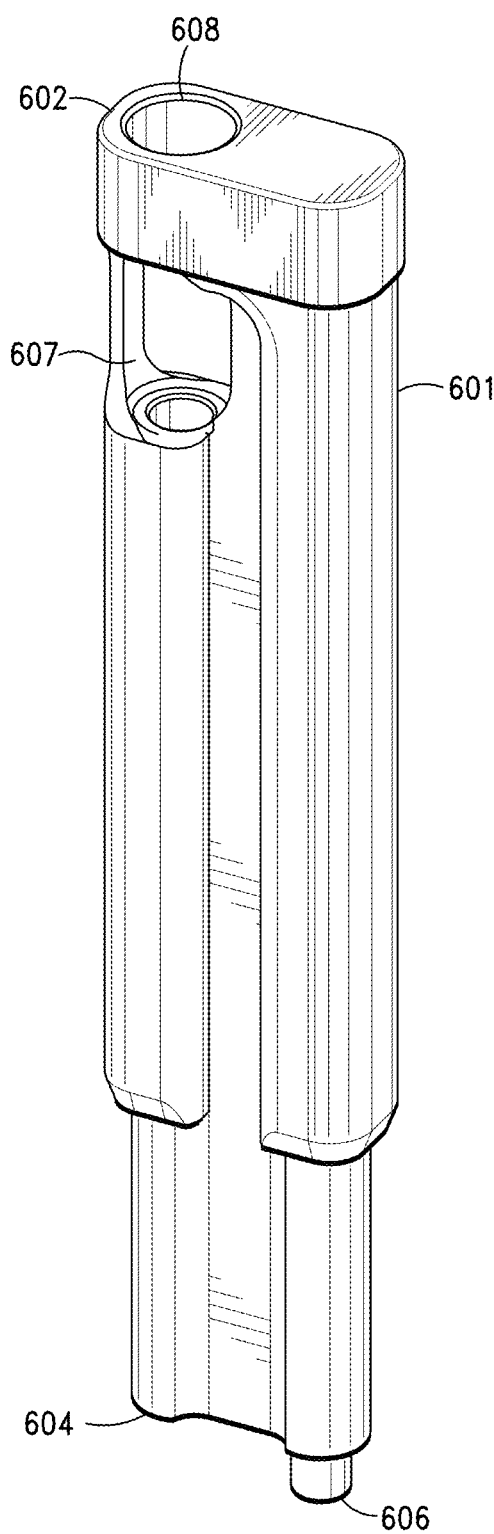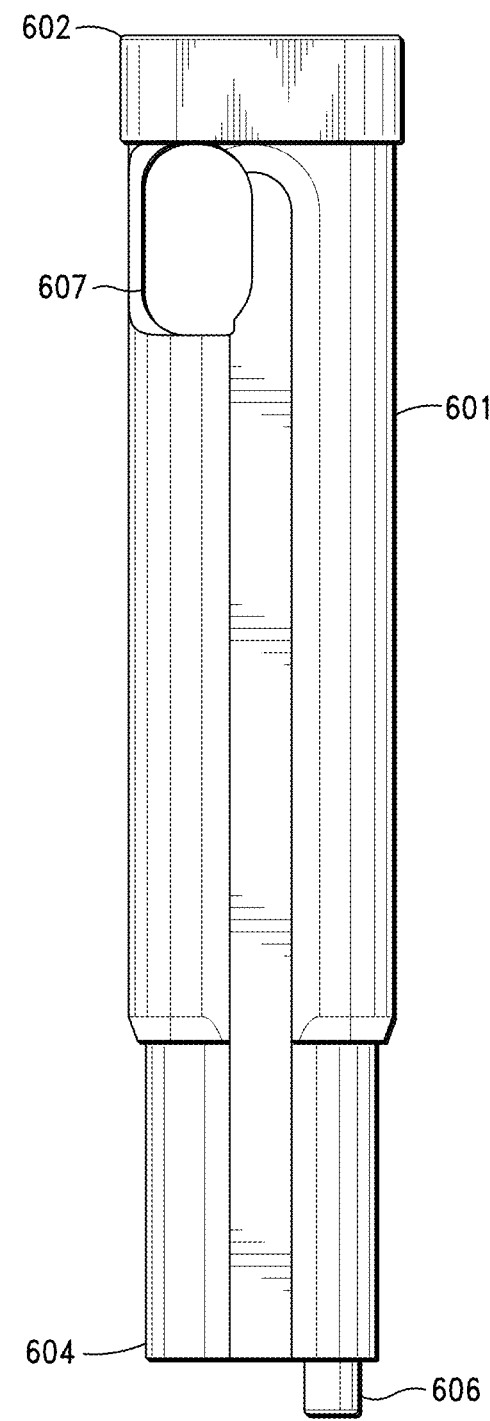
*FIG. 5A*          *FIG. 5B*

METHODS FOR SACROILIAC JOINT STABILIZATION

CROSS-REFERENCES TO RELATED APPLICATIONS

This application is a continuation-in-part application of U.S. patent application Ser. No. 17/463,779, filed Sep. 1, 2021, which is a continuation-in part of U.S. patent application Ser. No. 13/857,977, filed Apr. 5, 2013, now U.S. Pat. No. 11,273,042, which is a continuation application of U.S. patent application Ser. No. 13/192,289, filed Jul. 27, 2011, now abandoned, which claims the benefit of U.S. provisional patent application Ser. No. 61/368,233, filed Jul. 27, 2010.

FIELD OF THE INVENTION

The present invention relates to methods, systems and apparatus for stabilizing junctions between bone structures. More particularly, the present invention relates to methods, systems and apparatus for stabilizing dysfunctional sacroiliac (SI) joints.

BACKGROUND OF THE INVENTION

As is well known in the art, the sacroiliac (SI) joint 6 comprises a diarthrodial synovial joint, which, as illustrated in FIG. 1A, is defined by the interface between the articular surfaces of the sacrum 2 and the ilium 4. Thus, the SI joint 6 is defined by (and, hence, comprises) portions of the sacrum 2 and ilium 4.

As further illustrated in FIGS. 1B-1D, the SI joint 6 generally comprises the shape of an inverted capital letter "L" (denoted "13") lying on its side (rather than a triangle), where the long arm of the inverted "L" 15 (i.e., SI joint 6) is oriented along the posterior wall of the pelvis 11 (denoted "25" in FIG. 1A) and is also oriented relatively straight through its entire course. The sacral floor (denoted "21" in FIG. 1C), which is defined by the region between the anterior sacral promontory 19a and the apex 19b of the sacrum 2, generally slopes downward and laterally at an approximately 30% grade relative to the cephalocaudal axis 27.

As illustrated in FIGS. 1B and 1C, the short arm of the inverted "L" (denoted "17") is generally oriented parallel to the transverse plane of the L5-S1 lumbosacral joint and limited superiorly by the sacral ala (denoted "23" in FIG. 1C).

The apex of the inverted "L" (denoted "29" in FIG. 1B) is positioned below the S2 segment region of the sacrum 2 (denoted "S2") proximate to the S3 segment region of the sacrum 2 (denoted "S3").

As is also well known in the art, the SI joint further comprises a SI joint dorsal recess or gap 7 that is disposed between the sacrum 2 and ilium 4 proximate the S2 segment region of the sacrum 2, as illustrated in FIG. 1D.

As is further well known in the art, the SI joint further comprises articular cartilage, i.e., hyaline and fibrocartilage, and a strong, extensive ligamentous architecture, which stabilizes the SI joint.

Generally, the articular surfaces of the sacrum 2 and the ilium 4 that define the SI joint 6 comprise cortical bone 8, which is more compact, dense and hard relative to softer trabecular bone 10, which, as further illustrated in FIG. 1A, is disposed in the interior regions of the sacrum and ilium 2, 4.

The SI Joint is distinguished from other synovial joints by the atypical articulation of the different articular surfaces of the sacrum and ilium; the articular surface of the sacrum comprising hyaline cartilage and the articular surface of the ilium comprising substantially stronger fibrocartilage.

As is further well known in the art, the primary plane of motion of the SI joint is anterior-posterior along a transverse axis. The terms often employed to describe the relative motion of the sacrum and ilium are nutation, which refers to anterior-inferior movement of the sacrum while the coccyx (denoted "3" in FIG. 1A) moves posteriorly relative to the ilium, and counternutation, which refers to posterior-superior movement of the sacrum while the coccyx moves anteriorly relative to the ilium.

In most healthy individuals, the SI joint range of motion in flexion-extension is approximately 3°, approximately 1.5° in axial rotation and approximately 0.8° in lateral bending.

As is well established, the SI joint performs several seminal biomechanical functions. The primary functions of the SI joint are to attenuate loads exerted on the upper body and to distribute the loads to the lower extremities. The SI joint also functions as a shock absorber for loads exerted on spine.

As is also well established, the noted loads and, hence, forces exerted on the SI joint can adversely affect the biomechanical functions of the SI joint, which can, and often will, result in SI joint dysfunction—an often-overlooked musculoskeletal pathology associated with lower back pain.

Indeed, SI joint dysfunction is estimated to be the primary cause of lower back pain in 15-30% of subjects afflicted with such pain. However, lower back pain associated with SI joint dysfunction is suspected to be far more common than most healthcare providers realize, since such pain is often associated with other skeletal and musculoskeletal dysfunctions.

SI joint dysfunction, and pain associated therewith, can be caused by various SI joint abnormalities and/or disorders, including traumatic fracture dislocation of the pelvis, degenerative arthritis, sacroiliitis, i.e., an inflammation or degenerative condition of the sacroiliac joint; osteitis condensans ilii, and other degenerative conditions of the SI joint structures.

Various non-surgical methods, such as administration of pharmacological agents, e.g., the corticosteroid prednisone, and surgical methods and devices, i.e., SI joint prostheses, have been developed and employed to treat SI joint dysfunction.

The most common approach employed to treat SI joint dysfunctions (when non-surgical treatments fail to ameliorate pain associated therewith), at present, is SI joint stabilization, i.e., reinforcing or modulating articulation by and between the sacrum and ilium, via surgical intervention.

SI joint stabilization typically comprises surgical placement of a SI joint prosthesis proximate to or in a dysfunctional SI joint and is generally characterized by the direction of access to the dysfunctional SI joint, i.e., anterior, posterior or lateral.

Although several conventional SI joint stabilization surgical methods and associated bone prostheses have effectively ameliorated pain associated with SI joint dysfunction, there remains many disadvantages associated with the conventional methods and associated SI joint prostheses.

A major disadvantage associated with many conventional SI joint stabilization surgical methods is that the surgeon is required to make a substantial incision in and through the skin and tissues of a subject to access the dysfunctional SI joint. Often referred to as "open surgery" methods, these surgical methods have the attendant disadvantages of requiring general anesthesia and often involve increased operative time, pain, hospitalization, and recovery time due to the extensive soft tissue damage. There is also an increased probability of post-surgical complication associated with open surgery methods, such as nosocomial infection.

Minimally-invasive methods for SI joint stabilization have thus been developed to address the noted disadvantages associated with open surgery methods. Although conventional minimally-invasive SI joint stabilization methods, such as the methods disclosed in U.S. Pub. No. 2009/0076551 to Petersen, have garnered some success in relieving pain associated with SI joint dysfunction and have effectively addressed many of the disadvantages associated with open surgery methods, there similarly remains many disadvantages associated with conventional minimally-invasive SI joint stabilization methods.

A major disadvantage associated with many conventional minimally-invasive SI joint stabilization methods is that such methods are difficult to perform and, hence, often require extensive, system-specific surgical training and experience. Despite the level of surgical training and experience that surgeons possess, when such conventional minimally-invasive SI joint stabilization methods are employed, there is still a substantial incidence of damage to the lumbosacral neurovascular structures proximate to the SI joint.

A further disadvantage associated with many conventional minimally-invasive SI joint stabilization methods and associated apparatus, i.e., SI joint prostheses, such as the methods and joint stabilization prostheses disclosed in U.S. Pub. No. 2009/0076551 to Petersen, is that pre-existing sacral abnormalities can lead to displacement of the implanted prostheses, which can, and often will result in damage to surrounding bone and soft tissue structures.

An additional disadvantage associated with many conventional minimally invasive SI joint stabilization methods is that they comprise anterior or lateral approaches to the dysfunctional SI joint and, hence, muscles, e.g., gluteal aponeurotic fascia and gluteus medius, and ligaments are typically disrupted, and nerves and blood vessels are susceptible to damage during placement of a prosthesis in a dysfunctional SI joint.

Further, some conventional minimally-invasive SI joint stabilization methods are particularly prone to failure due to displacement of the SI joint prostheses in the dysfunctional SI joint, such as in or proximate the SI joint dorsal recess referenced above and shown in FIG. 1D, and/or failure of the prostheses to effectively engage the SI joint structures, e.g., articular surfaces of the sacrum and/or ilium.

Various "improved" SI joint prostheses have thus been developed for use in minimally-invasive SI joint stabilization methods or procedures to effectively engage SI joint structures and maintain engagement thereto during SI joint function.

Although many of the "improved" SI joint prostheses, when deployed properly in a dysfunctional SI joint, can, and often will, effectively engage SI joint structures, there remains several disadvantages associated with the prostheses. Illustrative are the SI joint prostheses disclosed in U.S. Pat. No. 8,951,254 to Mayer, et al.

The SI joint prostheses disclosed in U.S. Pat. No. 8,951,254 comprise or are coated with a liquefiable synthetic polymer that is adapted to liquify upon administration of mechanical energy, e.g., high frequency vibration, when implanted and re-solidify thereafter to securely engage the SI joint structures, i.e., sacrum and ilium.

A major disadvantage associated with the SI joint prostheses disclosed in U.S. Pat. No. 8,951,254 is that the liquefiable synthetic polymers, when re-solidified in situ, are structurally inferior to the osseous or bone tissue of the sacrum and ilium. The fusion sites between the articular surfaces of the sacrum and ilium that define the SI joint are, thus, highly susceptible to structural fatigue and failure, which can, and often will, result in misalignment of the SI joint and ultimately increased pain for the subject.

A further disadvantage associated with the SI joint prostheses disclosed in U.S. Pat. No. 8,951,254 is that the synthetic liquefiable synthetic polymers are also substantially immunogenic and will induce an adverse immune response when the prostheses are implanted in a dysfunctional SI joint. As is well established, the adverse immune response can, and often will, prevent healing and osteogenic processes, e.g., remodeling of damaged osseous tissue and regeneration of new osseous tissue.

Additional disadvantages associated with the SI joint prostheses disclosed in U.S. Pat. No. 8,951,254 and many other prostheses designed for minimally-invasive SI joint stabilization are that the noted prostheses are difficult to accurately place in optimum positions in a dysfunctional SI joint and, in many instances, lack sufficient structural properties, such as rigidity and/or fatigue resistance, to effectively stabilize the dysfunctional SI joint.

It would thus be desirable to provide SI joint stabilization methods and associated systems and apparatus, which substantially reduce or eliminate the disadvantages associated with conventional SI joint stabilization methods and associated systems and apparatus.

It is therefore an object of the invention to provide improved SI joint stabilization methods and associated systems and apparatus; particularly, SI joint prostheses, which substantially reduce or eliminate the disadvantages associated with conventional SI joint stabilization methods and associated systems and apparatus.

It is another object of the invention to provide improved minimally-invasive SI joint stabilization methods and associated systems and apparatus that facilitate posterior placement of prostheses in and, thereby, stabilization of dysfunctional SI joints.

It is another object of the invention to provide improved minimally-invasive SI joint stabilization methods and associated systems and apparatus; particularly, SI joint prostheses, that can be readily employed to stabilize dysfunctional SI joints.

It is another object of the invention to provide improved minimally-invasive SI joint stabilization methods and associated systems and apparatus, which effectively ameliorate pain associated with SI joint dysfunction.

It is another object of the invention to provide improved SI joint prostheses that can readily be employed in minimally-invasive SI joint stabilization methods and provide secure engagement to SI joint structures.

It is another object of the invention to provide improved SI joint prostheses that can readily be employed in minimally-invasive SI joint stabilization methods and possess optimal structural properties to effectively stabilize dysfunctional SI joints.

It is yet another object of the invention to provide improved SI joint prostheses that can readily be employed in minimally-invasive SI joint stabilization methods and facilitate remodeling of damaged osseous tissue and regeneration of new osseous tissue and osseous tissue structures.

SUMMARY OF THE INVENTION

The present invention is directed to minimally-invasive methods, systems and apparatus for stabilizing dysfunctional SI joints.

In some embodiments of the invention, there are thus provided minimally-invasive methods for stabilizing dysfunctional SI joints. In one embodiment, the minimally-invasive method for stabilizing a dysfunctional SI joint generally comprises the steps of:

a. providing a tool assembly adapted to access the dysfunctional SI joint via a posterior approach, the dysfunctional SI joint being disposed between and defined by a sacrum bone structure and an ilium bone structure, the tool assembly comprising guide pin, a drill guide assembly and prosthesis deployment assembly, the guide pin being adapted to be positioned in the dysfunctional SI joint, the drill guide assembly adapted to create a pilot SI joint opening in the dysfunctional SI joint, the drill guide assembly comprising a guide member lumen that extends through the drill guide assembly, the guide member lumen adapted to receive the guide pin therein, the drill guide assembly further comprising a bone dislodging member, the bone dislodging member adapted to dislodge portions of bone in the dysfunctional SI joint, the pilot SI joint opening comprising a first portion disposed in the sacrum bone structure and comprising a first sacrum opening cross-sectional shape and a second portion disposed in the ilium bone structure and comprising a first ilium opening cross-sectional shape, the pilot SI joint opening further comprising a cross-sectional shape in a plane that intersects the sacrum bone structure and the ilium bone structure, the plane being substantially perpendicular to the longitudinal axis of the bone dislodging member when the bone dislodging member is disposed in a pilot SI joint opening creation position in the dysfunctional SI joint, the prosthesis deployment assembly comprising an elongated guide member and a prosthesis engagement rod, the prosthesis engagement rod comprising a threaded distal end, the elongated guide member further comprising a prosthesis guide pin that extends from the guide member distal end;

b. providing a SI joint prosthesis comprising first and second elongated partially cylindrical sections connected to a bridge section, whereby the SI joint prosthesis comprises a continuous exterior surface comprising first and second partially cylindrical surface regions, the first partially cylindrical surface region comprising a first partially cylindrical surface region shape that corresponds to at least a first portion of the first sacrum opening cross-sectional shape, the second partially cylindrical surface region comprising a second partially cylindrical surface region shape that corresponds to at least a first portion of the first ilium opening cross-sectional shape, the bridge section comprising a bridge section proximal end and a bridge section distal end disposed opposite the bridge section proximal end, the bridge section distal end comprising a first tapered region configured and adapted to disrupt at least articular cartilage and cortical bone, the first elongated partially cylindrical section of the SI joint prosthesis comprising a first internal prosthesis engagement member lumen extending from the prosthesis proximal end, the second elongated partially cylindrical section of the SI joint prosthesis comprising a second internal prosthesis engagement member lumen extending from the prosthesis proximal end, the first and second internal prosthesis engagement member lumens adapted to receive the prosthesis guide pin and prosthesis engagement rod of the prosthesis deployment assembly therein, the SI joint prosthesis further comprising a plurality of slots in communication with at least the first internal prosthesis engagement member lumen, the SI joint prosthesis being sized and adapted to be inserted into the pilot SI joint opening;

c. making an incision in and through tissue of the subject to provide posterior access to the subject's dysfunctional SI joint;

d. advancing the guide pin of the tool assembly from a posterior approach in and through the incision;

e. advancing the guide pin into the dysfunctional SI joint, wherein the guide pin is positioned in the dysfunctional SI joint at an angle in the range of 25°-35° relative to the cephalocaudal axis of the subject;

f. assembling the drill guide assembly, wherein the drill guide is positioned in the access sleeve of the drill guide assembly;

g. inserting the guide pin into the drill guide assembly;

h. advancing the drill guide assembly along the guide pin into the dysfunctional SI joint;

i. creating the pilot SI joint opening with the drill guide assembly;

j. retracting the drill guide from the access sleeve of the drill guide assembly, wherein the guide pin is also retracted out of the tool assembly;

k. retracting the drill guide from the dysfunctional SI joint;

l. connecting the SI joint prosthesis to the prosthesis deployment assembly;

m. advancing the SI joint prosthesis into the pilot SI joint opening with the prosthesis deployment assembly;

n. retracting the prosthesis deployment assembly out of the dysfunctional SI joint; and o. retracting the access sleeve of the drill guide assembly out of the dysfunctional SI joint and out of the subject's body.

In a preferred embodiment of the invention, the guide pin is advanced to, but not beyond, the alar boundary of the dysfunctional SI joint.

In a preferred embodiment of the invention, when the SI joint prosthesis is advanced into the pilot SI joint opening with the prosthesis deployment assembly, the SI joint prosthesis is disposed in the dysfunctional SI joint at a position that is spaced a predetermined distance away from the SI joint dorsal recess and, hence, away from nerve structures, e.g., inferior gluteal nerve, disposed proximate thereto.

In a preferred embodiment, the SI joint prosthesis is disposed in the dysfunctional SI joint at a distance in the range of at least 2.0 mm to 6.0 mm away from the SI joint dorsal recess, more preferably, at a distance of at least 3.0 mm away from the SI joint dorsal recess.

In a preferred embodiment, when the SI joint prosthesis is advanced into the pilot SI joint opening with the prosthesis deployment assembly, the SI joint prosthesis is also press-fit into the pilot SI joint opening and the first sacrum opening cross-sectional shape transitions to a second sacrum opening cross-sectional shape comprising a larger cross-sectional area, and/or the first ilium opening cross-sectional shape transitions to a second ilium opening cross-sectional shape comprising a larger cross-sectional area.

In a preferred embodiment, the minimally-invasive SI joint stabilization method further comprises the step of providing an image capture apparatus configured and adapted to capture images of the subject's anatomical structure; particularly, the dysfunctional SI joint and anatomic structure proximate thereto, and the guide pin and prosthesis deployment assembly and, thereby, SI joint prosthesis during advancement toward and when disposed proximate to the dysfunctional SI joint.

In a preferred embodiment, the image capture apparatus comprises a CT system. However, according to the invention, further suitable image capture apparatus comprise a fluoroscope, radiography system, magnetic resonance imaging system, and an ultrasound system.

In a preferred embodiment, before the step of making an incision in and through tissue of the subject, a further step in the minimally-invasive SI joint stabilization method comprises capturing images of the subject's anatomical structure with the image capture apparatus to properly align the patient on the surgical table.

In a preferred embodiment, after the step of ensuring proper alignment of the patient and before the step of making an incision in and through tissue of the subject, a further step in the minimally-invasive SI joint stabilization method comprises capturing images of the subject's dysfunctional SI joint and anatomical structures proximate thereto to with the image capture apparatus to determine the extent and characteristics of the SI joint disorder, establish the proper guide pin trajectory for advancing the guide pin and, thereby, the SI joint prosthesis into the dysfunctional SI joint, and determine the proper incision (or skin entry) site for making the incision in and through the subject's tissue.

In a preferred embodiment, during the step of advancing the guide pin into the dysfunctional SI joint, a further step in the minimally-invasive SI joint stabilization method comprises capturing images of the guide pin with the image capture apparatus to ensure proper trajectory and placement of the guide pin proximate the dysfunctional SI joint.

In a preferred embodiment, during the steps of advancing the drill guide assembly and the SI joint prosthesis into the pilot SI joint opening with the prosthesis deployment assembly, further steps in the minimally-invasive SI joint stabilization method comprise capturing images of the drill guide assembly and the prosthesis deployment assembly, and, thereby, SI joint prosthesis (and surrounding structures; particularly, the dysfunctional SI joint) to ensure proper trajectory of the drill guide assembly and prosthesis deployment assembly and, thereby, proper placement of the SI joint prosthesis in the dysfunctional SI joint.

In some embodiments of the invention, CT scan images showing modified anteroposterior (AP) views of the guide pin, drill guide assembly, prosthesis deployment assembly and the SI joint prosthesis, and anatomical structures proximate thereto are captured during advancement of the guide pin, drill guide assembly, prosthesis deployment assembly and the SI joint prosthesis toward and when disposed proximate to and/or in the dysfunctional SI joint.

In some embodiments of the invention, after the step of retracting the prosthesis deployment assembly out of the dysfunctional SI joint, the minimally-invasive SI joint stabilization method further comprises the step of placing at least one biologically active agent in one or both of the internal prosthesis engagement member lumens of the SI joint prosthesis.

In some embodiments, prior to the step of the SI joint prosthesis being advanced into the pilot SI joint opening with the prosthesis deployment assembly, the SI joint prosthesis is coated with an osteogenic composition.

In some embodiments, prior to the step of the SI joint prosthesis being advanced into the pilot SI joint opening with the prosthesis deployment assembly, the SI joint prosthesis is coated with at least one biologically active agent and/or at least one pharmacological agent In some embodiments of the invention, after the step of retracting the prosthesis deployment assembly out of the dysfunctional SI joint, the minimally-invasive SI joint stabilization method further comprises the step of placing an osteogenic composition in one or both of the internal prosthesis engagement member lumens of the SI joint prosthesis.

In some embodiments of the invention, after the step of retracting the prosthesis deployment assembly out of the dysfunctional SI joint, the minimally-invasive SI joint stabilization method further comprises the step of placing at least one biologically active agent and/or at least one pharmacological agent in one or both of the internal prosthesis engagement member lumens of the SI joint prosthesis.

In some embodiments, the osteogenic composition comprises a demineralized bone matrix, autograft bone material, allograft bone material, xenograft bone material, polymethyl-methacrylate or calcium-based bone material.

In some embodiments, the osteogenic composition comprises a bone morphogenic protein (BMP).

In some embodiments, the BMP comprises BMP-1, BMP2a, BMP2b, BMP3, BMP4, BMP5, BMP6, BMP7 or BMP8a.

In some embodiments, the biologically active agent comprises a basic fibroblast growth factor (bFGF), a transforming growth factor-$\beta$ (TGF-$\beta$), a vascular endothelial growth factor (VEGF), a platelet derived growth factor (PDGF), an insulin-like growth factor (IGF), an epidermal growth factor (EGF) or a differentiation factor-5 (GDF-5).

In some embodiments, the pharmacological agent comprises penicillin, a carboxypenicillin, a tetracycline, gentamicin, vancomycin, ciprofloxacin, amikacin, an aminoglycoside, a cephalosporin, clindamycin, erythromycin, a fluoroquinolone, a macrolide, an azolide, metronidazole, trimethoprim-sulfamethoxazole, polymyxin B, oxytetracycline, tobramycin, cefazolin or rifampin.

In some embodiments, the pharmacological agent comprises dexamethasone, betamethasone, prednisone, prednisolone, methylprednisolone sodium succinate, methylprednisolone, cortisone, ketorolac, diclofenac or ibuprofen.

BRIEF DESCRIPTION OF THE DRAWINGS

Further features and advantages will become apparent from the following and more particular description of the preferred embodiments of the invention, as illustrated in the accompanying drawings, and in which like referenced characters generally refer to the same parts or elements throughout the views, and in which:

FIG. 2A is a perspective view of one embodiment of a guide pin, in accordance with the invention;

FIG. 2B is a partial side plan view of the guide pin shown in FIG. 2A, showing a guide pin marking, in accordance with the invention;

FIG. 5A is a perspective view of one embodiment of a prosthesis deployment assembly, in accordance with the invention;

FIG. 5B is a front plan view of the prosthesis deployment assembly shown in FIG. 5A, in accordance with the invention;

DETAILED DESCRIPTION OF THE PREFERRED EMBODIMENT

Figure 1A:
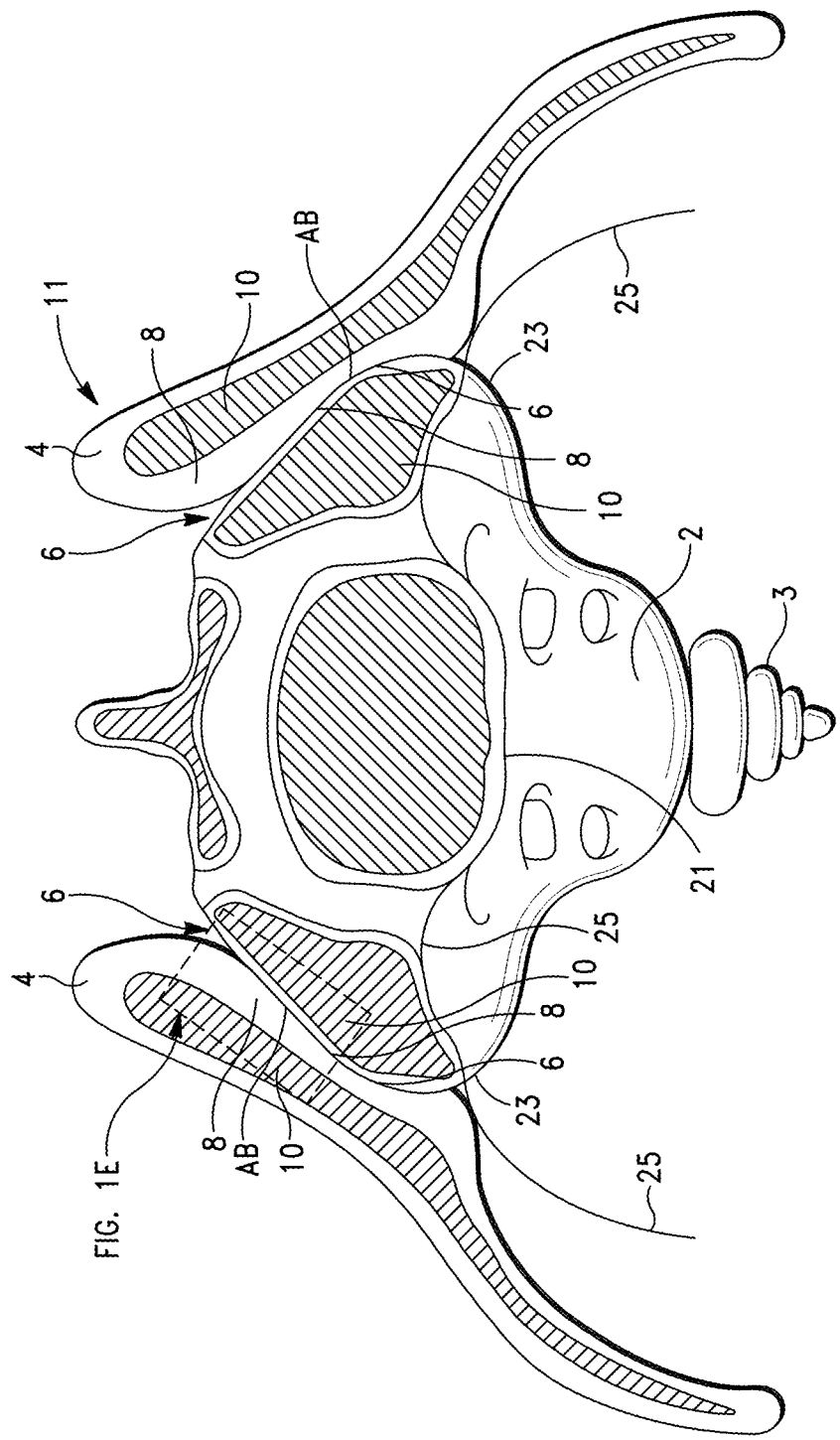
FIG. 1A is a schematic illustration of a human pelvic region from an anteroposterior (AP) perspective showing the SI joints thereof.

Before describing the present invention in detail, it is to be understood that this invention is not limited to particularly exemplified apparatus, systems, structures or methods as such may, of course, vary. Thus, although a number of apparatus, systems and methods similar or equivalent to those described herein can be used in the practice of the present invention, the preferred apparatus, systems, structures and methods are described herein.

It is also to be understood that, although the present invention is described and illustrated in connection with sacroiliac (SI) joint stabilization, fixation and fusion procedures, the invention is not limited to such procedures. According to the invention, the apparatus, systems and methods of the invention can also be employed to stabilize and/or fuse other articulating bone structures, including, without limitation, spinal vertebrae, tarsal bones and the like.

It is also to be understood that the terminology used herein is for the purpose of describing particular embodiments of the invention only and is not intended to be limiting.

Unless defined otherwise, all technical and scientific terms used herein have the same meaning as commonly understood by one having ordinary skill in the art to which the invention pertains.

Further, all publications, patents and patent applications cited herein, whether supra or infra, are hereby incorporated by reference in their entirety.

As used in this specification and the appended claims, the singular forms "a", "an" and "the" include plural referents unless the content clearly dictates otherwise. Thus, for example, reference to "an incision" includes two or more incisions and the like.

Further, ranges can be expressed herein as from "about" or "approximately" one particular value, and/or to "about" or "approximately" another particular value. When such a range is expressed, another embodiment includes from the one particular value and/or to the other particular value.

Similarly, when values are expressed as approximations, by use of the antecedent "about" or "approximately", it will be understood that the particular value forms another embodiment. It will be further understood that the endpoints of each of the ranges are significant both in relation to the other endpoint, and independently of the other endpoint.

It is also understood that there are a number of values disclosed herein, and that each value is also herein disclosed as "about" or "approximately" that particular value in addition to the value itself. For example, if the value "10" is disclosed, then "approximately 10" is also disclosed. It is also understood that when a value is disclosed that "less than or equal to" the value, "greater than or equal to the value" and possible ranges between values are also disclosed, as appropriately understood by the skilled artisan. For example, if the value "10" is disclosed then "less than or equal to 10" as well as "greater than or equal to 10" is also disclosed.

Definitions

The terms "sacroiliac joint", "SI joint", "sacroiliac junction" and "SI junction" are used interchangeably herein, and mean and include any region proximate to articulating regions of the sacrum and ilium bone structures and, hence, a junction between and defined by sacrum and ilium bone structures.

The term "dysfunctional" as used in connection with a SI joint, means and includes a physiological abnormality, disorder or impairment of an SI joint, including, but limited to, traumatic fracture dislocation of the pelvis, degenerative arthritis, sacroiliitis, i.e., an inflammation or degenerative condition of the SI joint; osteitis condensans ilii, and other degenerative conditions of SI joint bone structures.

The terms "articular surface" and "articulating surface" are used interchangeably herein in connection with bone structures; particularly, the sacrum and ilium bone structures, and mean and include a surface of a bone structure that forms an articulating junction (i.e., a synovial joint) with an adjacent bone structure, e.g., the articular surfaces of the sacrum and ilium bone structures.

The term "SI joint dorsal recess", as used herein, means and includes a recess or space between the sacrum and ilium bone structures proximate the S2 segment region of the sacrum.

The terms "fusion" and "arthrodesis" are used interchangeably herein in connection with bone structures, and mean and include partial or complete immobilization of adjacent bone structures; particularly, the sacrum and ilium bone structures.

The term "stabilization", as used herein, means and includes reinforcing, e.g., supporting, or modulating motion of adjacent articular bone structures; particularly, the sacrum and ilium bone structures. The term "stabilization", thus, in some instances, means and includes fusion and arthrodesis of adjacent bone structures.

The term "prosthesis", as used herein in connection with bone structures, means and includes a system or apparatus configured and adapted to stabilize or modulate motion of articulating bone structures; particularly, the sacrum and ilium bone structures.

The term "biodegradable", as used herein, means the ability of a material; particularly, a polymer or adhesive, to breakdown and be absorbed within the physiological environment of a SI joint and/or a structure associated therewith, including sacrum and ilium bone structures, by one or more physical, chemical, or cellular processes.

Biodegradable polymers, according to the invention, thus include, without limitation, polylactide polymers (PLA), copolymers of lactic and glycolic acids, including poly(lactic-co-glycolic) acid (PLGA) and poly(ε-caprolactone-co-L-lactic) acid (PCL-LA); glycine/PLA co-polymers, polyethylene oxide (PEO)/PLA block copolymers, acetylated polyvinyl alcohol (PVA)/polycaprolactone copolymers, poly(glycerol sebacate) (PGS) and its derivatives, including poly(glycerol-co-sebacate acrylate) (PGSA); poly(polyol sebacate) (PPS), poly(xylitol sebacate) (PXS), poly(xylitol glutamate sebacate) (PXGS), hydroxybutyrate-hydroxyvalerate copolymers, polyesters such as, but not limited to, aspartic acid and different aliphatic diols; poly(alkylene tartrates) and their copolymers with polyurethanes, polyglutamates with various ester contents and with chemically or enzymatically degradable bonds, other biodegradable nonpeptidic polyamides, amino acid polymers, polyanhydride drug carriers such as, but not limited to, poly(sebacic acid) (PSA); aliphatic-aromatic homopolymers, and poly(anhydride-co-imides), poly(phosphoesters) by matrix or pendant delivery systems, poly(phosphazenes), poly(iminocarbonate), crosslinked poly(ortho ester), hydroxylated polyester-urethanes, or the like.

Biodegradable adhesives, according to the invention, thus include, without limitation, poly(glycerol-co-sebacate acrylate) (PGSA), poly(L-glutamic acid)-based compositions, poly(γ-glutamic acid)-based compositions, poly(alkyl cyano acrylate)-based compositions, polyacrylic acid-based compositions, including polyacrylic acid crosslinked with pentaerythritol and/or allyl sucrose, polyacrylic acid crosslinked with divinyl glycol, and combinations thereof; fibrin-based compositions, collagen-based compositions, including collagen/poly(L-glutamic acid) compositions; albumin-based compositions, including BioGlue® (comprises purified bovine serum albumin (BSA) and glutaraldehyde); cyanoacrylate compositions, including butyl-2-cyanoacrylate adhesives (e.g., Indermil®, Histoacryl®, Histoacryl® Blue, and LiquiBand®) and octyl-2-cyanoacrylate adhesives (e.g., Dermabond®, SurgiSeal™, LiquiBand® Flex, and OctylSeal); poly(ethylene glycol) (PEG) based compositions, including FocalSeal®, Progel™ Duraseal™, DuraSeal™ Xact, Coseal® and ReSure Sealant; polysaccharide-based compositions, polypeptide-based compositions, and combinations thereof.

The term "osteogenic composition", as used herein, means and includes an agent or composition that induces or modulates an osteogenic physiological or biological process, or cellular activity, e.g., induces proliferation, and/or growth and/or remodeling and/or regeneration of bone or osseous tissue.

The term "osteogenic composition" thus means and includes, without limitation, the following osteogenic materials and compositions comprising same: demineralized bone matrix, autograft bone material, allograft bone material, xenograft bone material, polymethyl-methacrylate, calcium-based bone material, including hydroxyapatite (HA) and tricalcium phosphate; and combinations or mixtures thereof.

The term "osteogenic composition" also means and includes, without limitation, the following polymer materials and compositions comprising same: poly(glycerol sebacate) (PGS), poly(glycerol-co-sebacate) acrylate (PGSA) and co-polymers, such as poly(glycerol sebacate)-co-poly(ethylene glycol) (PGS-PEG); and/or composites thereof, e.g., PGS-hydroxyapatite (HA) composites and PGS-poly(ε-caprolactone) (PGS-PCL) composites.

The term "osteogenic composition" also means and includes, without limitation, acellular extracellular matrix (ECM) derived from mammalian tissue sources.

The term "osteogenic composition" thus means and includes, without limitation, acellular ECM derived from bone or osseous tissue, small intestine submucosa (SIS), epithelium of mesodermal origin, i.e., mesothelial tissue, placental tissue, omentum tissue, and combinations thereof.

The terms "biologically active agent" and "biologically active composition" are used interchangeably herein, and mean and include agent or composition that induces or modulates a physiological or biological process, or cellular activity, e.g., induces proliferation, and/or growth and/or regeneration of tissue, including osseous tissue.

The terms "biologically active agent" and "biologically active composition", as used herein, thus include agents and compositions that can be varied in kind or amount to provide a therapeutic level effective to mediate the formation or healing of osseous tissue, cartilage and connective tissue, e.g., tendons and ligaments. The term "biologically active composition", in some instances, thus means and includes an "osteogenic composition."

The terms "biologically active agent" and "biologically active composition" thus mean and include, without limitation, the following bone morphogenic proteins (BMPs) and compositions comprising same: BMP-1, BMP2a, BMP2b, BMP3, BMP4, BMP5, BMP6, BMP7 (also referred to as osteogenic protein 1 (OP-1)) and BMP8a.

The terms "biologically active agent" and "biologically active composition" also mean and include, without limitation, the following biological agents and compositions comprising same: platelet derived growth factor (PDGF), an insulin-like growth factor (IGF), including IGF-1 and IGF-2; basic fibroblast growth factor (bFGF) (also referred to as FGF2), transforming growth factor-β (TGF-β), including, TGF-β1 and TGF-β2; a growth hormone (GH), parathyroid hormone (PTH, including PTH1-34), transforming growth factor-α (TGF-α), granulocyte/macrophage colony stimulating factor (GM-CSF), epidermal growth factor (EGF), growth and differentiation factor-5 (GDF-5), vascular endothelial growth factor (VEGF), angiogenin, angiopoietin-1, del-1, follistatin, granulocyte colony-stimulating factor (G-CSF), hepatocyte growth factor/scatter factor (HGF/SF), interleukin-8 (IL-8), interleukin-10 (IL-10), leptin, midkine, placental growth factor, platelet-derived endothelial cell growth factor (PD-ECGF), platelet-derived growth factor-BB (PDGF-BB), pleiotrophin (PTN), progranulin, proliferin, a matrix metalloproteinase (MMP), angiopoietin 1 (ang1), angiopoietin 2 (ang2) and delta-like ligand 4 (DLL4).

The terms "biologically active agent" and "biologically active composition" also mean and include, without limitation, the following cells and compositions comprising same: bone marrow-derived progenitor cells, bone marrow stromal cells (BMSCs), osteoprogenitor cells, osteoblasts, osteocytes, osteoclasts, committed or partially committed cells from the osteogenic or chondrogenic lineage, hematopoietic stem cells, chondrocytes, chondrogenic progenitor cells (CPCs), mesenchymal stem cells (MSCs) and embryonic stem cells.

The terms "biologically active agent" and "biologically active composition" also mean and include an "extracellular vesicle (EV)", "exosome", "microsome" or "micro-vesicle", which are used interchangeably herein, and mean and include a biological structure formed from a hydrocarbon monolayer or bilayer configured to contain or encase a composition of matter.

The terms "extracellular vesicle (EV)", "exosome", "microsome" and "micro-vesicle" thus include, without limitation, a biological structure formed from a lipid layer configured to contain or encase biologically active agents and/or combinations thereof.

The terms "extracellular vesicle (EV)", "exosome", "microsome" and "micro-vesicle" also include, without limitation, EVs derived from the aforementioned cells and compositions comprising same, e.g., BMSC-derived EVs.

The terms "pharmacological agent" and "active agent" are used interchangeably herein, and mean and include an agent, drug, compound, composition or mixture thereof, including its formulation, which provides some therapeutic, often beneficial, effect. This includes any physiologically or pharmacologically active substance (or composition comprising same) that produces a localized or systemic effect or effects in animals, including warm blooded mammals.

The terms "pharmacological agent" and "active agent" thus mean and include, without limitation, the following osteoinductive agents and compositions comprising same: icaritin, tumor necrosis factor alpha (TNF-α) inhibitors, including etanercept and infliximab; disease-modifying anti-rheumatic drugs (DMARDs), including methotrexate and hydroxychloroquine; antibiotics, anti-viral agents, steroidal anti-inflammatories, non-steroidal anti-inflammatories, anti-thrombotic agents, including anti-coagulants and anti-platelet agents; and vasodilating agents.

The terms "pharmacological agent" and "active agent" further mean and include, without limitation, the following bisphosphonate agents and compositions comprising same: risedronate (Actonel®), alendronate (Fosamax®), ibandronate (Boniva®), zoledronic acid (Reclast®), pamidronate (Aredia®) and etidronate (Didronel®).

The terms "pharmacological agent" and "active agent" further mean and include, without limitation, the following antibiotics and compositions comprising same: penicillin, carboxypenicillins, such as ticarcillin; tetracyclines, such as minocycline; gentamicin, vancomycin, ciprofloxacin, amikacin, aminoglycosides, cephalosporins, clindamycin, erythromycin, fluoroquinolones, macrolides, azolides, metronidazole, trimethoprim-sulfamethoxazole, polymyxin B, oxytetracycline, tobramycin, cefazolin and rifampin.

The terms "anti-inflammatory" and "anti-inflammatory agent" are also used interchangeably herein, and mean and include a "pharmacological agent", which, when a therapeutically effective amount is administered to a subject, prevents or treats bodily tissue inflammation, i.e., the protective tissue response to injury or destruction of tissues, which serves to destroy, dilute, or wall off both the injurious agent and the injured tissues.

Anti-inflammatory agents thus include, without limitation, dexamethasone, betamethasone, prednisone, prednisolone, methylprednisolone sodium succinate, methylprednisolone, cortisone, ketorolac, diclofenac and ibuprofen.

The terms "pharmacological agent" and "active agent" further mean and include, without limitation, the following metal-based antimicrobials and compositions comprising same: silver particles, copper particles, cobalt particles, nickel particles, zinc particles, zirconium particles, molybdenum particles, lead particles and mixtures thereof.

As indicated above, the term "pharmacological composition", as used herein, means and includes a composition comprising a "pharmacological agent" and "active agent".

The term "therapeutically effective", as used herein, means that the amount of the "pharmacological agent" and/or "pharmacological composition" and/or "biologically active agent" and/or "biologically active composition" administered is of sufficient quantity to ameliorate one or more causes, symptoms, or sequelae of a disease or disorder. Such amelioration only requires a reduction or alteration, not necessarily elimination, of the cause, symptom, or sequelae of a disease or disorder.

The terms "patient" and "subject" are used interchangeably herein, and mean and include warm blooded mammals, humans and primates; avians; domestic household or farm animals, such as cats, dogs, sheep, goats, cattle, horses and pigs; laboratory animals, such as mice, rats and guinea pigs; fish; reptiles; zoo and wild animals; and the like.

The terms "one embodiment", "one aspect", and "an embodiment" and "an aspect", as used herein, means that a particular feature, structure, or characteristic described in connection with the embodiment may be included in at least one embodiment and not that any particular embodiment is required to have a particular feature, structure or characteristic described herein unless set forth in the claim.

The phrase "in one embodiment" or similar phrases employed herein do not limit the inclusion of a particular element of the invention to a single embodiment. The element may thus be included in other, or all embodiments discussed herein.

The term "substantially", as used herein, means and includes the complete or nearly complete extent or degree of an action, characteristic, property, state, structure, item, or result to function as indicated. For example, an object that is "substantially" enclosed would mean that the object is either completely enclosed or nearly completely enclosed. The exact allowable degree of deviation from absolute completeness may in some cases depend on the specific context, such that enclosing nearly all the length of a lumen would be substantially enclosed, even if the distal end of the structure enclosing the lumen had a slit or channel formed along a portion thereof.

Use of the term "substantially" is equally applicable when used in a negative connotation to refer to the complete or near complete lack of an action, characteristic, property, state, structure, item, or result. For example, structure which is "substantially free of" a bottom would either completely lack a bottom or so nearly completely lack a bottom that the effect would be effectively the same as if it completely lacked a bottom.

The term "comprise" and variations of the term, such as "comprising" and "comprises," means "including, but not limited to" and is not intended to exclude, for example, other components, elements or steps.

The following disclosure is provided to further explain in an enabling fashion the best modes of performing one or more embodiments of the present invention. The disclosure is further offered to enhance the understanding and appreciation for the inventive principles and advantages thereof, rather than to limit in any manner the invention. The invention is defined solely by the appended claims, including any amendments made during the pendency of this application, and all equivalents of those claims as issued.

As indicated above, the present invention is directed to minimally-invasive methods, systems and apparatus for stabilizing dysfunctional SI joints.

In some embodiments of the invention, there are thus provided minimally-invasive methods for stabilizing dysfunctional SI joints. In a preferred embodiment, the minimally-invasive methods (also referred to herein as "minimally-invasive SI joint stabilization methods") comprise a posterior approach to the dysfunctional SI joint.

As indicated above, SI joint stabilization, including minimally-invasive SI joint stabilization, typically comprises surgical placement of a SI joint prosthesis proximate to or in a dysfunctional SI joint via anterior, lateral and posterior approaches to the SI joint.

From the perspective of FIG. 1A, an anterior approach to the SI joint 6 (and, hence, a dysfunctional SI joint) would be substantially perpendicular to the page upon which FIG. 1A is printed.

Figure 1B:
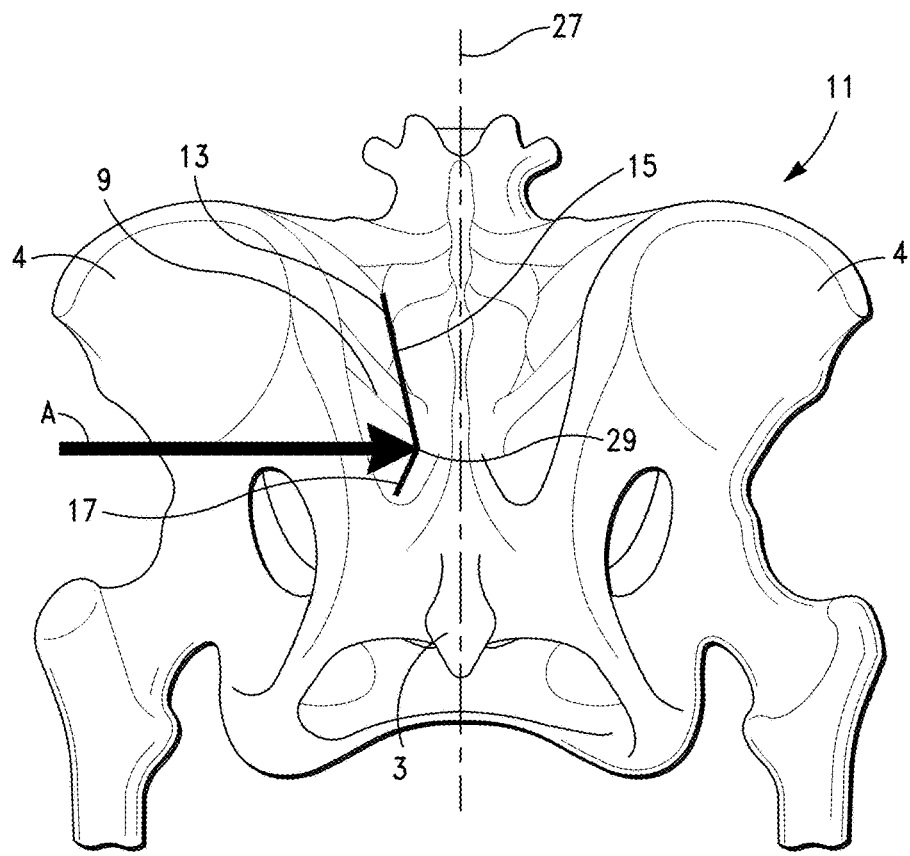
FIG. 1B is another schematic illustration of a human pelvic region from a posterior perspective showing the adjoining sacrum and ilium bone structures, and ligamentous structures thereof.
Figure 1C:
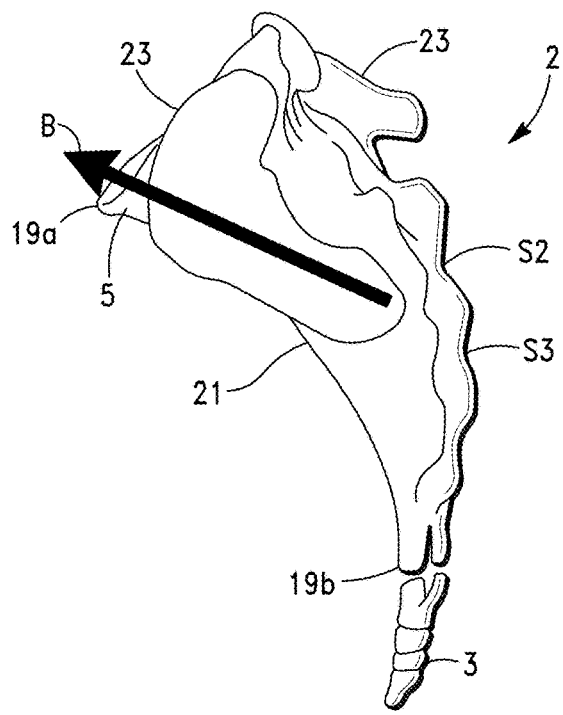
FIG. 1C is a schematic illustration of the sacrum and coccyx from a lateral perspective showing the sacral promontory and the articular surface of sacrum.
Figure 1D:
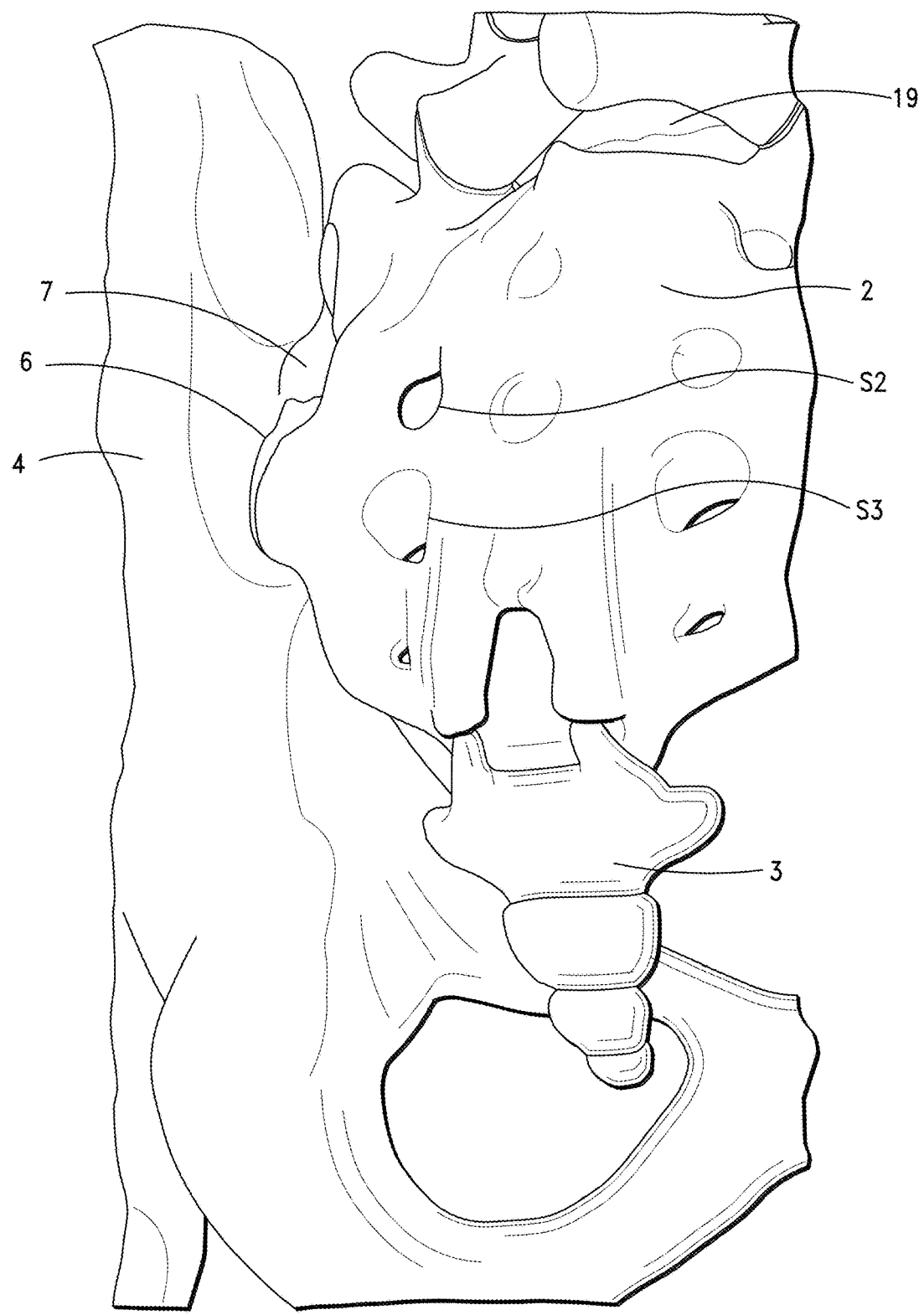
FIG. 1D is another schematic illustration of a human pelvic region from a posterior inferior perspective showing the adjoining sacrum and ilium bone structures of an SI joint, and an SI joint dorsal recess between the sacrum and ilium bone structures.
Figure 1E:
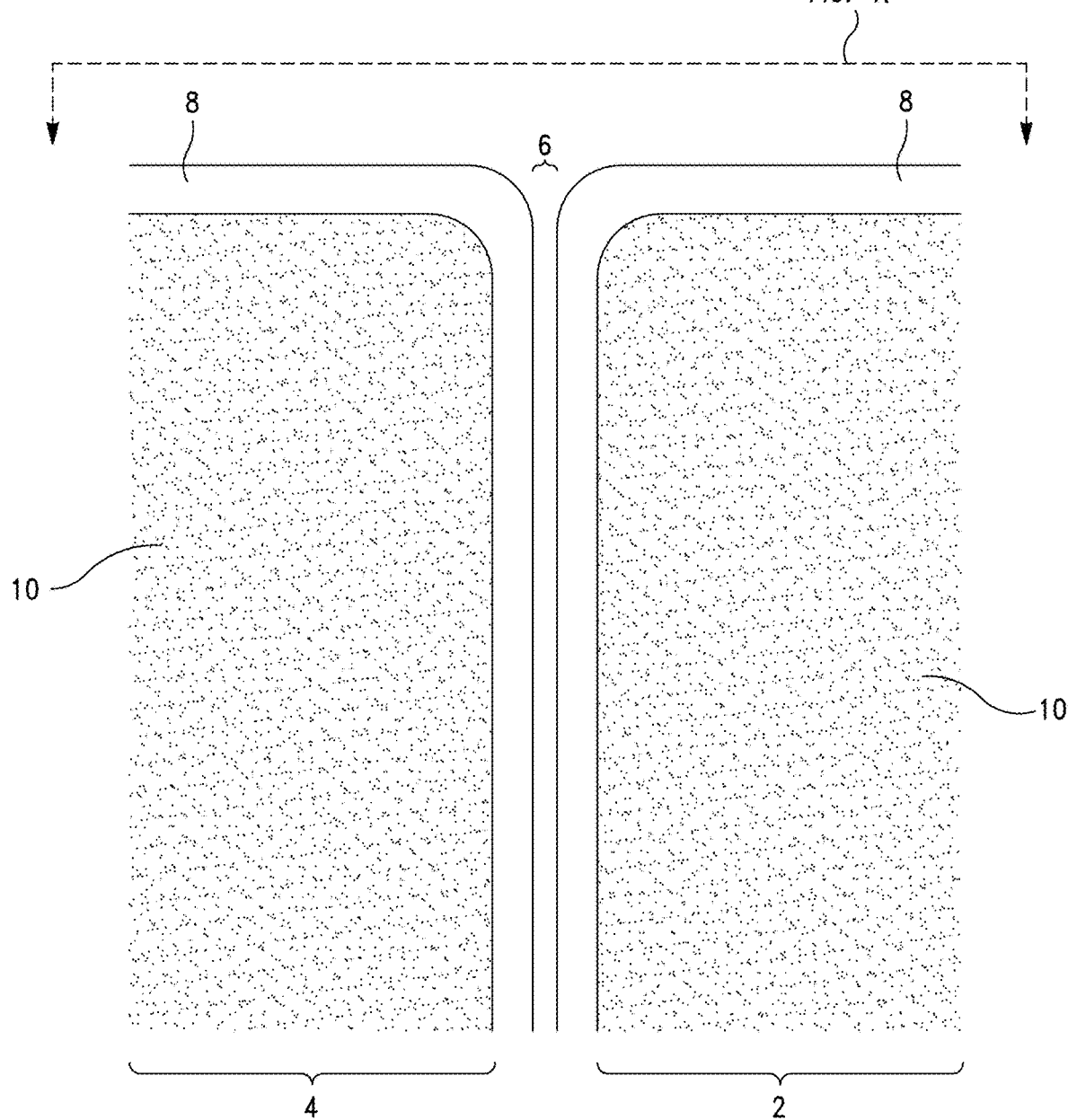
FIG. 1E is an illustration of a SI joint from a superior perspective showing the adjoining sacrum and ilium articular surfaces.

Referring now to FIG. 1E there is shown an illustration of a SI joint 6 and surrounding structures. For illustrative simplicity, a uniform layer of cortical bone 8 is shown adjacent a deeper layer of trabecular bone 10 on both of the depicted sacrum 2 and ilium 4 structures. However, in actuality, such layers are far less uniform and homogeneous.

Figure 1F:
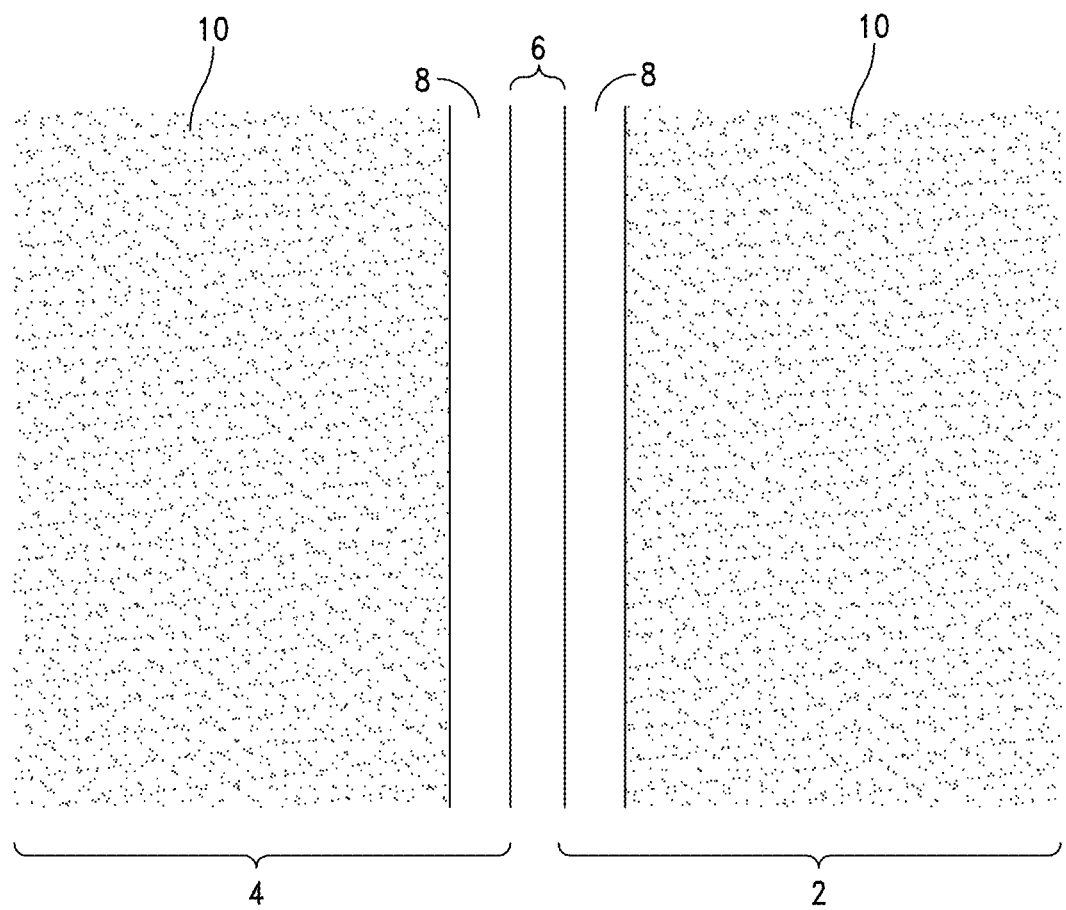
FIG. 1F is another illustration of a SI joint from a posterior perspective showing the adjoining sacrum and ilium articular surfaces.
Figure 1G:
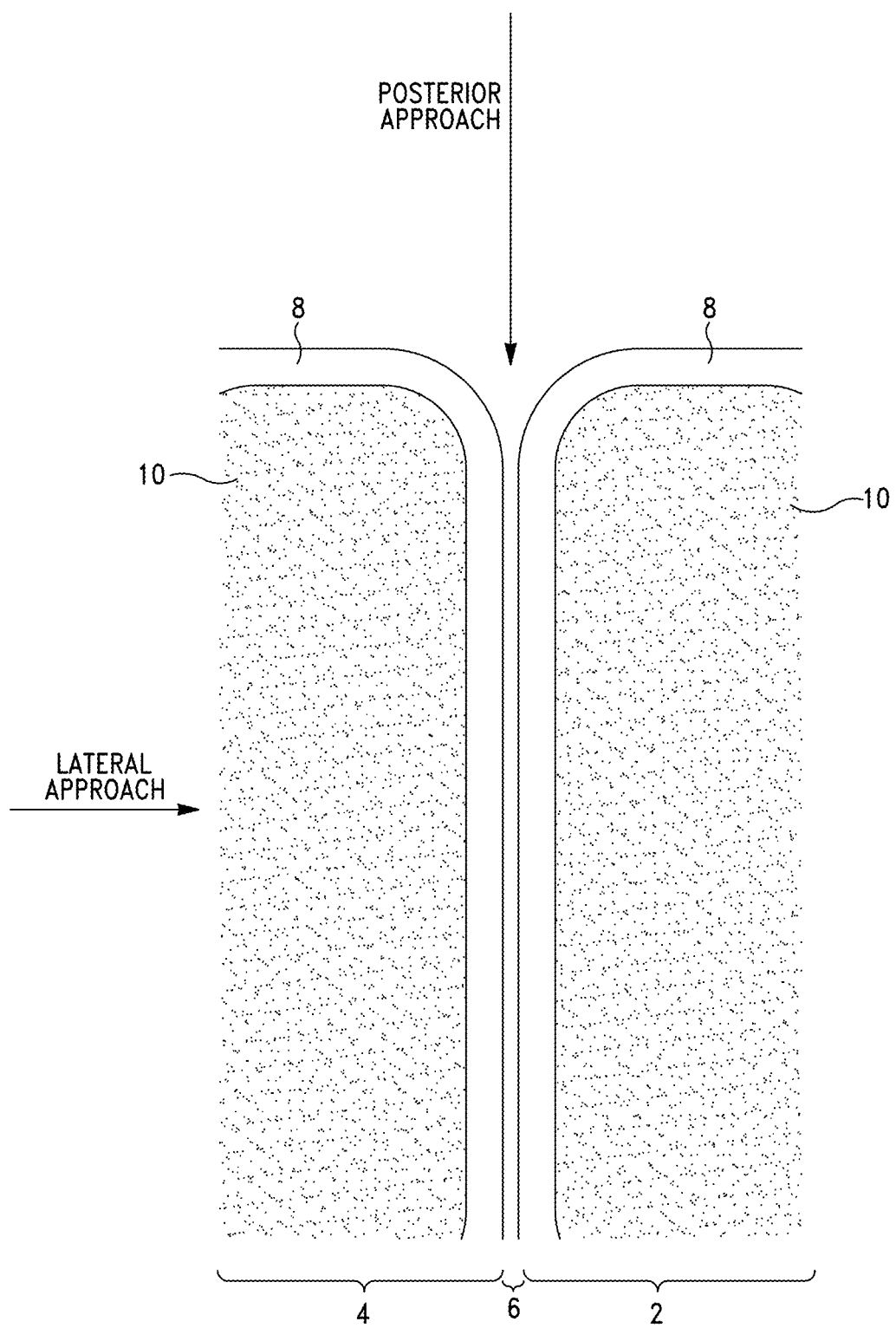
FIG. 1G is a further illustration of the SI joint shown in FIG. 1F showing lateral and posterior approaches to the SI joint, in accordance with the invention.

Referring now to FIG. 1F, there is shown a view of the same structure from a different posterior perspective. From the perspective of FIG. 1F, a posterior approach to the SI joint 6 (and, hence, a dysfunctional SI joint) would be substantially perpendicular to the page upon which FIG. 1F is printed. Indeed, referring to FIG. 1G, a variation similar to that depicted in FIG. 1E is illustrated, showing an approximate approach vector for a lateral approach to the SI joint 6 versus a posterior approach, using the orientation paradigms introduced in FIGS. 1A and 1F-1G. Such paradigms are used to illustrate various embodiments of the subject invention in various figures that follow FIGS. 1A and 1F-1G.

As indicated above, a major disadvantage associated with many conventional anterior or lateral approaches to a dysfunctional SI joint is that muscles and ligaments are typically disrupted and often damaged. Nerves and blood vessels are also susceptible to damage during such SI joint stabilization methods.

In contrast, posterior approaches to a dysfunctional SI joint; particularly, the posterior approach via the minimally-invasive SI joint stabilization methods of the invention described herein, are much less invasive. Indeed, less tissue and fewer muscles are disrupted, and nerves and large blood vessels are avoided.

In a preferred embodiment of the invention, the initial steps in the minimally-invasive SI joint stabilization methods of the invention comprise providing (i) a tool assembly configured and adapted to access the target dysfunctional SI joint via a posterior approach and create at least one pre-determined open space or defect in the dysfunctional SI joint (referred to herein after as a "pilot SI joint opening") and providing (ii) a SI joint prosthesis configured and adapted to be inserted into the pilot SI joint opening created by the tool assembly.

In a preferred embodiment of the invention, the tool assembly generally comprises an elongated guide pin (referred to as a "guide probe" in Co-pending U.S. application Ser. No. 17/463,779), a drill guide assembly and prosthesis deployment assembly.

Referring now to FIG. 2A, there is shown a preferred embodiment of a guide pin of the invention (denoted "400").

As discussed in detail below, the guide pin 400 is sized and configured to be positioned in a dysfunctional SI joint and, when positioned therein, function as (i) a guide for the drill guide assembly and, thereby, positioning of the pilot SI joint opening(s) created by the drill guide assembly, (ii) a landmark for the SI joint prosthesis to be disposed in the dysfunctional SI joint, and (ii) a guide for the prosthesis deployment assembly and, hence, SI joint prosthesis engaged thereto into the pilot SI joint opening created by the drill guide assembly and, thereby, positioning of the SI joint prosthesis in the dysfunctional SI joint.

As illustrated in FIG. 2A, the guide pin 400 comprises an elongated graduated wire or rod structure 401 comprising proximal and distal ends 402, 404 and a plurality of spaced guide pin markings 410 that extend from the distal end 404 of the guide pin 400 to preferably at least the mid-region 406 of the guide pin 401.

According to the invention, the guide pin markings 410 can comprise various distinguishable surface markings, symbols, lines and/or structural patterns and arrangements, which preferably are readily detectable and, hence, readable via a conventional image capture apparatus, such as a fluoroscope and radiography system.

As illustrated in FIG. 2B, in a preferred embodiment of the invention, the guide pin markings 410 comprise a plurality of graduated or spaced grooves or depressions in the wire structure 401. According to the invention, any number of spaced grooves, i.e., markings 410, can be employed on the wire structure 401 and, hence, guide pin 400 and can be spaced apart at any desired dimension.

As illustrated in FIG. 2A, in a preferred embodiment of the invention, the guide pin 400 includes eight (8) grooves, i.e., markings 410, which are uniformly spaced 10.0 mm apart.

As further illustrated in FIGS. 2A and 2B, in a preferred embodiment, the distal end 404 of the guide pin 400 comprises a pointed configuration 412 to facilitate entry of the distal end 404 of the guide pin 400 into and through tissue, articular cartilage and SI joint bone structures.

Referring now to FIGS. 3A-3L, there is shown a preferred embodiment of a drill guide assembly 500 of the invention.

In a preferred embodiment, the drill guide assembly 500 is configured and adapted to create pre-determined pilot SI joint openings in a SI joint, including a dysfunctional SI joint, to accommodate placement of a SI joint prosthesis of the invention therein.

Figure 3A:
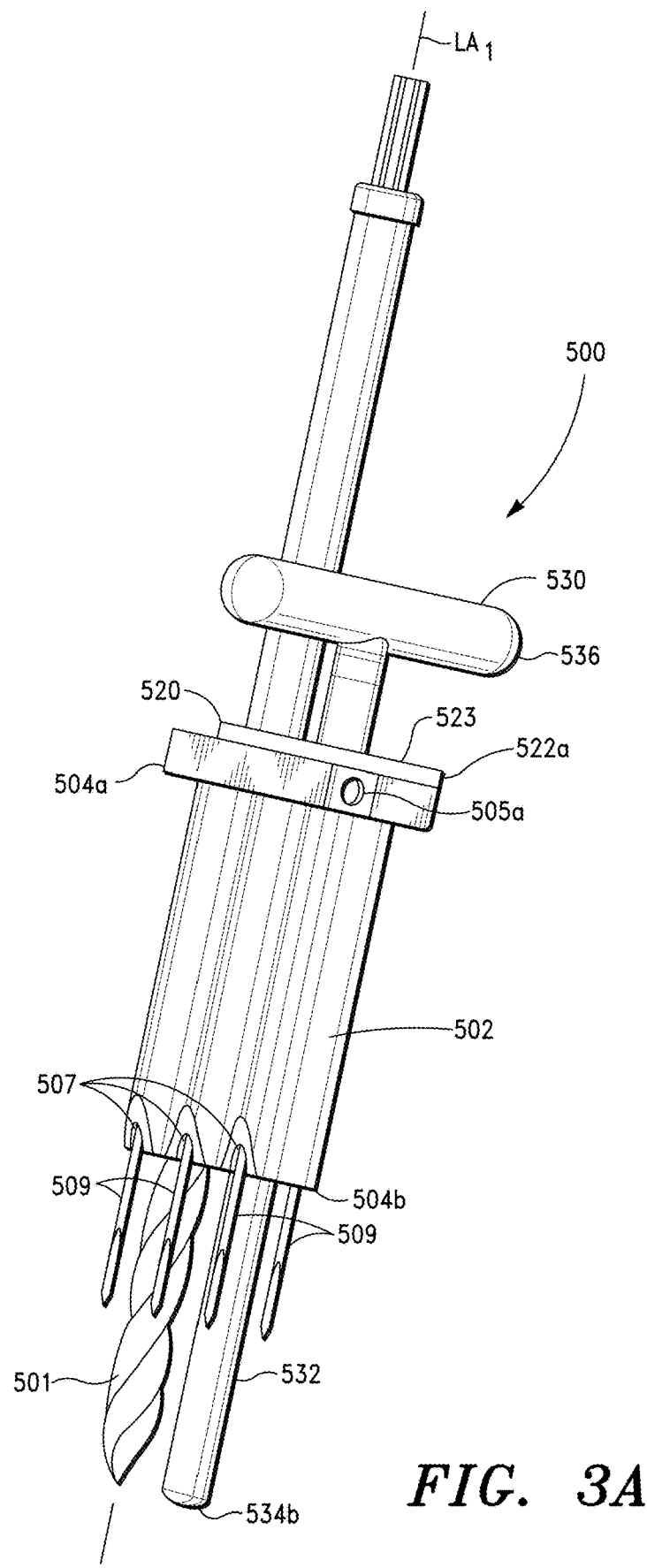
FIG. 3A is a perspective view of one embodiment of drill guide assembly, in accordance with the invention.

As illustrated in FIG. 3A, the drill guide assembly 500 generally comprises an access sleeve 502, a drill guide 520, a bone dislodging apparatus 501, and a drill alignment pin 530.

Figure 3B:
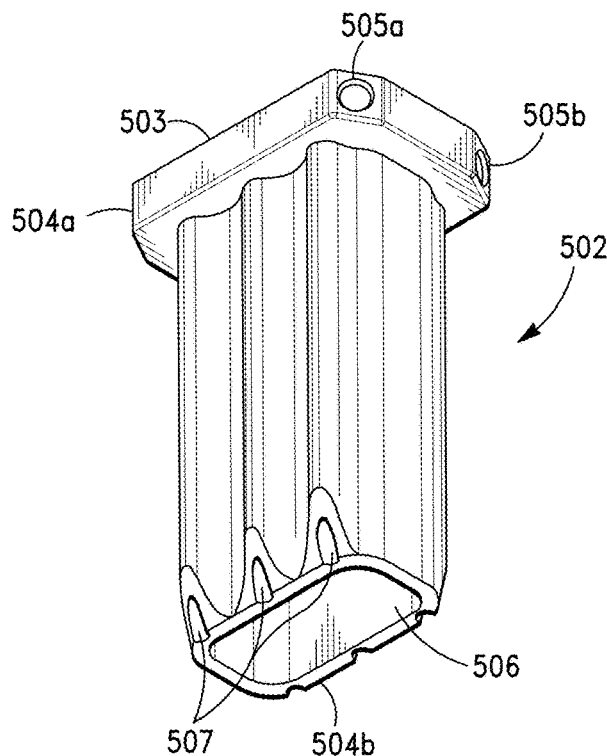
FIG. 3B is a perspective view of the access sleeve of the drill guide assembly shown in FIG. 3A, in accordance with the invention.
Figure 3C:
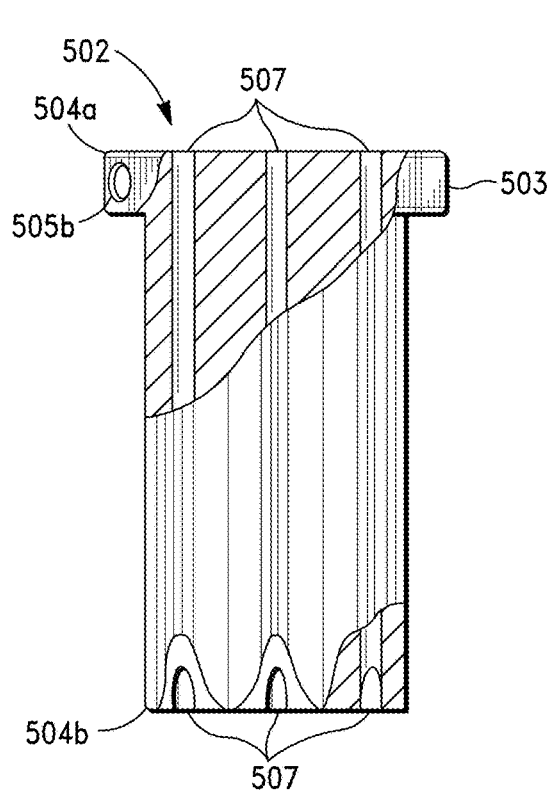
FIG. 3C is a front plan view of the access sleeve shown in FIG. 3B, in accordance with the invention.
Figure 3D:
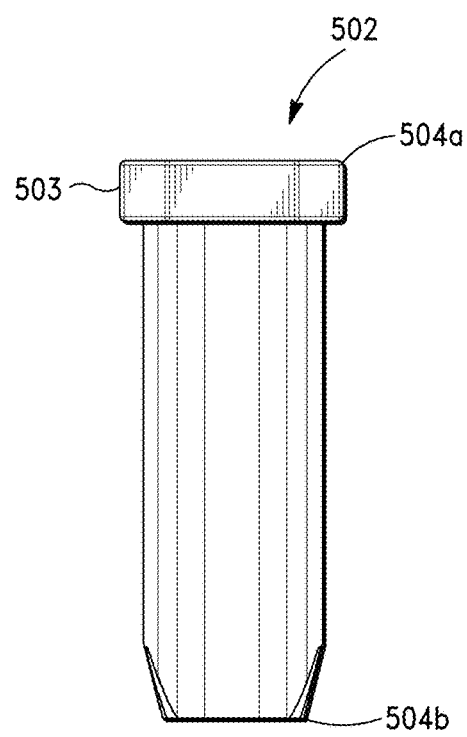
FIG. 3D is a right-side plan view of the access sleeve shown in FIG. 3B, in accordance with the invention.

Referring now to FIGS. 3B-3D, there is shown a preferred embodiment of the access sleeve 502.

As discussed in detail in Co-pending U.S. application Ser. No. 17/463,779 and illustrated in FIGS. 3B-3D, the access sleeve 502 comprises proximal and distal ends 504a, 504b, an internal opening 506 that extends from the proximal end 504a to the distal end 504b of the access sleeve 502, and a plurality of lumens 507, which, as illustrated in FIG. 3A, are sized and configured to receive and position Kirschner wires (K-wires) 509 or similar pin structures therein.

As further illustrated in FIG. 3A, in a preferred embodiment, the access sleeve internal opening 506 is sized and configured to receive and position the drill guide 520 therein.

As further illustrated in FIGS. 3B and 3D, the proximal end 504a of the access sleeve 502 comprises a planar region 503, which, as illustrated in FIG. 3A, is configured to seat the proximal end 522a of the drill guide 520 (discussed below) thereon.

In a preferred embodiment, as additionally shown in FIGS. 3B and 3D, the proximal end 504a of the access sleeve 502, i.e., planar region 503, further comprises two (2) threaded holes 505a, 505b, which are preferably disposed on opposing edge regions of the planar region 503.

According to the invention, the threaded holes 505a, 505b are sized and configured to receive the threaded end 514 of the access sleeve handle 510, discussed below.

Figure 3F:
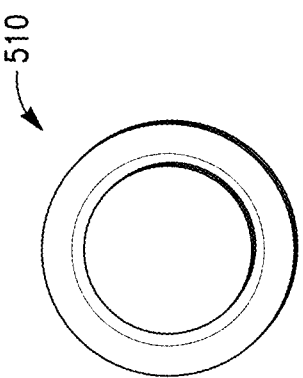
FIG. 3F is an end plan view of the access sleeve handle shown in FIG. 3E, in accordance with the invention.
Figure 3E:
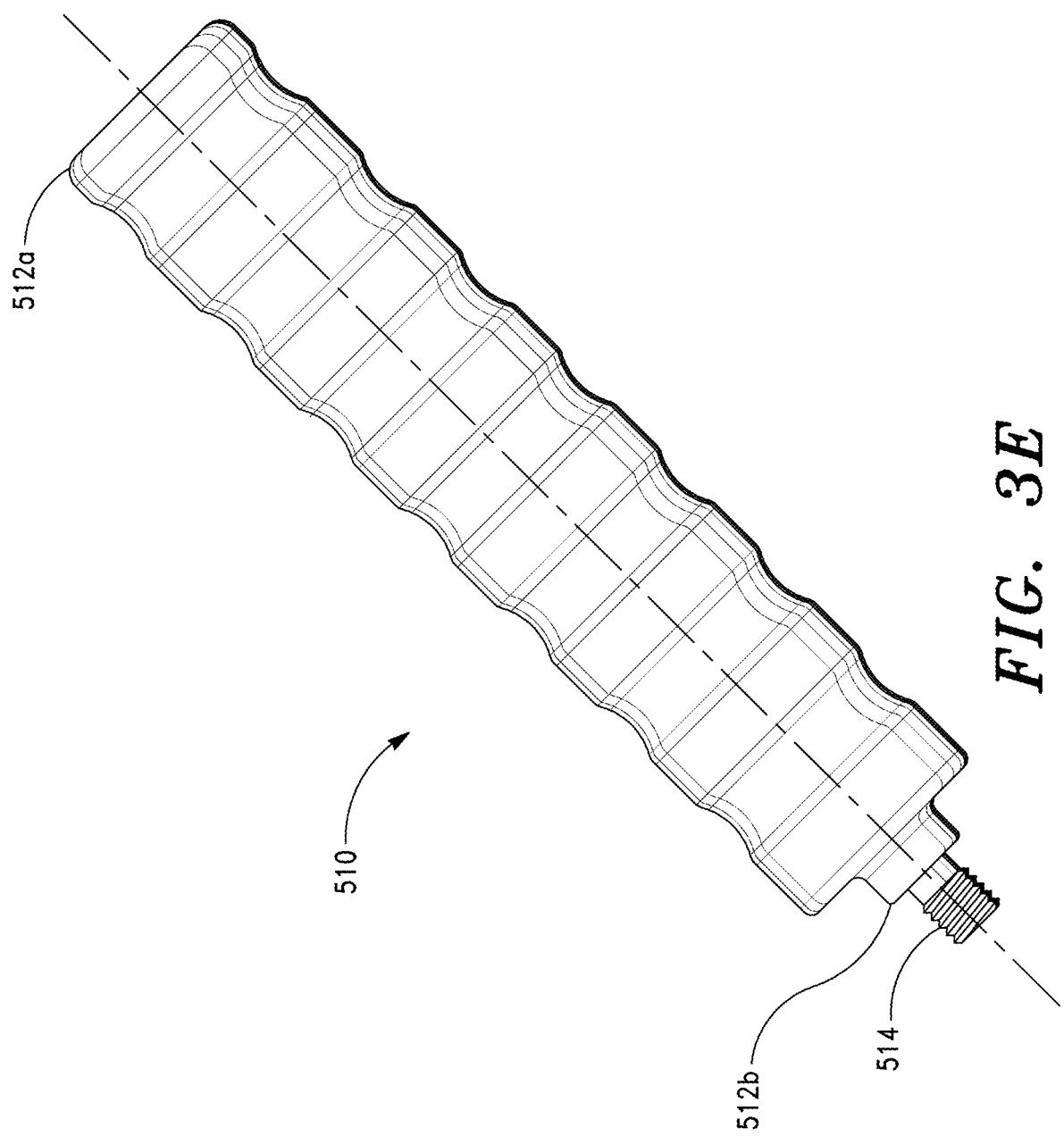
FIG. 3E is a perspective view of one embodiment of an access sleeve handle that is configured to engage the access sleeve shown in FIG. 3B, in accordance with the invention.
Figure 3H:
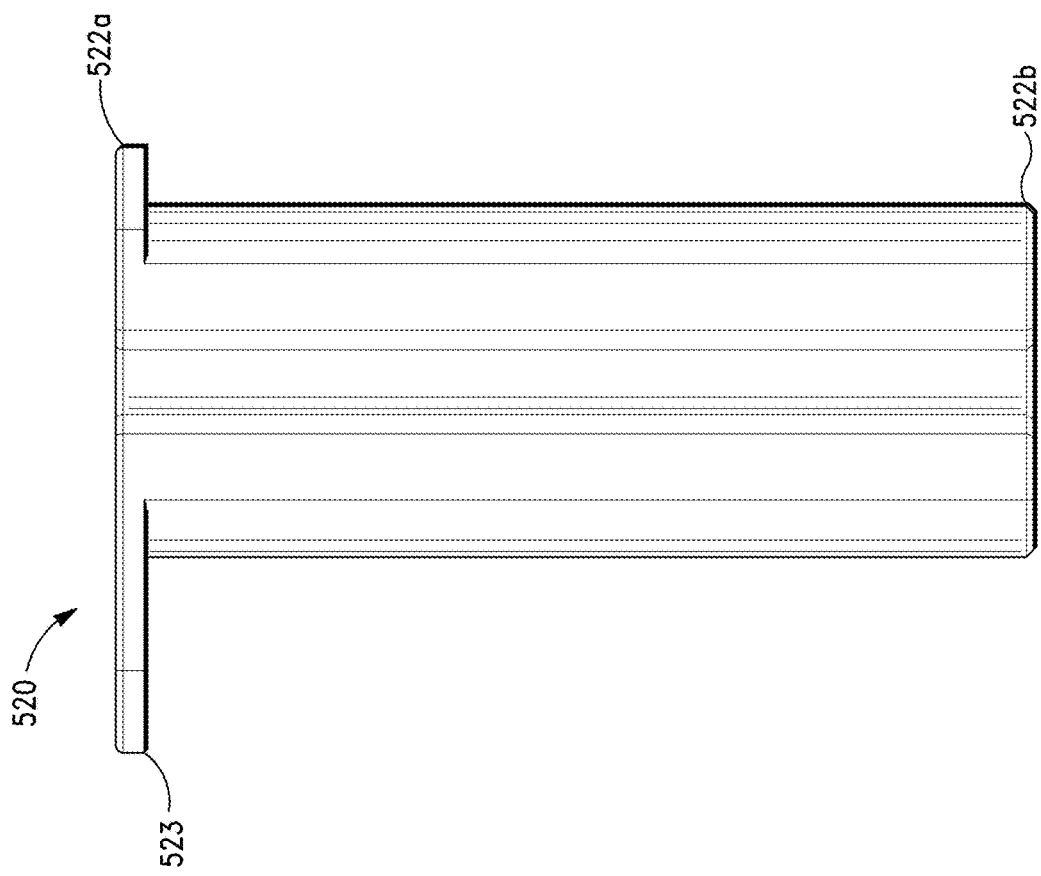
FIG. 3H is a front plan view of the drill guide shown in FIG. 3G, in accordance with the invention.
Figure 3G:
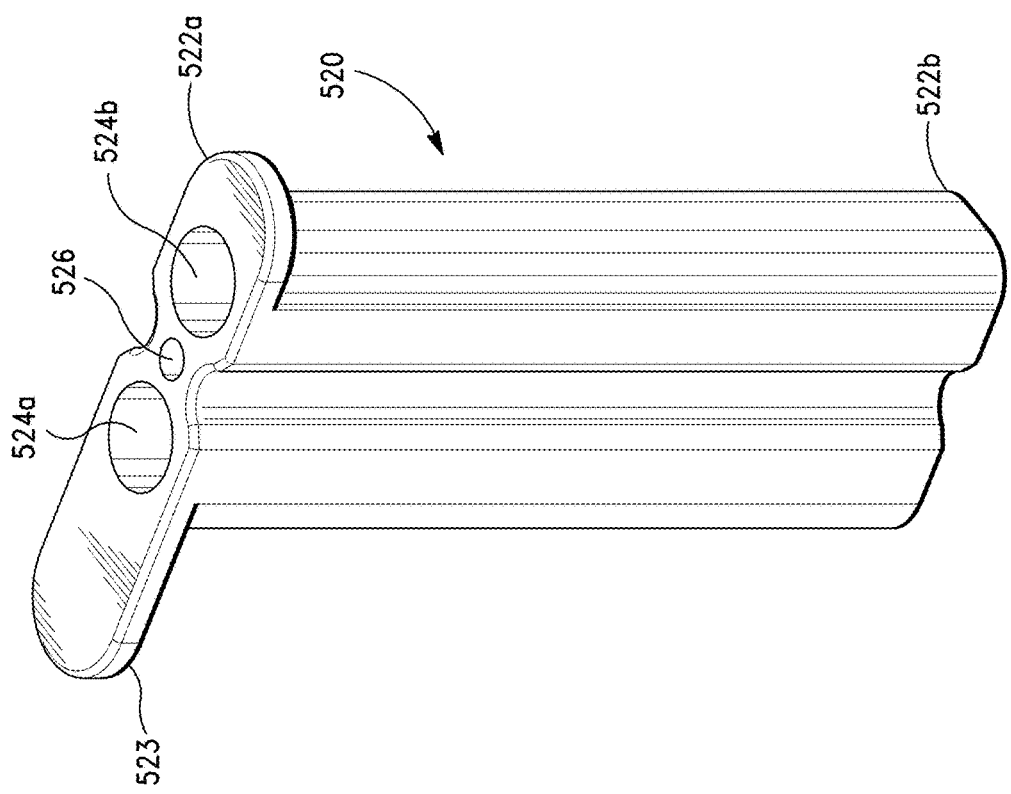
FIG. 3G is a perspective view the drill guide of the drill guide assembly shown in FIG. 3A, in accordance with the invention.
Figure 3I:
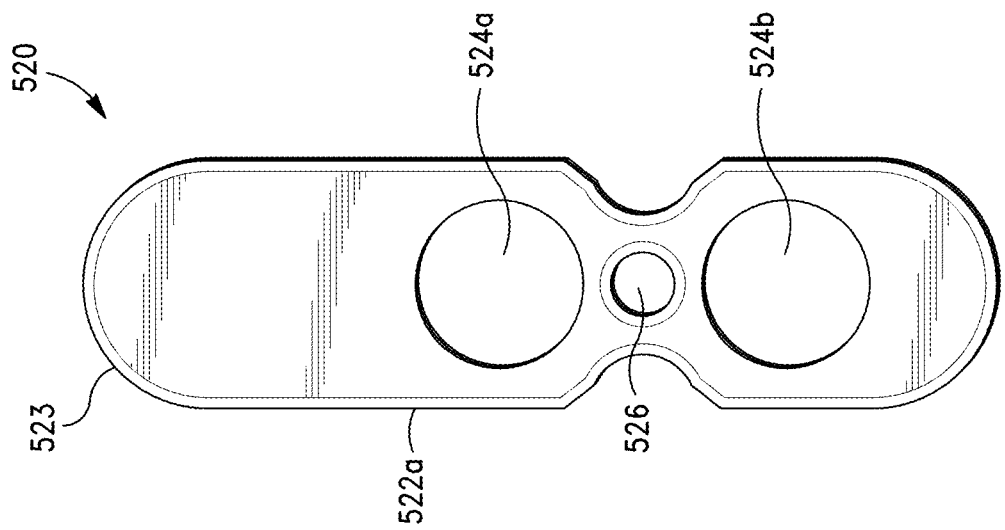
FIG. 3I is a top plan view of the drill guide shown in FIG. 3G, in accordance with the invention.
Figure 3J:
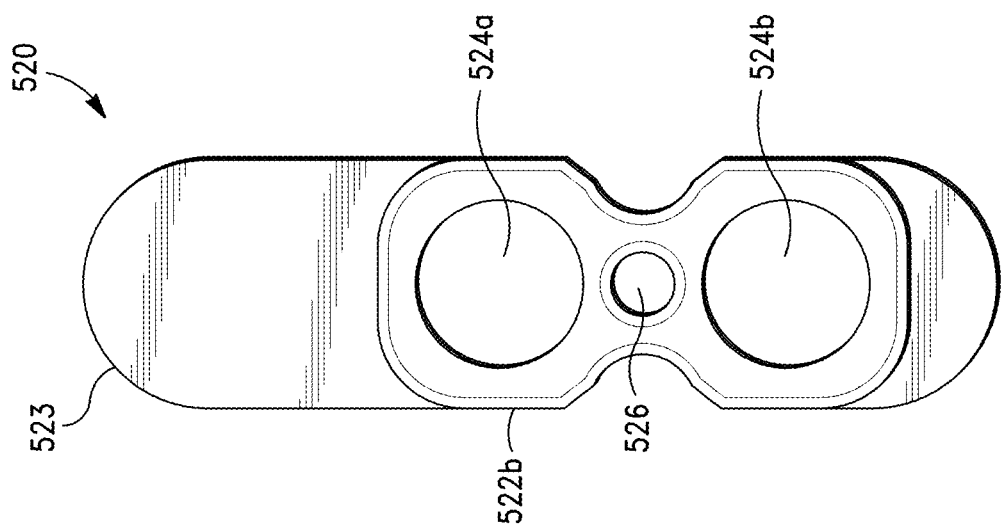
FIG. 3J is a bottom plan view of the drill guide shown in FIG. 3G, in accordance with the invention.

Referring now to FIGS. 3E and 3F, there is shown a preferred embodiment of the access sleeve handle 510.

As illustrated in FIGS. 3E and 3F, the access sleeve handle 510 preferably comprises an elongated cylindrical shaped member comprising proximal and distal ends 512a, 512b.

As further illustrated in FIG. 3E, in a preferred embodiment, the distal end 512b of the access sleeve handle 510 comprises a threaded extension 514 that is sized and configured to cooperate with the threaded holes 505a, 505b of the access sleeve 502, whereby the access sleeve handle 510 can be threadably engaged to the access sleeve 502.

Referring now to FIGS. 3G-3J, there is shown a preferred embodiment of the drill guide 520.

As illustrated in FIGS. 3G-3J, the drill guide 520 comprises proximal and distal ends 522a, 522b, a pair of drill guide lumens 524a, 524b and a drill guide medial lumen 526; the drill guide lumens 524a, 524b and drill guide medial lumen 526 extending from the proximal end 522a to the distal end 522b of the drill guide 520.

Figure 3L:
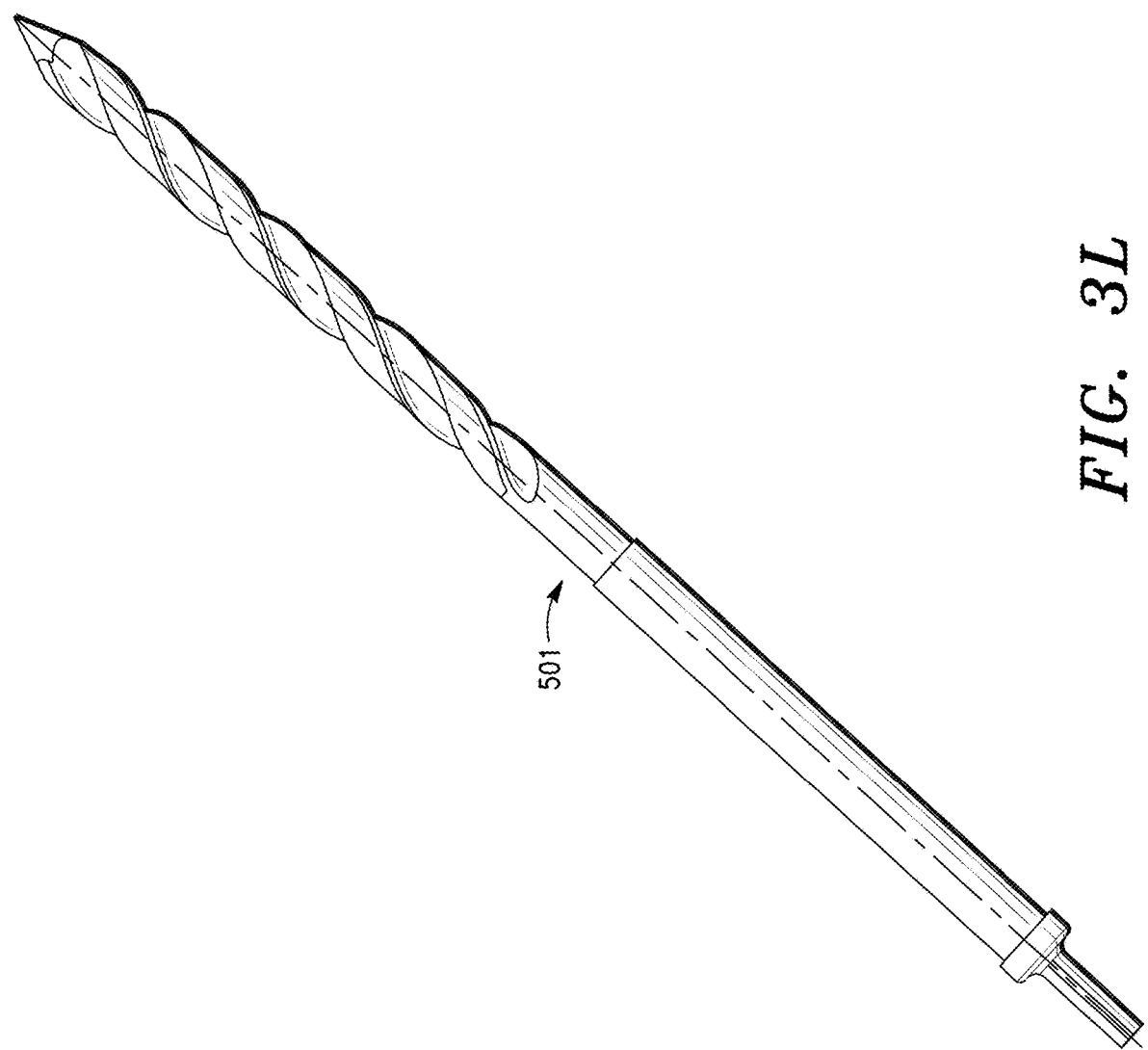
FIG. 3L is a perspective view of the bone dislodging apparatus, i.e., drill bit, shown in FIG. 3A, in accordance with the invention.

As illustrated in FIG. 3A, in a preferred embodiment, the drill guide lumens 524a, 524b are sized and configured to receive (i) the bone dislodging apparatus of the invention 501, in this instance, a drill bit, as shown in FIGS. 3A and 3L, and (ii) the drill alignment pin 530 shown in FIG. 3K and discussed below.

As set forth in Co-pending U.S. application Ser. No. 17/463,779, according to the invention, the drill bit 501 can operate with various conventional manual, pneumatic and/or electromechanical tools, such as a conventional surgical drill.

In a preferred embodiment, the drill guide medial lumen 526 is sized and configured to receive and guide the guide pin 400 of the invention to a desired position proximate the dysfunctional SI joint.

According to the invention, the drill guide internal lumens 524a, 524b and drill guide medial lumen 526 can also be sized and configured to receive various other suitable instruments, such as surgical scopes, center punches, location pins, drill probes and drill stop assemblies, to facilitate the creation of a pilot SI joint opening.

Referring back to FIGS. 3G and 3H, in a preferred embodiment, the proximal end 522a of the drill guide 520 comprises a planar configuration comprising an extended region 523, which, as illustrated in FIG. 3A, is sized and configured to abut the proximal end 504a of the access sleeve 502 to position the drill guide 520 therein.

Figure 3K:
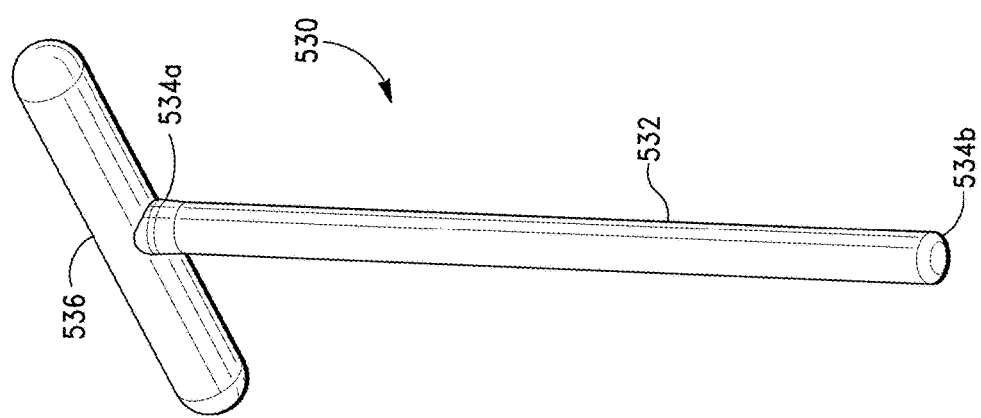
FIG. 3K is a perspective view of the drill alignment pin of the drill guide assembly shown in FIG. 3A, in accordance with the invention.

Referring now to FIG. 3K, there is shown one embodiment of a drill alignment pin 530 of the drill guide 520.

As illustrated in FIG. 3K, the drill alignment pin 530 preferably comprises an elongated guide member 532 comprising proximal and distal ends 534a, 534b. The drill alignment pin 530 further comprises a handle 536 that is operatively connected to the proximal end 534a of the guide member 532.

As indicated above, in a preferred embodiment, the drill guide assembly 500, i.e., defect creation assembly, is configured and adapted to create pilot SI joint openings in SI joint bone structures to accommodate placement of a SI joint prosthesis of the invention therein.

As set forth in Co-pending U.S. application Ser. No. 17/463,779, it is however, to be understood that the drill guide assembly 500, described herein, is but one embodiment of a defect creation assembly that can be employed within the scope of the invention to create pilot SI joint openings in SI joint bone structures.

As further set forth in Co-pending U.S. application Ser. No. 17/463,779, in some embodiments, a thin layer of cortical bone preferably remains at least in some aspects of a pilot SI joint opening to define the opening volume. In some embodiments, the cortical bone is substantially removed, leaving trabecular bone to substantially define the pilot SI joint opening volume.

As additionally set forth in Co-pending U.S. application Ser. No. 17/463,779, the drill guide assembly 500 is configured and adapted to create pilot SI joint openings in SI joint bone structures of various sizes and configurations.

Figure 4A:
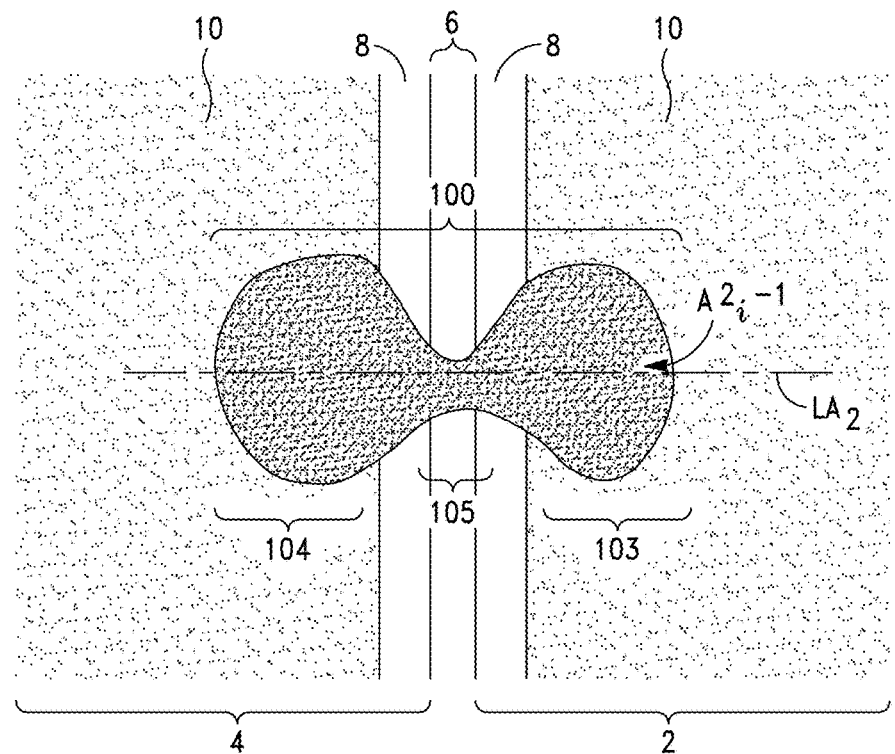
FIG. 4A is a further illustration of the SI joint shown in FIG. 2B showing one embodiment of a pilot SI joint opening, in accordance with the invention.

Referring now to FIG. 4A, there is shown one embodiment of a pilot SI joint opening of the invention (denoted "100") that can be created with the defect creation assemblies of the invention; particularly, the drill guide assembly 500.

As illustrated in FIG. 4A, the pilot SI joint opening 100 comprises a three-dimensional opening comprising first and second lobe regions 103, 104; the first lobe region 103 being disposed in the sacrum 2 and comprising a sacrum opening three-dimensional shape, and the second lobe region 104 being disposed in the ilium 4 and comprising an ilium opening three-dimensional shape.

As further illustrated in FIG. 4A, the three-dimensional pilot SI joint opening 100 further comprises an SI joint opening cross-sectional shape in a plane that intersects the sacrum 2 and ilium 4; the plane being substantially perpendicular to the longitudinal axis $LA_1$ of the drill guide assembly 500 when the drill guide assembly 500 and, hence, drill bit 501, is disposed in a defect creation position in the dysfunctional SI joint. The three-dimensional pilot SI joint opening cross-sectional shape thus comprises the sacrum opening three-dimensional shape and ilium opening three-dimensional shape.

In some embodiments, the pilot SI joint opening cross-sectional shape (i.e., pilot SI joint opening 100) is defined in part by at least one noncircular cross-sectional shaped region (denoted "105") in the noted plane.

As additionally illustrated in FIG. 4A, the three-dimensional pilot SI joint opening 100, i.e., cross-sectional shape thereof, also defines a cross-sectional area of the three-dimensional pilot SI joint opening cross-sectional shape (denoted "$A^2_i\text{-}1$").

The three-dimensional pilot SI joint opening 100, i.e., cross-sectional shape thereof, also comprises a longitudinal axis (denoted "$LA_2$") in the plane that intersects the sacrum 2 and ilium 4 and an initial pilot SI joint opening length along the axis $LA_2$.

Figure 4B:
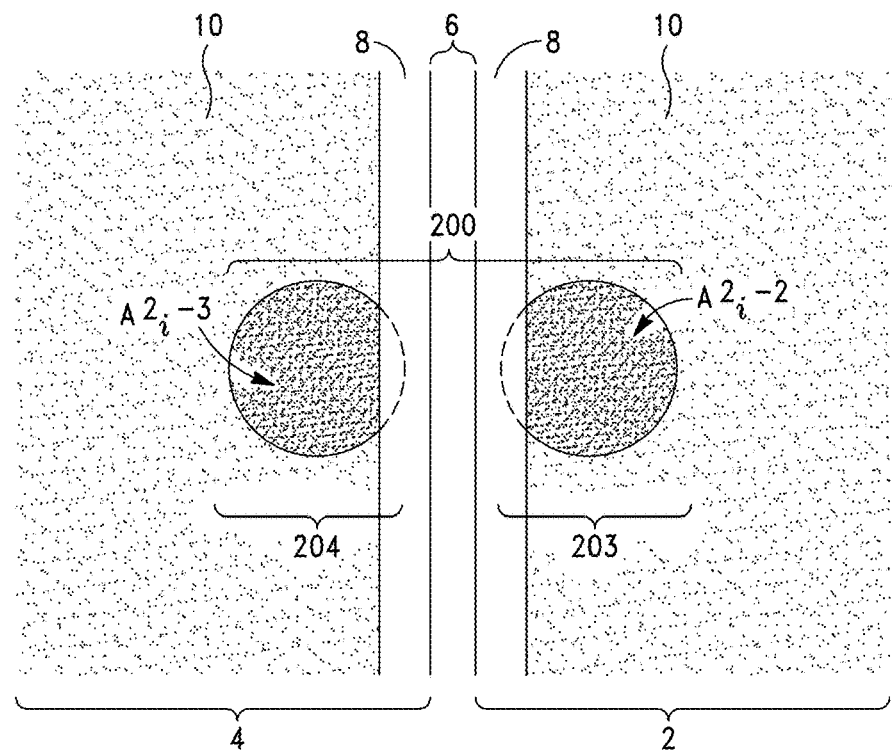
FIGS. 4B and 4C are illustrations of further embodiments of SI joint openings, in accordance with the invention.

Referring now to FIG. 4B, there is shown a further pilot SI joint opening of the invention (denoted "200") that can be created with a defect creation assembly of the invention.

As illustrated in FIG. 4B, the pilot SI joint opening 200 comprises two three-dimensional pilot or guide portions or regions 203, 204; the first guide portion 203 being disposed in the sacrum 2 and the second guide portion 204 being disposed in the ilium 4.

According to the invention, the sacrum and ilium guide portions 203, 204 can comprise various configurations, e.g., cross-sectional shapes, and sizes to, as discussed in detail below, accommodate insertion of defined regions of a prosthesis of the invention therein and transition of the sacrum and ilium guide portions 203, 204 from pilot or first configurations and sizes to expanded second configurations and sizes when the prosthesis is inserted therein.

According to the invention, the sacrum and ilium guide portions 203, 204 can also be disposed at various locations in the sacrum 2 and ilium 4. In some embodiments, the sacrum and ilium guide portions 203, 204 are disposed in the sacrum 2 and ilium 4 such that at least a portion of the sacrum and ilium guide portions 203, 204 extends into the cortical bone 8 of the SI joint structures, i.e., sacrum 2 and ilium 4, as shown in FIG. 4B, or the juncture between the sacrum 2 and ilium 4.

Figure 4C:
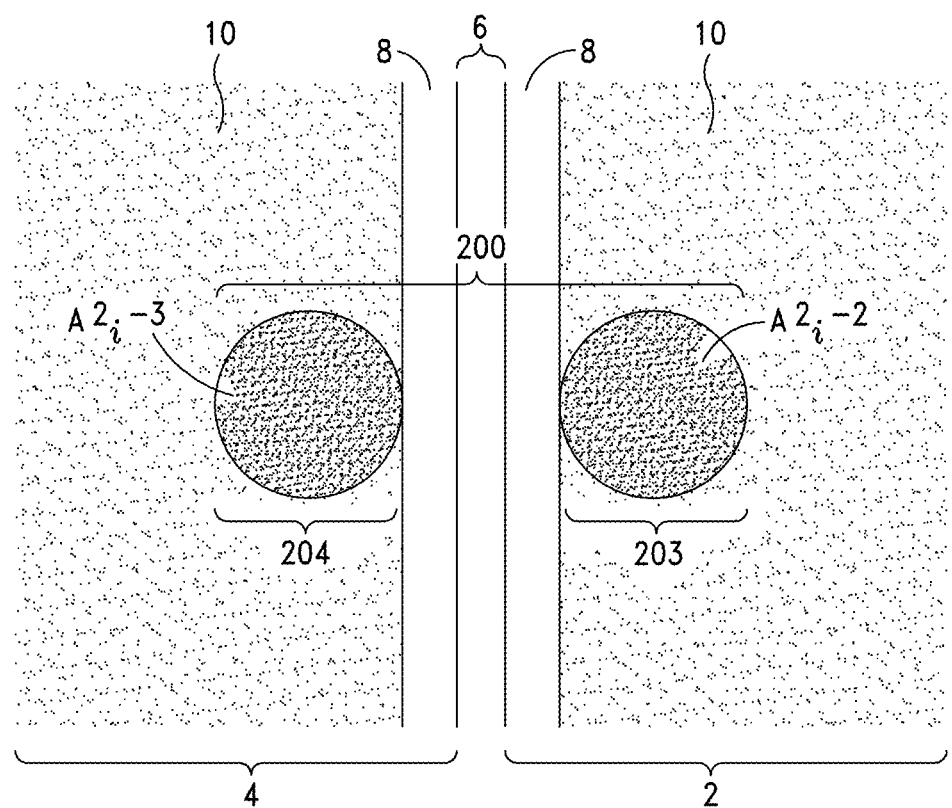

In some embodiments, the sacrum and ilium guide portions 203, 204 are solely disposed in the sacrum 2 and ilium 4, as shown in FIG. 4C.

As illustrated in FIG. 4B, in one preferred embodiment, the sacrum and ilium guide portions 203, 204 comprise substantially circular cross-sectional shapes.

As further illustrated in FIG. 4B, the sacrum and ilium guide portions 203, 204 of the pilot SI joint opening 200, i.e., cross-sectional shape thereof, define cross-sectional areas of the sacrum and ilium guide portions 203, 204 (denoted "$A^2_i$-2" and "$A^2_i$-3", respectively).

In a preferred embodiment, the sacrum and ilium guide portions 203, 204 of the pilot SI joint opening 200 are disposed on a plane that similarly intersects the sacrum 2 and ilium 4.

Figures 5C, 5D, 5E:
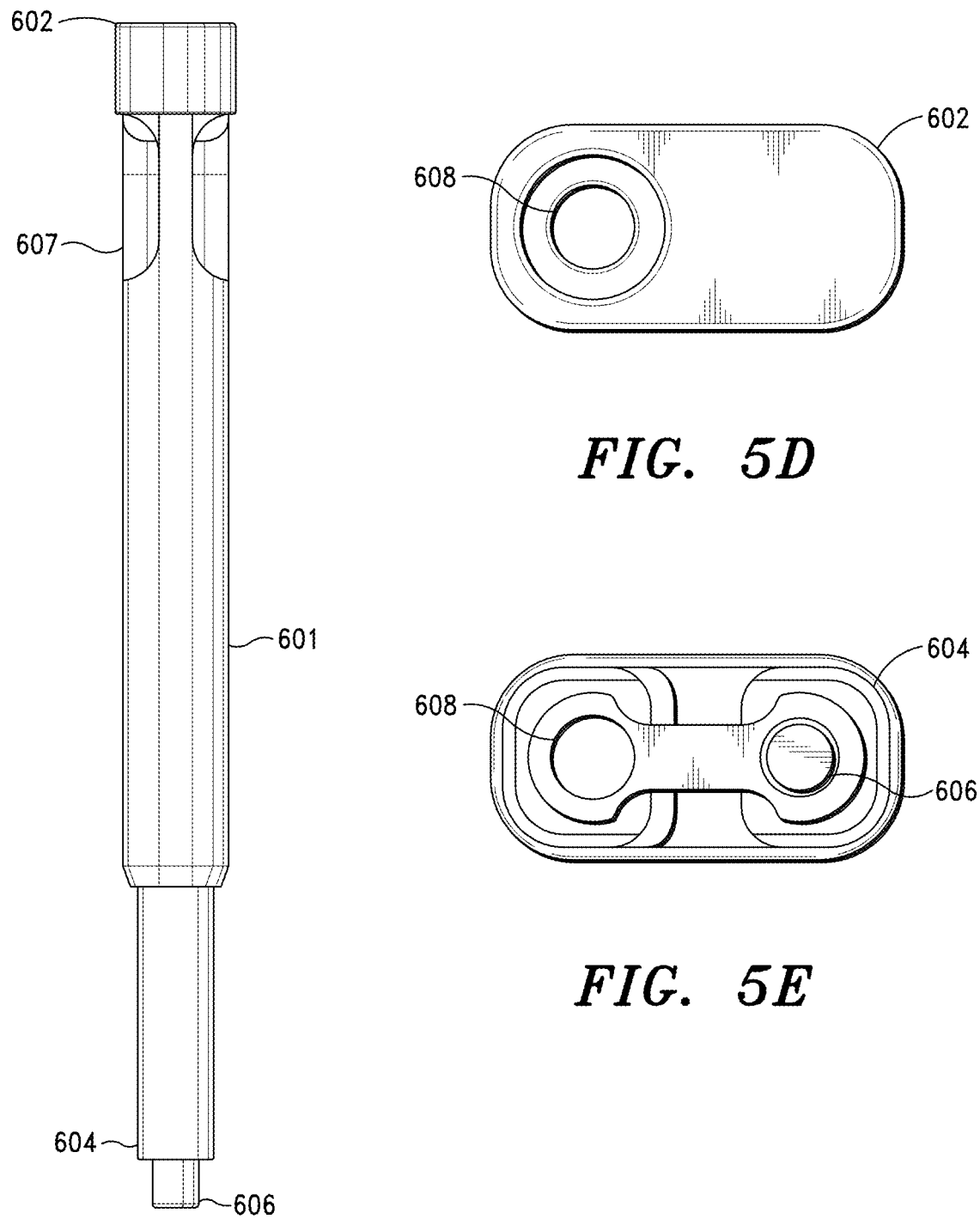
FIG. 5C is a left side plan view of the prosthesis deployment assembly shown in FIG. 5A, in accordance with the invention.
FIG. 5D is a top plan view of the prosthesis deployment assembly shown in FIG. 5A, in accordance with the invention.
FIG. 5E is a bottom plan view of the prosthesis deployment assembly shown in FIG. 5A, in accordance with the invention.
Figure 5F:
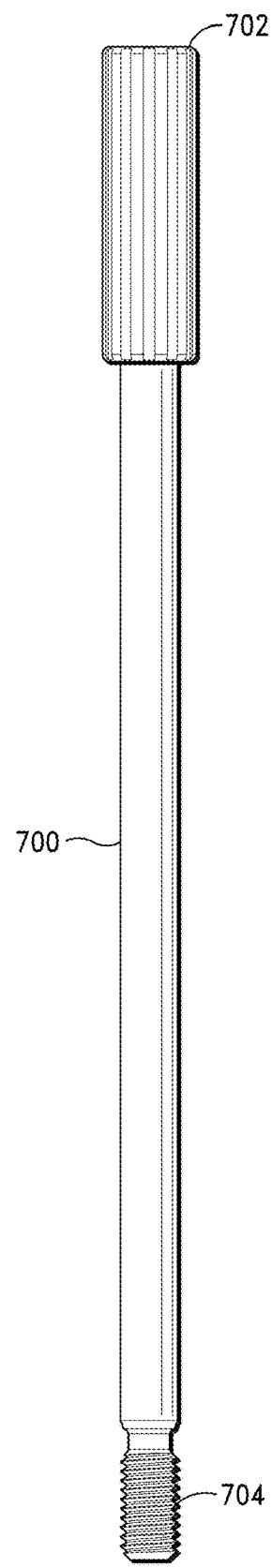
FIG. 5F is a front plan view of a prosthesis engagement rod of the prosthesis deployment assembly shown in FIG. 5A, in accordance with the invention.
Figure 5G:
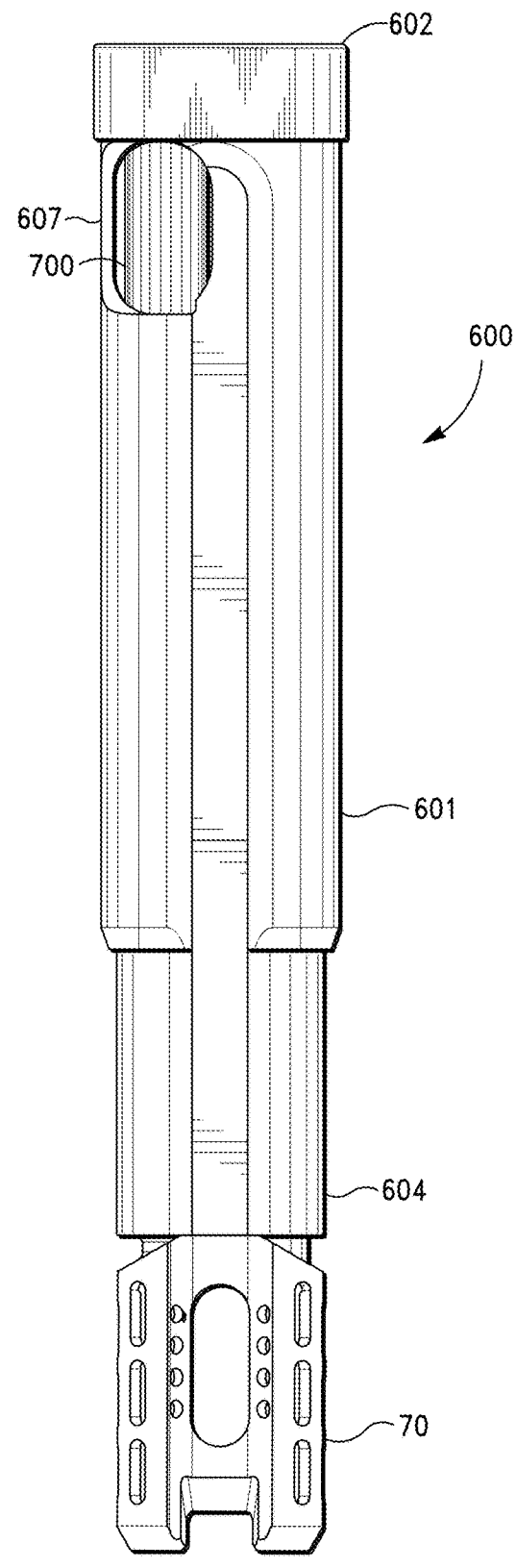
FIG. 5G is a perspective view of the prosthesis deployment assembly shown in FIG. 5A engaged to a prosthesis of the invention, in accordance with the invention.

Referring now to FIGS. 5A-5G, there is shown a preferred embodiment of a prosthesis deployment assembly of the invention (denoted "600" in FIG. 5G).

As illustrated in FIG. 5G, in a preferred embodiment, the prosthesis deployment assembly 600 comprises prosthesis engagement means that is configured and adapted to connect the prosthesis deployment assembly 600 to SI joint prostheses of the invention; particularly, SI joint prosthesis 70 shown in FIG. 5G, and guide the prostheses into pilot SI joint openings created by the drill guide assembly 500.

As illustrated in FIGS. 5A-5C, the prosthesis deployment assembly 600 comprises an elongated guide member 601 comprising proximal and distal ends 602, 604.

As further illustrated in FIGS. 5B and 5E, the elongated guide member 601 further comprises a prosthesis guide pin 606 that extends from the guide member distal end 604. As discussed in detail below and shown in FIG. 5G, the prosthesis guide pin 606 is sized and configured to seat in an internal prosthesis engagement member lumen 86a or 86b of the preferred SI joint prosthesis 70 of the invention.

As illustrated in FIGS. 5A, 5D and 5E, the elongated guide member 601 further comprises an internal lumen 608 that extends from the proximal end 602 of the elongated guide member 601 to the distal end 604 of the elongated guide member 601.

As illustrated in FIG. 5G, in a preferred embodiment of the invention, the internal lumen 608 is sized and configured to receive the prosthesis engagement rod 700 (i.e., prosthesis engagement means) of the prosthesis deployment assembly 600, discussed below.

Referring now to FIG. 5F, there is shown a preferred embodiment of a prosthesis engagement rod 700 of the invention. As illustrated in FIG. 5F, the prosthesis engagement rod 700 comprises a proximal end 702 and a threaded distal end 704, which, as discussed in detail below, is sized and configured to threadably engage an internal prosthesis engagement member lumen of a SI joint prosthesis of the invention, e.g., internal prosthesis engagement member lumens 86a and/or 86b of prosthesis 70.

As further illustrated in FIG. 5F, in a preferred embodiment, the proximal end 702 of the prosthesis engagement rod 700 comprises a knurled configuration to facilitate threading the prosthesis engagement rod 700 into an internal prosthesis engagement member lumen of a SI joint prosthesis of the invention.

Referring back to FIGS. 5A and 5B, to further facilitate threading the prosthesis engagement rod 700 into an internal prosthesis engagement member lumen of a SI joint prosthesis of the invention, in a preferred embodiment, the elongated guide member 601 further comprises an access port 607 that provides access to the knurled proximal end 602 of the prosthesis engagement rod 700 when positioned in the internal lumen 608 of the elongated guide member 601, as shown in FIG. 5G.

In a preferred embodiment, the SI joint prosthesis is configured and adapted to be inserted into, more preferably, press-fit into, i.e., interference engagement to, a pilot SI joint opening in a SI joint that is created by the drill guide assembly 500, and into and through articular cartilage and cortical bone 8 (and, in some instances, trabecular bone 10), which define the SI joint.

According to the invention, various suitable SI joint prostheses, such as the prostheses illustrated in FIGS. 12A-12C, 13A-13B, 14A-14C and 15A-15D of Co-pending U.S. application Ser. No. 13/857,977, are suitable for insertion into pilot SI joint openings of the invention (i.e., SI joint openings 100, 200 described above) in a SI joint created by the drill guide assembly 500, and into and through articular cartilage and cortical bone 8 (and trabecular bone 10), which define the SI joint.

Referring now to FIGS. 6A-6I, there is shown a preferred SI joint prosthesis (denoted "70") of the invention, which is particularly suitable for placement in pilot SI joint openings of the invention in a SI joint, and into and through articular cartilage and bone structures (i.e., cortical and trabecular bone 8, 10), which define the SI joint.

Figure 6A:
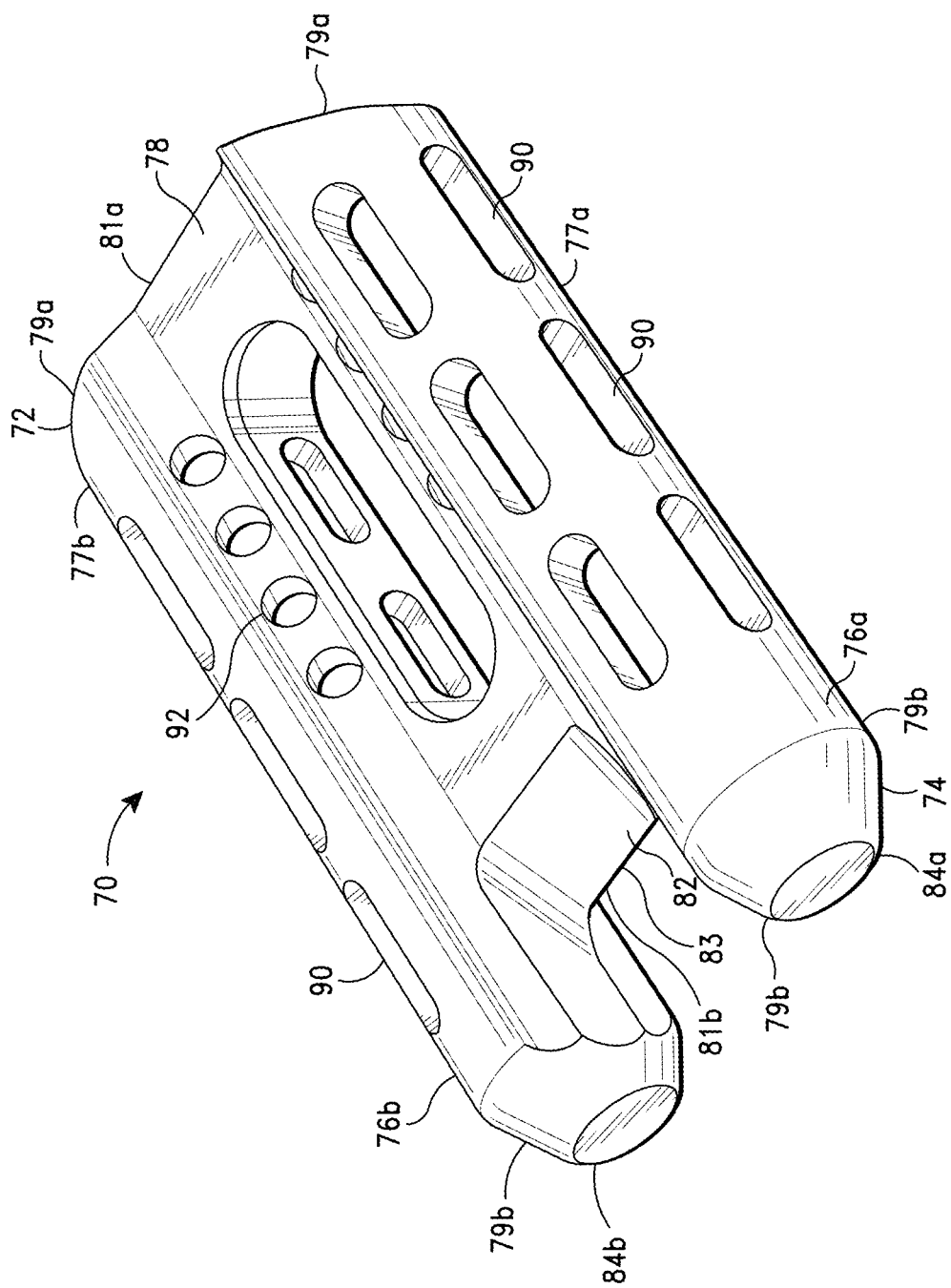
FIG. 6A is a perspective view of one embodiment of a SI joint prosthesis, in accordance with the invention.
Figure 6B:
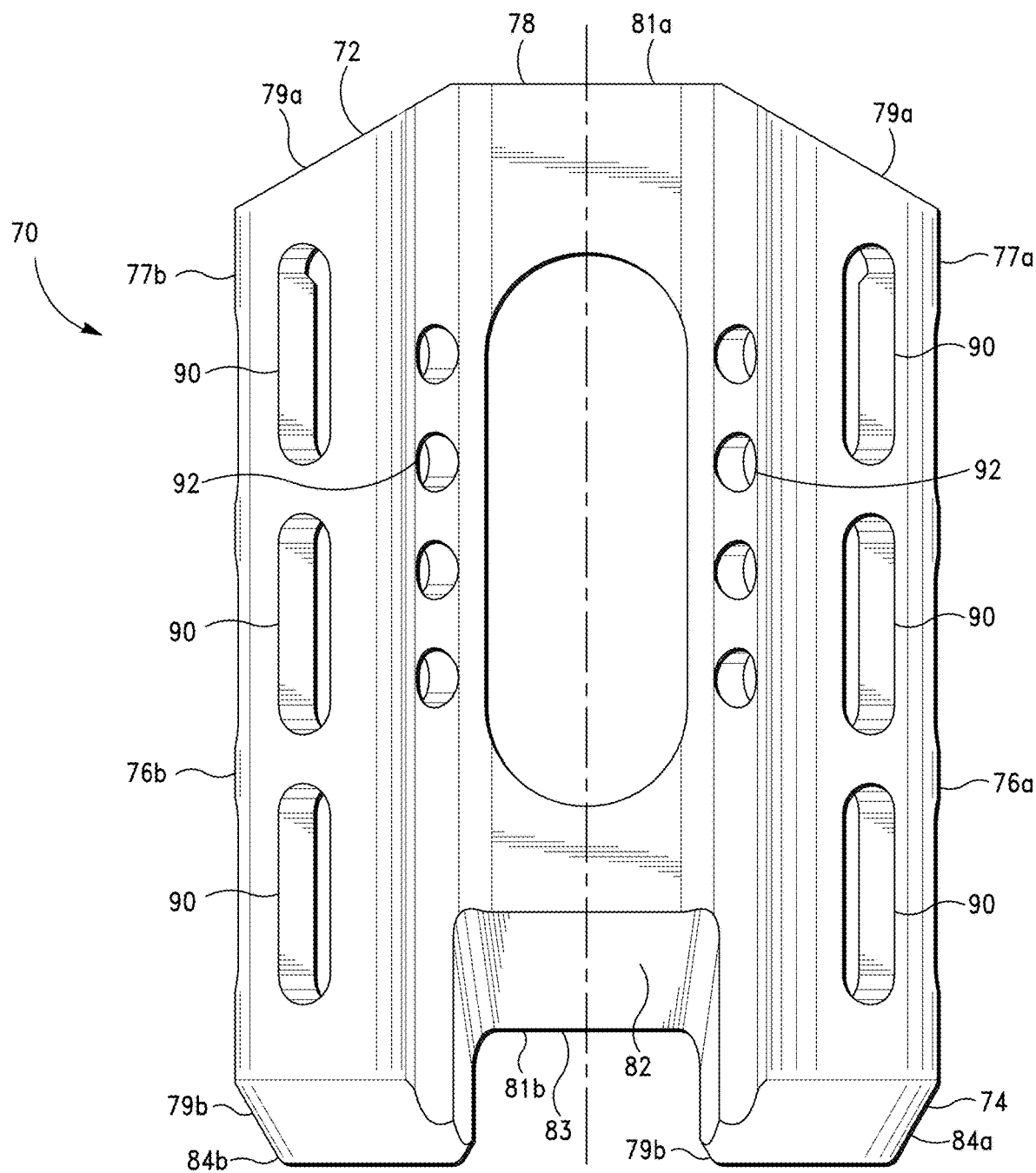
FIG. 6B is a top plan view of the SI joint prosthesis shown in FIG. 6A, in accordance with the invention.
Figure 6C:
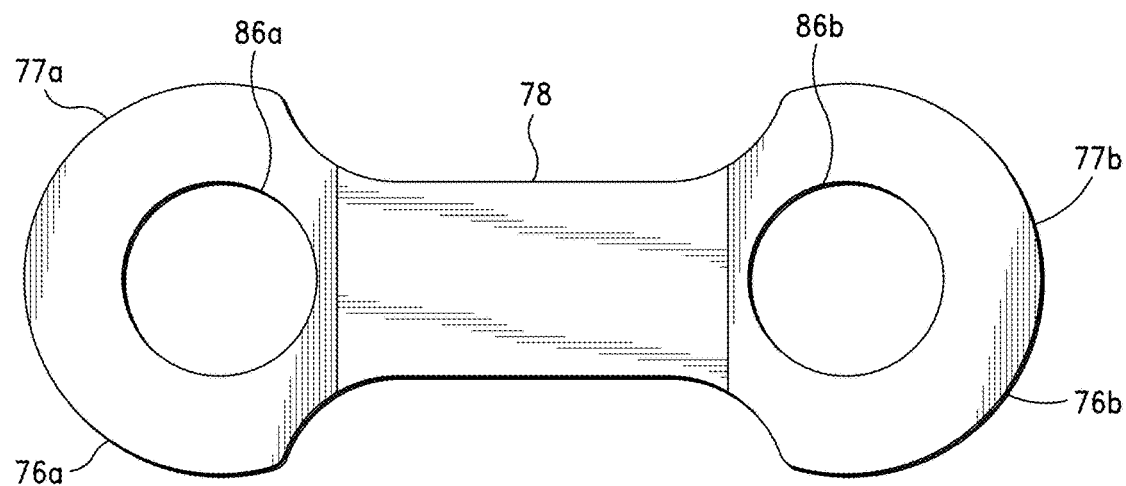
FIG. 6C is a rear plan view of the SI joint prosthesis shown in FIG. 6A, in accordance with the invention.
Figure 6D:
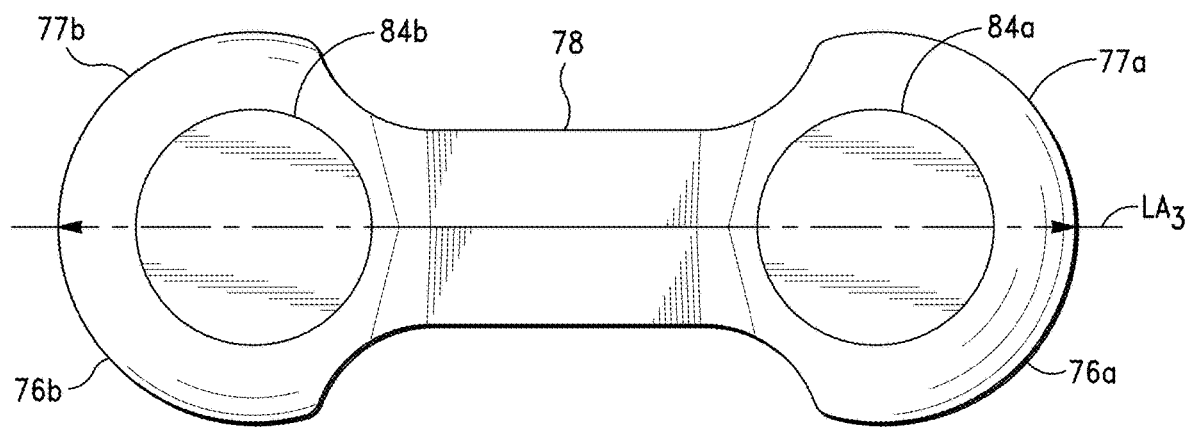
FIG. 6D is a front plan view of the SI joint prosthesis shown in FIG. 6A, in accordance with the invention.
Figure 6E:
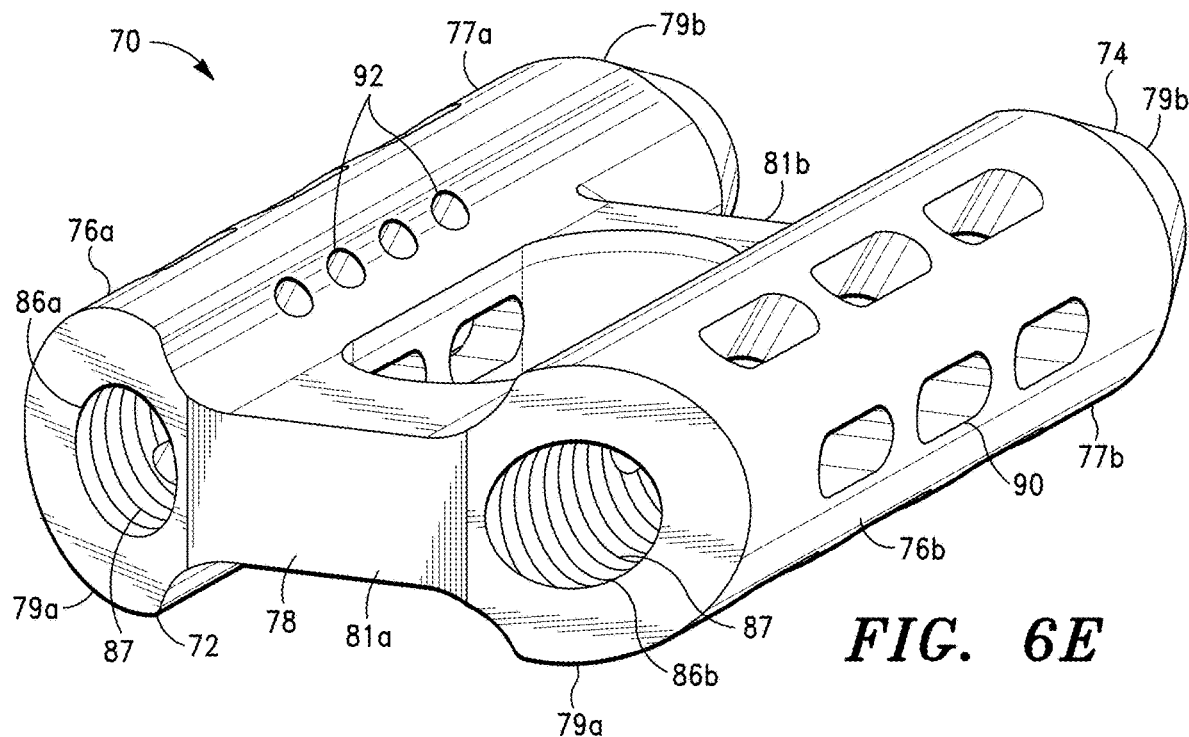
FIG. 6E is a rear perspective view of the SI joint prosthesis shown in FIG. 6A, in accordance with the invention.
Figure 6F:
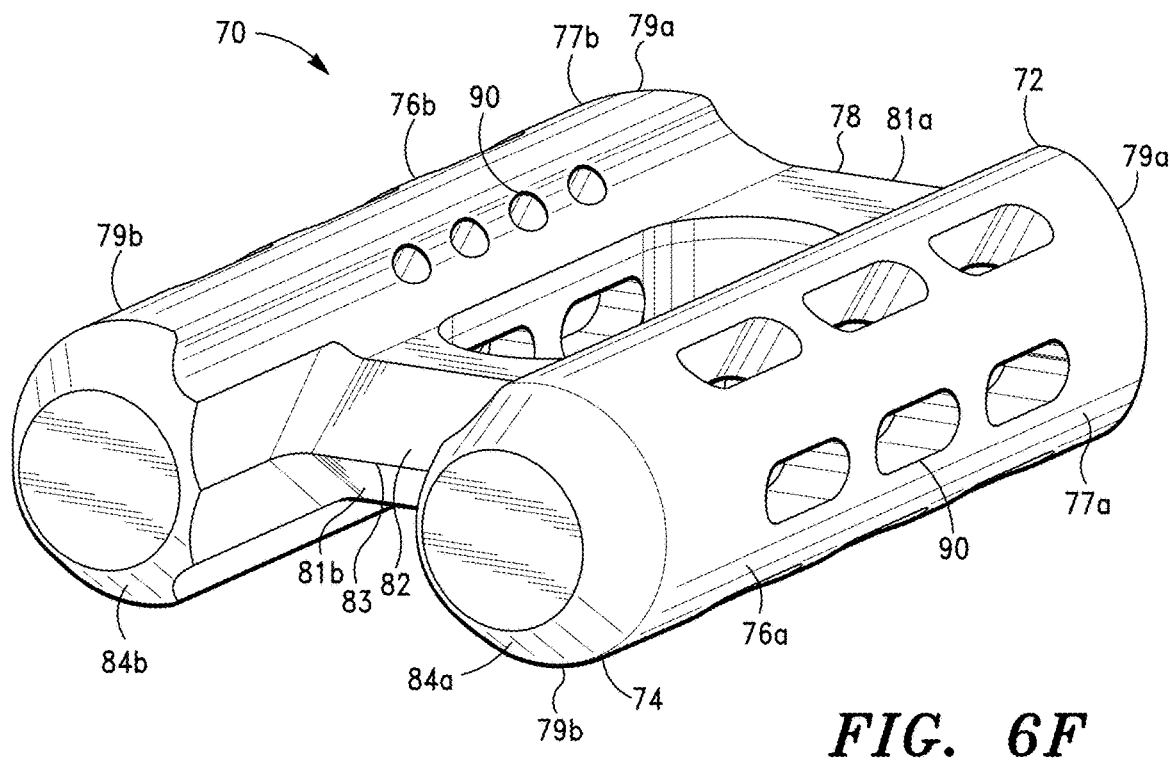
FIG. 6F is a front perspective view of the SI joint prosthesis shown in FIG. 6A, in accordance with the invention.

As illustrated in FIGS. 6A, 6E and 6F, the SI joint prosthesis 70 comprises a biocompatible and, hence, implantable member comprising proximal and distal ends 72, 74, and first and second elongated partially cylindrical sections 76a, 76b connected to a bridge section 78, whereby the SI joint prosthesis 70 comprises a continuous exterior surface comprising first and second partially cylindrical surface regions 77a, 77b.

As further illustrated in FIGS. 6A, 6E and 6F, the first and second partially cylindrical sections 76a, 76b comprise proximal and distal ends 79a, 79b. The bridge section 78 similarly comprises proximal and distal ends 81a, 81b.

According to the invention, the SI joint prosthesis 70 can comprise any suitable length from the proximal ends 79a to the distal ends 79b of the partially cylindrical sections 76a, 76b. In some embodiments, the SI joint prosthesis 70 comprises a length in the range of 20-50 mm, more preferably, a length in the range of 30-40 mm.

As illustrated in FIGS. 6C, 6E, 6F and FIGS. 4A and 4B, the first partially cylindrical surface region 77a preferably comprises a partially cylindrical surface region shape that corresponds to at least a portion of the first lobe region 103 of the pilot SI joint opening 100 and/or the sacrum guide portion 203 of the pilot SI joint opening 200, and/or the second lobe region 104 of the pilot SI joint opening 100 and/or the ilium guide portion 204 of the pilot SI joint opening 200, depending on the entry position of the prosthesis 70 into the pilot SI joint openings 100, 200.

The second partially cylindrical surface region 77b similarly preferably comprises a partially cylindrical surface region shape that corresponds to at least a portion of the first lobe region 103 of the pilot SI joint opening 100 and/or the sacrum guide portion 203 of the pilot SI joint opening 200, or the second lobe region 104 of the pilot SI joint opening 100 and/or the ilium guide portion 204 of the pilot SI joint opening 200, again depending on the entry position of the prosthesis 70 into the pilot SI joint openings 100, 200.

As illustrated in FIGS. 6A, 6B, 6F-6H, the distal end 81b of the bridge section 78 preferably comprises a taper region 82, which is configured and adapted to disrupt, i.e., cut into and through, articular cartilage and cortical bone 8 (and, in some aspects, trabecular bone 10), which define a SI joint.

According to the invention, the taper region 82 of the bridge section 78 can comprise various configurations including, without limitation, X-bevel, wedge-shaped or bevel, including top and bottom wedge bevels, Y-bevel, including top and bottom Y-bevels, and K-bevel configurations.

In some embodiments of the invention, the taper region 82 comprises two angled regions that intersect at a central point 83, i.e., pointed proximate the mid-region of the bridge section 78, such as shown in FIGS. 6A and 6F. In some embodiments, the taper region 82 comprises a single angled or sloped region defining a plane that intersects the plane defined by the bottom surface of the SI joint prosthesis 70, i.e., wedge shaped or bevel configuration.

Figure 8A:
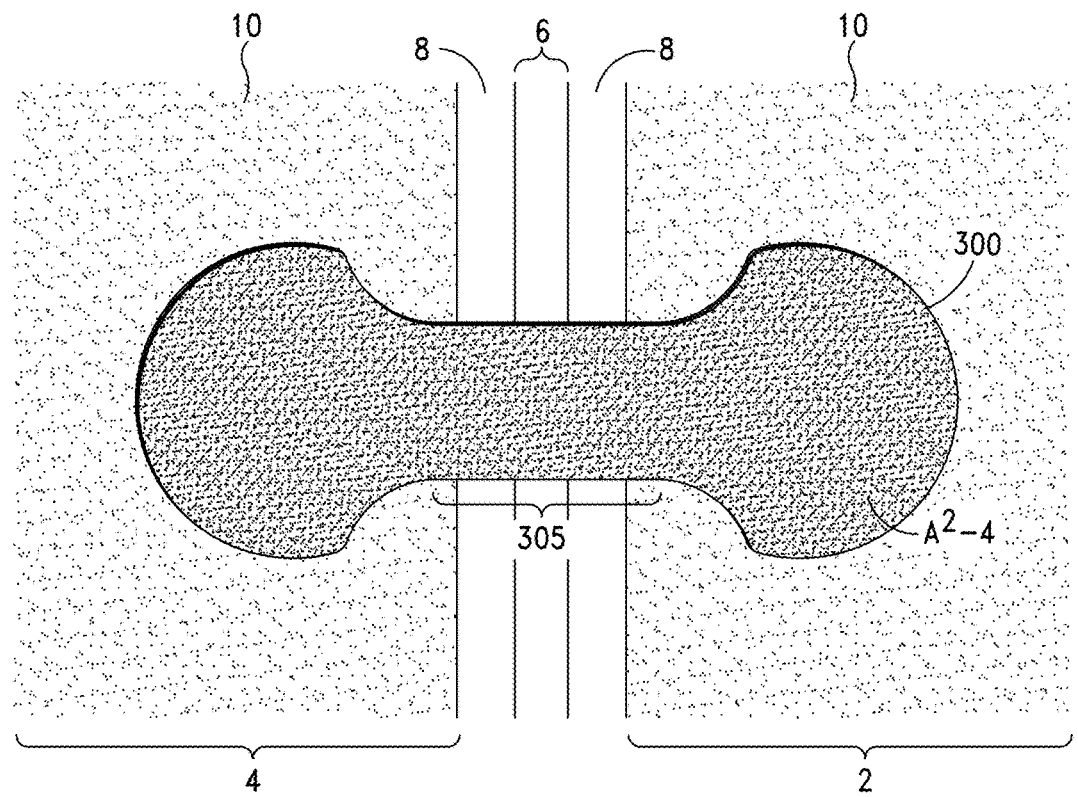
FIG. 8A is an illustration of the post-prosthesis insertion SI joint opening generated or induced when the SI joint prosthesis shown in FIG. 6A is inserted in the pilot SI joint opening shown in FIG. 4A, in accordance with the invention.
Figure 8B:
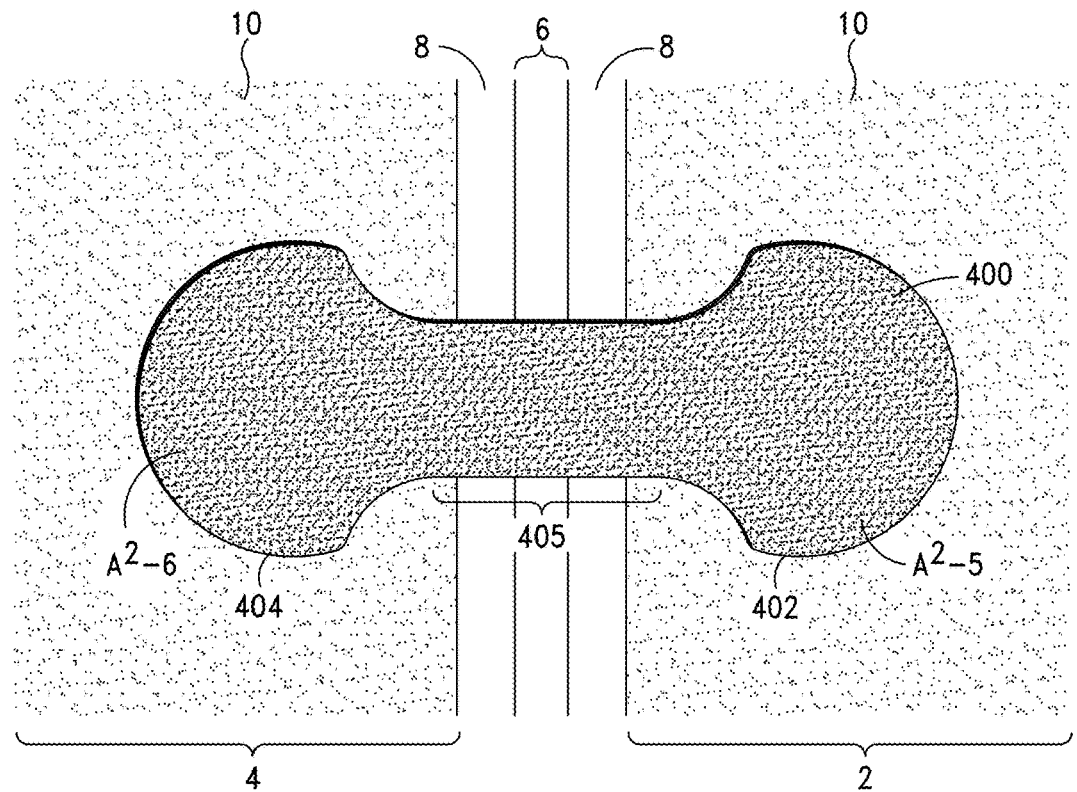
FIG. 8B is an illustration of the post-prosthesis insertion SI joint opening generated or induced when the SI joint prosthesis shown in FIG. 6A is inserted in the pilot SI joint opening shown in FIGS. 4B and/or 4C, in accordance with the invention.

In a preferred embodiment, the distal ends 79b of the first and second elongated partially cylindrical sections 76a, 76b also comprise tapered regions 84a, 84b, which facilitate (i) insertion of the distal ends 79b of the first and second elongated partially cylindrical sections 76a, 76b into the first and second lobe regions 103, 104 of the pilot SI joint opening 100 and/or the sacrum and ilium guide portions 203, 204 of the pilot SI joint opening 200, and (ii) as discussed in detail below, in some embodiments, transition of the pilot SI joint opening 100 from a first configuration and size (and, hence, cross-sectional area, i.e., $A^2_i\text{-}1$ shown in FIG. 4A) to a second expanded configuration and size (and, hence, cross-sectional area, i.e., $A^2\text{-}4$ shown in FIG. 8A) when the SI joint prosthesis 70 is inserted therein, and transition of the sacrum and ilium guide portions 203, 204 of pilot SI opening 200 from first configurations and sizes (and, hence, cross-sectional areas, i.e., $A^2_i\text{-}2$ and $A^2_i\text{-}3$ shown in FIG. 4B) to expanded second configurations and sizes (and, hence, cross-sectional areas, i.e., $A^2\text{-}5$ and $A^2\text{-}6$ shown in FIG. 8B) when the SI joint prosthesis 70 is inserted therein.

Figure 6G:
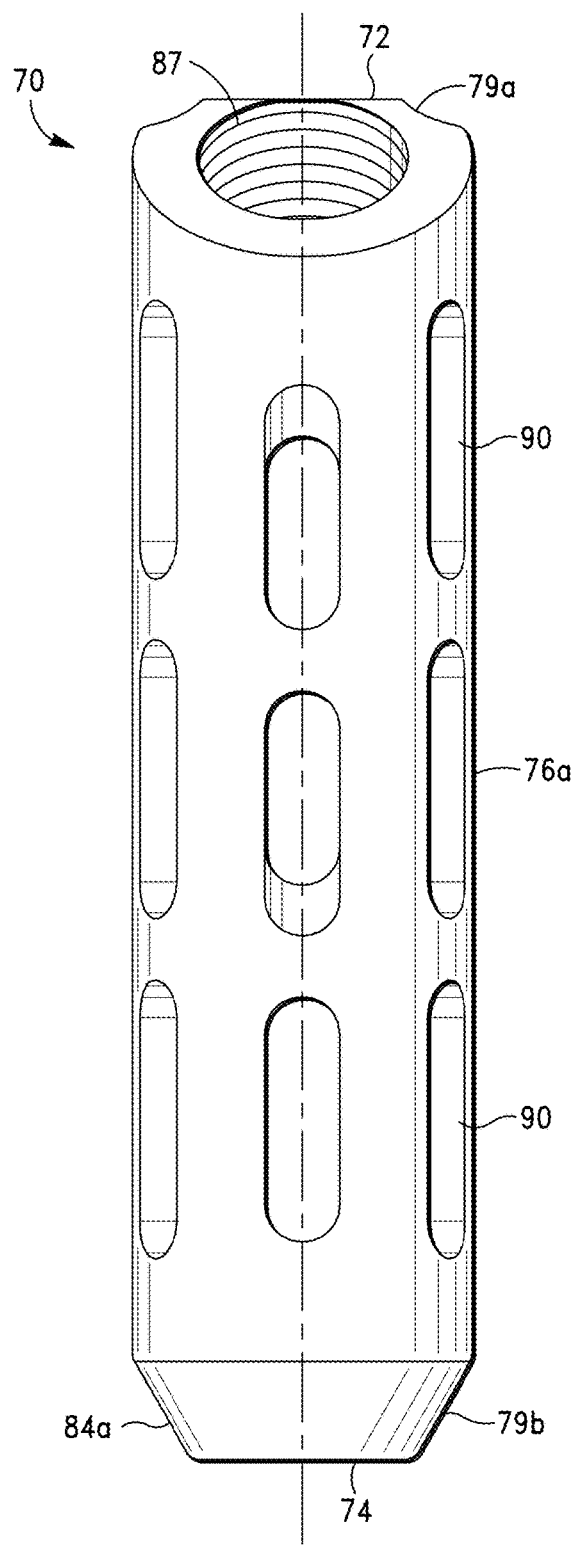
FIG. 6G is a right-side plan view of the SI joint prosthesis shown in FIG. 6A, in accordance with the invention.
Figure 6H:
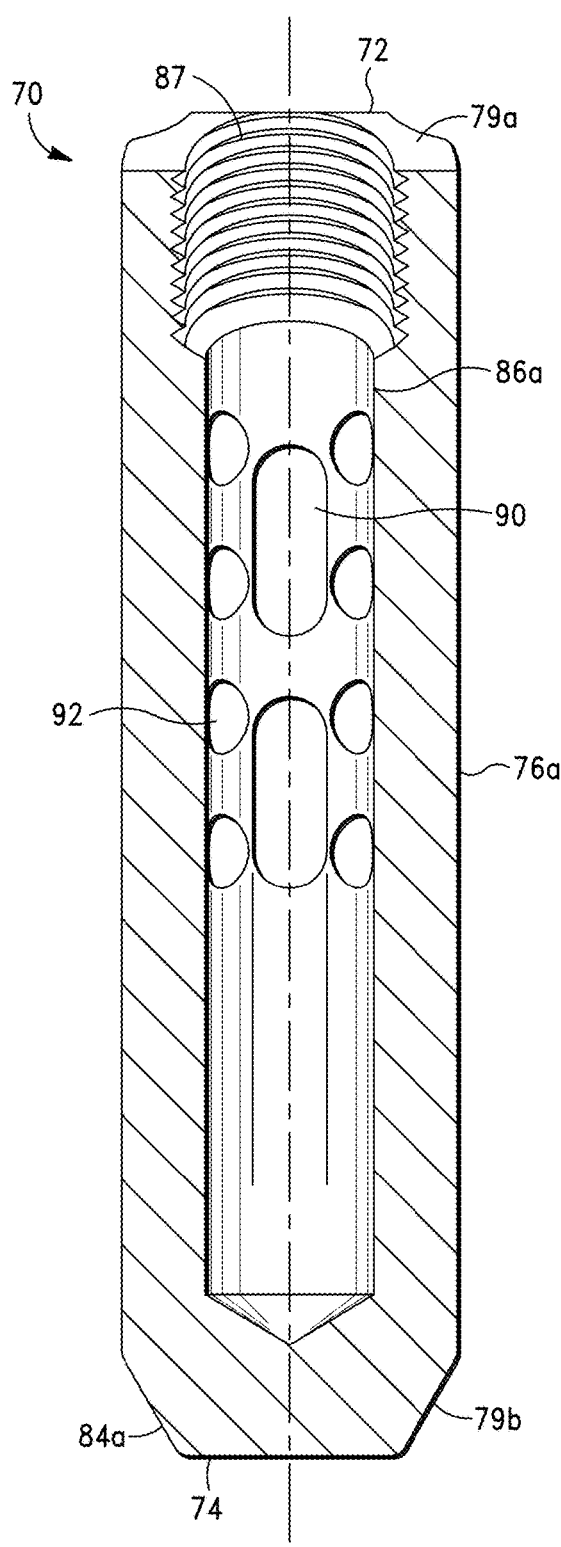
FIG. 6H is a right-side sectional plan view of the SI joint prosthesis shown in FIG. 6A, in accordance with the invention.

As illustrated in FIGS. 6C, 6E, and 6H, the first elongated partially cylindrical section 76a of the SI joint prosthesis 70 comprises an internal prosthesis engagement member lumen 86a that extends from the proximal end 79a of the first elongated partially cylindrical section 76a.

As illustrated in FIGS. 6C and 6E, the second elongated partially cylindrical section 76b of the SI joint prosthesis 70 also comprises an internal prosthesis engagement member lumen 86b that extends from the proximal end 79a of the first elongated partially cylindrical section 76b.

In a preferred embodiment, the internal prosthesis engagement member lumens 86a, 86b of the SI joint prosthesis 70 are sized and configured to receive the prosthesis guide pin 606 of the prosthesis deployment assembly 600 and, as indicated below, the prosthesis engagement rod 700 of the prosthesis deployment assembly 600.

As illustrated in FIGS. 6E and 6G, in a preferred embodiment, the internal prosthesis engagement member lumens 86a, 86b of the first and second elongated partially cylindrical sections 76a, 76b comprise a threaded region 87 proximate the proximal end 79a that is sized and configured to receive and threadably engage the threaded distal end 704 of the prosthesis engagement rod 700 of the prosthesis deployment assembly 600.

In a preferred embodiment, the internal prosthesis engagement lumens 86a, 86b are also configured to receive agents and compositions that further facilitate adhesion of the SI joint prosthesis 70 to the pilot SI openings 100, 200 of the invention and, thereby, sacrum and/or ilium, and the aforementioned biologically active agents and compositions, including osteogenic agents and compositions, and pharmacological agents and compositions that facilitate osseous or bone tissue ingrowth into the SI joint prosthesis 70 and healing of the SI joint bone structures.

Referring back to FIGS. 6A and 6B, in a preferred embodiment, the SI joint prosthesis 70 further comprises a plurality of slots 90 and holes 92, which preferably are in communication with the internal prosthesis engagement member lumens 86a, 86b.

In a preferred embodiment, the agents and compositions referenced above are adapted to extrude through the slots 90 and holes 92 of the SI joint prosthesis 70 when the SI joint prosthesis 70 is inserted in a pilot SI joint opening (i.e., pilot SI joint openings 100 or 200), to, as indicated above, (i) further facilitate adhesion of the SI joint prosthesis 70 to the pilot SI openings 100, 200 of the invention and, thereby, sacrum and/or ilium, and (ii) facilitate osseous or bone tissue ingrowth into the SI joint prosthesis 70 and healing of the SI joint bone structures.

Figure 6I:
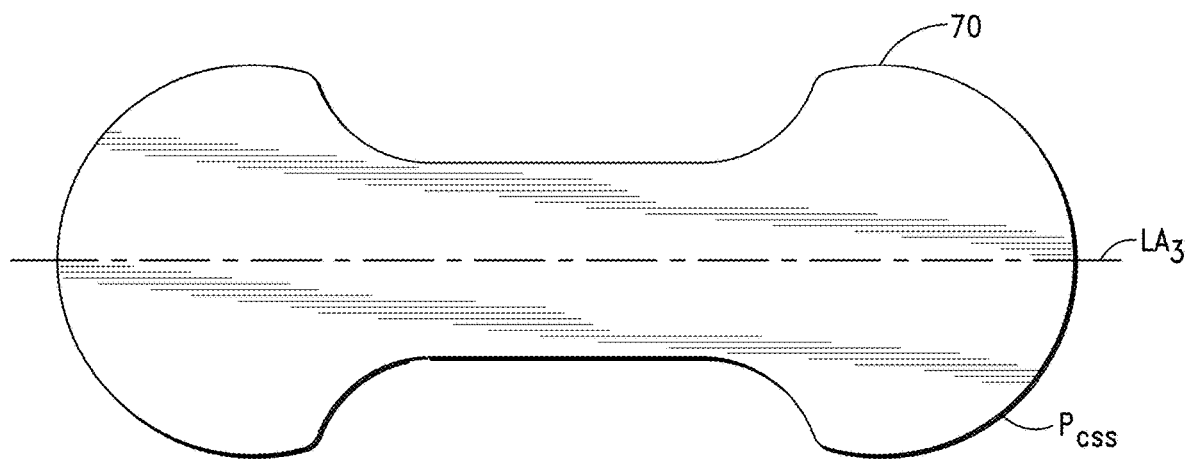
FIG. 6I is another rear plan view of the SI joint prosthesis shown in FIG. 6A showing the cross-sectional shape defined by the outer surface of the prosthesis, in accordance with the invention.

Referring now to FIG. 6I, according to the invention, the continuous exterior surface of the SI joint prosthesis 70, which is illustrated in FIGS. 6C and 6D, defines a prosthesis cross-sectional shape (denoted "$P_{CSS}$") having a longitudinal axis $LA_3$.

Figure 7A:
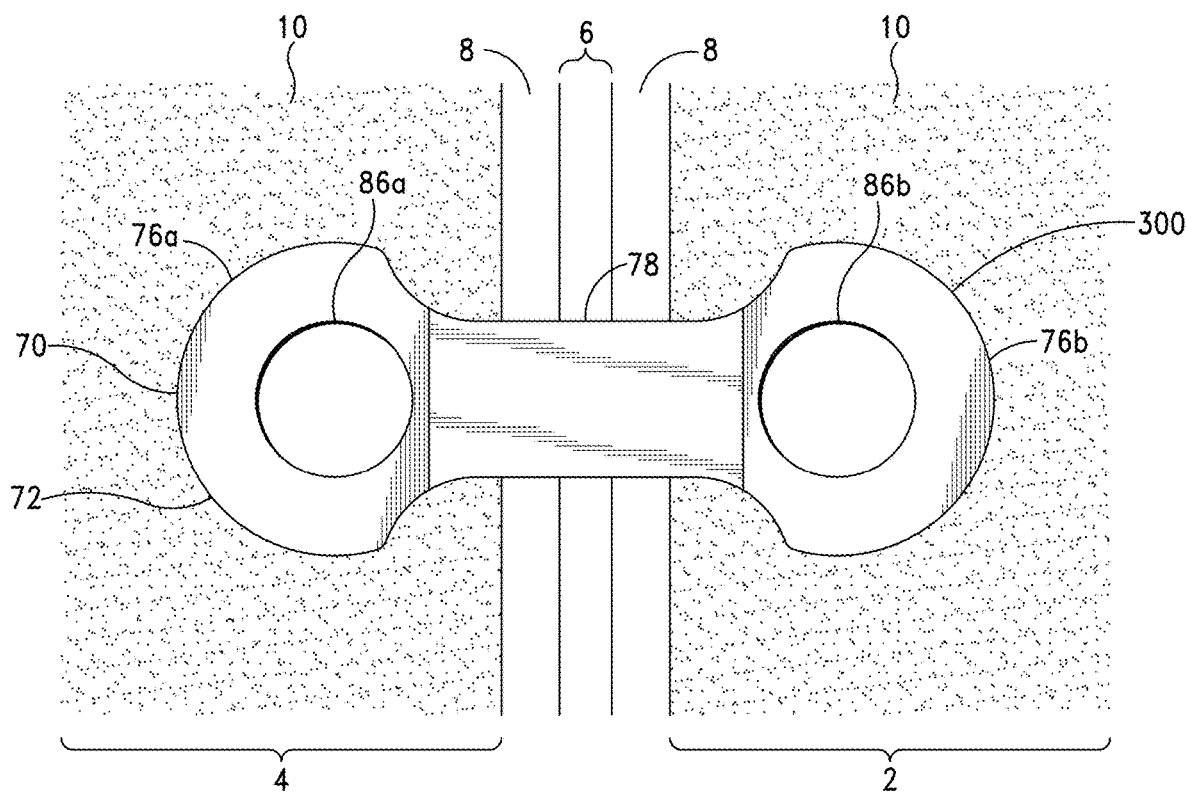
FIG. 7A is an illustration of the SI joint prosthesis shown in FIG. 6A inserted into the pilot SI joint opening shown in FIG. 4A and the resulting or induced post-prosthesis insertion SI joint opening, in accordance with the invention.

As set forth in Co-pending U.S. application Ser. No. 17/463,779, according to one embodiment of the invention, the length of the prosthesis cross-sectional shape $P_{CCS}$ along longitudinal axis $LA_3$ is greater than the length of the pilot SI joint opening 100, i.e., cross-sectional shape thereof illustrated in FIG. 4A, along the longitudinal axis $LA_2$ thereof, whereby, when the SI joint prosthesis 70 is inserted into pilot SI joint opening 100, as illustrated in FIG. 7A, the pilot SI opening 100 transitions to a post-prosthesis insertion SI joint opening 300 comprising a larger cross-sectional length shape that corresponds to the length of the prosthesis cross-sectional shape $P_{CCS}$.

As illustrated in FIG. 8A, in a preferred embodiment, when the SI joint prosthesis 70 is inserted into pilot SI joint opening 100, the cross-sectional area of the post-prosthesis insertion SI joint opening 300 also comprises a cross-sectional area (denoted "$A^2\text{-}4$") that is greater than the cross-sectional area $A^2_i\text{-}1$ of the pilot SI joint opening 100.

As further illustrated in FIG. 8A, the noncircular region 105 of pilot SI joint opening 100 also transitions to a much larger noncircular region (denoted "305"), which is achieved by virtue of the tapered bridge section 78 of the SI joint prosthesis 70 cutting into and through the articular cartilage and cortical bone 8, which define the SI joint 6, and the trabecular bone 10 proximate the SI joint 6.

Figure 7B:
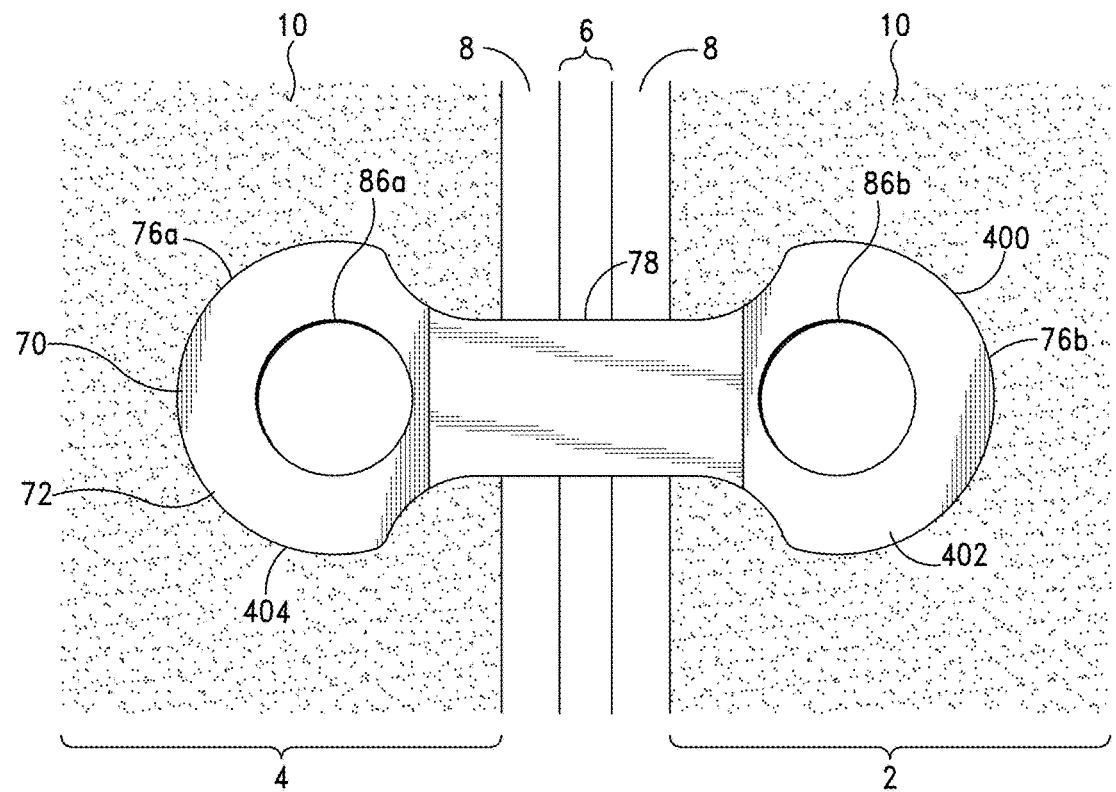
FIG. 7B is an illustration of the SI joint prosthesis shown in FIG. 6A inserted in the pilot SI joint opening shown in FIG. 4B and the resulting or induced post-prosthesis insertion SI joint opening, in accordance with the invention.

According to the noted embodiment of the invention, when the SI joint prosthesis 70 is inserted into pilot SI joint opening 200, as illustrated in FIG. 7B, the pilot SI joint opening 200 similarly transitions to a post-prosthesis insertion SI joint opening 400, wherein, as illustrated in FIG. 8B, the cross-sectional areas of the post-prosthesis sacrum and ilium guide portions of the post-prosthesis insertion SI joint opening 400 (now denoted "402" and "404", respectively) comprise greater cross-sectional areas (denoted "$A^2\text{-}5$" and "$A^2\text{-}6$").

As further illustrated in FIG. 8B, the post-prosthesis insertion SI joint opening 400 also comprises a noncircular region (denoted "405"), which is similarly achieved by virtue of the tapered bridge section 78 of the SI joint prosthesis 70 cutting into and through the articular cartilage and cortical bone 8, which define the SI joint 6, and the trabecular bone 10 proximate the SI joint 6.

As illustrated in FIGS. 6I, 8A and 8B, the post-prosthesis insertion SI joint openings 300, 400 also preferably comprise cross-sectional shapes that correspond to the prosthesis cross-sectional shape "$P_{CSS}$" defined by the outer surface of the SI joint prosthesis 70, including the first and second elongated partially cylindrical sections 76a, 76b and bridge section 78.

In a preferred embodiment of the invention, to achieve sufficient expansion of the pilot SI joint openings 100, 200 when the SI joint prosthesis 70 is inserted therein, preferably, the cross-sectional areas of the regions defined by the first and second elongated partially cylindrical sections 76a, 76b of the SI joint prosthesis 70 are at least 0.05% greater than the cross-sectional areas defined by the first and second lobe regions 103, 104 of the pilot SI joint opening 100, and the cross-sectional areas defined by the sacrum and ilium guide portions 203, 204 of pilot SI joint opening 200.

In some embodiments of the invention, the cross-sectional areas of the regions defined by the first and second elongated partially cylindrical sections 76a, 76b of the SI joint prosthesis 70 are substantially equal to or slightly smaller, e.g., ≤0.05%, than the cross-sectional areas defined by the first and second lobe regions 103, 104 of the pilot SI joint opening 100, and the cross-sectional areas defined by the sacrum and ilium guide portions 203, 204 of pilot SI joint opening 200.

As set forth in Co-pending U.S. application Ser. No. 17/463,779, the SI joint prosthesis 70 can comprise various biocompatible materials, including metals and metal alloys, such as titanium, stainless-steel, cobalt-chromium alloys and nickel-titanium alloys, and various biocompatible polymers, including, without limitation, reinforced polymers, such as carbon fiber reinforced polymers and metal-framed polymers.

The SI joint prosthesis 70 can additionally comprise a porous structure to facilitate (i) adhesion of the prosthesis 70 to a post-prosthesis insertion SI joint opening of the invention; particularly, post-prosthesis insertion SI joint openings 300, 400 and, thereby, to SI joint bone structures, i.e., sacrum and ilium bone structures, and (ii) bone or osseous tissue ingrowth into the prosthesis 70.

The SI joint prosthesis 70 can further comprise various exterior surface textures and roughness to facilitate or enhance engagement of the prosthesis to a post-prosthesis insertion SI joint opening, such as post-prosthesis insertion SI joint openings 300, 400, and, thereby, to SI joint bone structures, i.e., sacrum and ilium bone structures, and/or maintain engagement thereto and positioning therein.

The surface of the SI joint prosthesis 70 can, thus, comprise a roughness grade number of N1 (Ra=~0.025 μm), N2 (Ra=~0.05 μm), N3 (Ra=~0.1 μm), N4 (Ra=~0.2 μm), N5 (Ra=~0.4 μm), N6 (Ra=~0.08 μm), N7 (Ra=~1.6 μm), N8 (Ra=~3.2 μm), N9 (Ra=~6.3 μm), N10 (Ra=~12.5 μm), N11 (Ra=~25 μm) or N12 (Ra=~50 μm).

In some embodiments of the invention, the SI joint prosthesis comprises an outer coating.

In some embodiments, the outer coating comprises one of the aforementioned osteogenic compositions.

In some embodiments, the osteogenic composition comprises a demineralized bone matrix, autograft bone material, allograft bone material, xenograft bone material, polymethyl-methacrylate or calcium-based bone material.

In some embodiments, the osteogenic composition comprises a bone morphogenic protein (BMP).

In some embodiments, the BMP comprises BMP-1, BMP2a, BMP2b, BMP3, BMP4, BMP5, BMP6, BMP7 or BMP8a.

In some embodiments, the outer coating comprises one of the aforementioned biologically active agents.

In some embodiments, the biologically active agent comprises a basic fibroblast growth factor (bFGF), a transforming growth factor-β (TGF-β), a vascular endothelial growth factor (VEGF), a platelet derived growth factor (PDGF), an insulin-like growth factor (IGF), an epidermal growth factor (EGF) or a differentiation factor-5 (GDF-5).

In some embodiments, the outer coating comprises one of the aforementioned pharmacological agents.

In some embodiments, the pharmacological agent comprises penicillin, a carboxypenicillin, a tetracycline, gentamicin, vancomycin, ciprofloxacin, amikacin, an aminoglycoside, a cephalosporin, clindamycin, erythromycin, a fluoroquinolone, a macrolide, an azolide, metronidazole, trimethoprim-sulfamethoxazole, polymyxin B, oxytetracycline, tobramycin, cefazolin or rifampin.

In some embodiments, the pharmacological agent comprises dexamethasone, betamethasone, prednisone, prednisolone, methylprednisolone sodium succinate, methylprednisolone, cortisone, ketorolac, diclofenac or ibuprofen.

In some embodiments of the invention, the outer coating comprises a biocompatible adhesive composition.

According to the invention, suitable adhesive compositions include, without limitation, poly(L-glutamic acid)-based compositions, poly(γ-glutamic acid)-based compositions, poly(alkyl cyano acrylate)-based compositions, polyacrylic acid-based compositions, including polyacrylic acid crosslinked with pentaerythritol and/or allyl sucrose, polyacrylic acid crosslinked with divinyl glycol and combinations thereof; fibrin-based compositions, collagen-based compositions, including collagen and poly(L-glutamic acid) compositions; albumin-based compositions, including BioGlue® (comprises purified bovine serum albumin (BSA) and glutaraldehyde); cyanoacrylate compositions, including butyl-2-cyanoacrylate adhesives (e.g., Indermil®, Histoacryl®, Histoacryl® Blue, and LiquiBand®) and octyl-2-cyanoacrylate adhesives (e.g., Dermabond®, SurgiSeal™, LiquiBand® Flex, and OctylSeal); poly(ethylene glycol) (PEG) based compositions, including FocalSeal®, Progel™, Duraseal™, DuraSeal™ Xact, Coseal® and ReSure Sealant; polysaccharide-based compositions, polypeptide-based compositions, and radiation curable materials, such as poly(glycerol-co-sebacate) acrylate (PGSA), discussed below.

In some embodiments, the outer coating comprises one of the aforementioned polymers and/or compositions comprising same.

In some embodiments of the invention, the polymer comprises poly(glycerol sebacate) (PGS) or a derivative thereof, including, without limitation, poly(glycerol-co-sebacate) acrylate (PGSA) and PGS co-polymers, such as poly(glycerol sebacate)-co-poly(ethylene glycol) (PGS-PEG); and/or composites thereof, e.g., PGS-hydroxyapatite (HA) composites and PGS-poly(ε-caprolactone) (PGS-PCL) composites, and compositions comprising same.

PGS and derivatives thereof possess a unique property of inducing remodeling of damaged osseous or bone tissue, such as at pilot SI joint openings, and, hence, healing of the associated bone structures when disposed proximate thereto.

As set forth in Loh, et al., *Poly(glycerol sebacate) Biomaterial: Synthesis and Biomedical Applications*, Journal of Materials Chemistry B, vol. 3(39), pp. 7641-7652 (2015) and indicated in Table 1 below, a further seminal property of PGS is that its physical state can be modulated during synthesis by controlling the "degree of esterification" via at least one crosslinking agent, e.g., methylene diphenyl diisocyanate (MDI).

TABLE 1

| Degree of Esterification | Physical State |
| --- | --- |
| ≤46% | Solid (Brittle Wax) |
| ~47%-64% | Semi-Solid (Soft Wax) |
| ~65%-75% | Viscous Liquid |
| ~76%-83% | Sticky Elastomer |
| ≥84% | Elastomer |

According to the invention, any suitable degree of esterification of PGS can be employed for PGS when employed in or for PGS based outer coatings (i.e., polymer compositions comprising PGS) and biologically active agent compositions of the invention.

In some embodiments, the PGS based outer coatings comprise a degree of esterification in the range of ~76%-83%, whereby the PGS exhibits adhesive properties, which will enhance engagement of prosthesis 70 (as well as the prostheses disclosed in Co-pending priority application Ser. No. 13/857,977) to the post-prosthesis insertion SI joint openings 300, 400 and, thereby, to the SI joint bone structures, i.e., sacrum and ilium bone structures.

As is well established, the physical state of poly(glycerol-co-sebacate) acrylate (PGSA) can also be modulated by combining the PGSA with a suitable photoinitiator and subjecting the PGSA to radiation.

Indeed, as set forth in Nijst, et al., *Synthesis and Characterization of Photocurable Elastomers from Poly(Glycerol-Co-Sebacate)*, Biomacromolecules, vol. 8, no. 10, pp. 3067-3073 (2007), PGSA can be induced to transition from a liquid or flowable state to a solid elastomer state when combined with a photoinitiator, such as 2-hydroxy-1-[4-hydroxyethoxy) phenyl]-2-methyl-1-propanone (D 2959, Ciba Geigy), 2,2-dimethoxy-2-phenylacetophenone, titanocenes, fluorinated diaryltitanocenes, iron arene complexes, manganese decacarbonyl and methylcyclopentadienyl manganese tricarbonyl, and subjected to radiation, such as visible light; particularly, radiation in the range of approximately 380-750 nm, and ultraviolet (UV) light, particularly, radiation in the range of 10-400 nm.

Thus, in some embodiments, a composition comprising PGSA (also referred to herein as a "PGSA based composition") is employed to enhance the engagement of the SI joint prosthesis 70 to a post-prosthesis insertion SI joint opening, such as post-prosthesis insertion SI joint openings 300, 400, and, thereby, SI joint bone structures, i.e., sacrum and ilium bone structures.

As set forth in Co-pending U.S. application Ser. No. 17/463,779, in such embodiments, the PGSA based composition (in a flowable state) is disposed in the internal prosthesis engagement member lumens 86a, 86b of the SI joint prosthesis 70, whereby the PGSA based composition is dispersed when the SI joint prosthesis 70 is positioned in the dysfunctional SI joint and fills any gaps between the prosthesis 70 and a post-prosthesis insertion SI joint opening of the invention; particularly, post-prosthesis insertion SI joint openings 300, 400, and thereafter cured via radiation and solidified, whereby the solidified PGSA enhances the engagement of the prosthesis 70 to the post-prosthesis insertion SI joint opening and, thereby, to the sacrum and ilium bone structures.

As further set forth in Co-pending U.S. application Ser. No. 17/463,779, PGS and its derivatives; particularly, PGSA are also excellent platforms for delivery and, hence, administration of biologically active agents and pharmacological agents to mammalian tissue, including osseous or bone tissue.

Thus, in some embodiments of the invention, the PGS outer coatings and PGS and PGSA based compositions further comprise one or more of the aforementioned biologically active or pharmacological agents.

According to the invention, after the steps of providing the tool assembly and SI joint prosthesis 70, the next step in the methods for stabilizing a dysfunctional SI joint comprises making an incision in and through tissue at a predetermined incision site of the subject to provide posterior access to the subject's dysfunctional SI joint.

In a preferred embodiment, the incision site and, hence, position is along the lateral lip of the posterior third of the left or right iliac crest to the posterior superior iliac spine (PSIS).

Referring back to FIG. 1B, in a preferred embodiment, the incision facilitates entry of the guide pin 400 and, thereby, a SI joint prosthesis of the invention; particularly, SI joint prosthesis 70, into the dysfunctional SI joint through the posterior sacroiliac ligaments 9 at approximately the S3 level (denoted by arrow "A"), and, as illustrated in FIG. 1C, a trajectory of the guide pin 400 and, thereby, SI joint prosthesis (denoted by arrow "B") toward the mid-point of the S1 end plate and the sacral promontory 5.

According to the invention, after the step of making an incision in and through tissue at a predetermined incision site of the subject, the next step in the methods for stabilizing a dysfunctional SI joint comprises advancing the guide pin 400 from a posterior approach into and through the incision and into the dysfunctional SI joint.

Advancement of the guide pin into the dysfunctional SI joint is a critical step in the methods for stabilizing a dysfunctional SI joint. As indicated above and discussed in detail below, the guide pin 400 functions as (i) a guide for the drill guide assembly 500 and, thereby, positioning of the pilot SI joint opening, e.g. pilot SI joint opening 100, created by the drill guide assembly 500, (ii) a landmark for the SI joint prosthesis, e.g., SI joint prosthesis 70, to be disposed in the dysfunctional SI joint, and (iii) a guide for the prosthesis deployment assembly 600 and, hence, SI joint prosthesis engaged thereto into the pilot SI joint opening created by the drill guide assembly 500 and, thereby, positioning of the SI joint prosthesis in the dysfunctional SI joint.

Figure 9A:
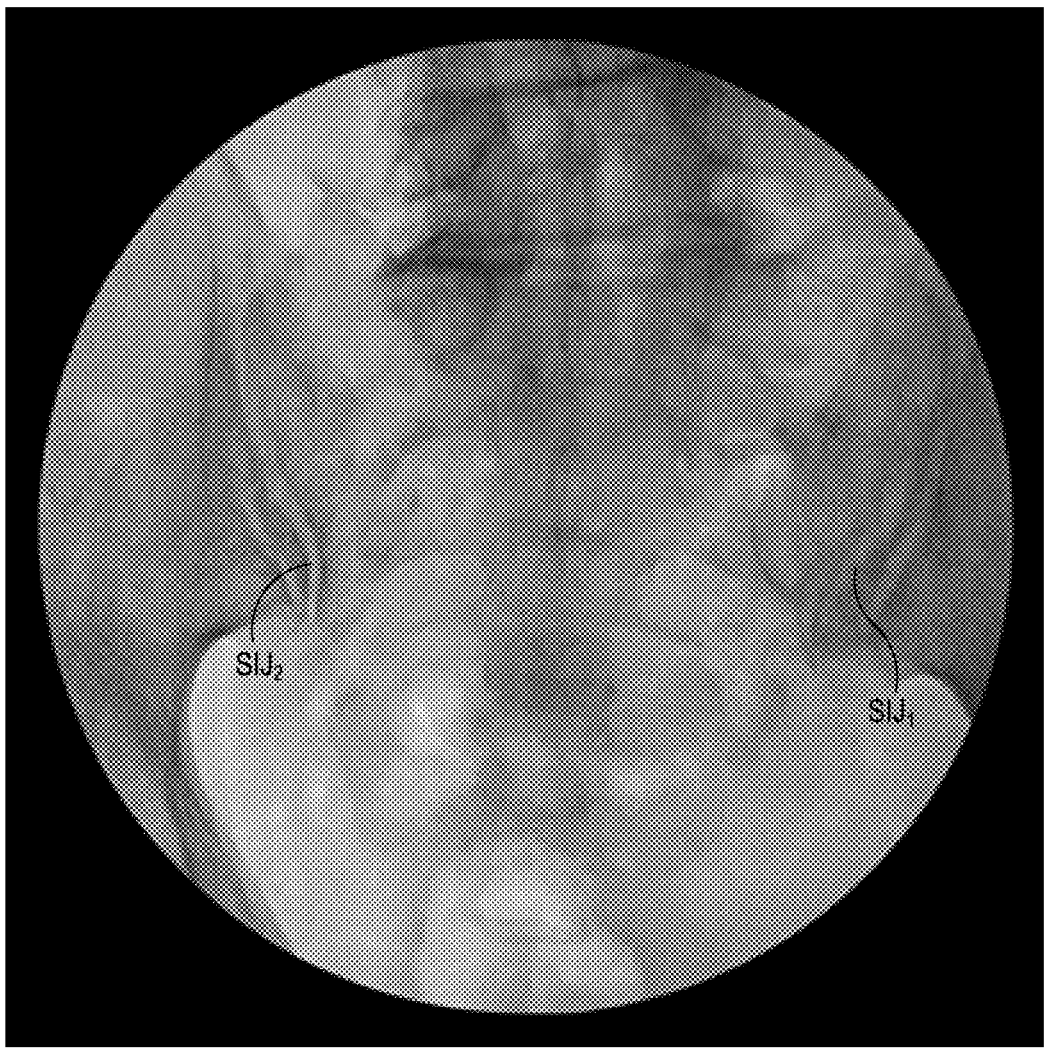
FIG. 9A is a conventional CT scan image showing an anteroposterior (AP) view of a pelvic structure and SI joints associated therewith.
Figure 9B:
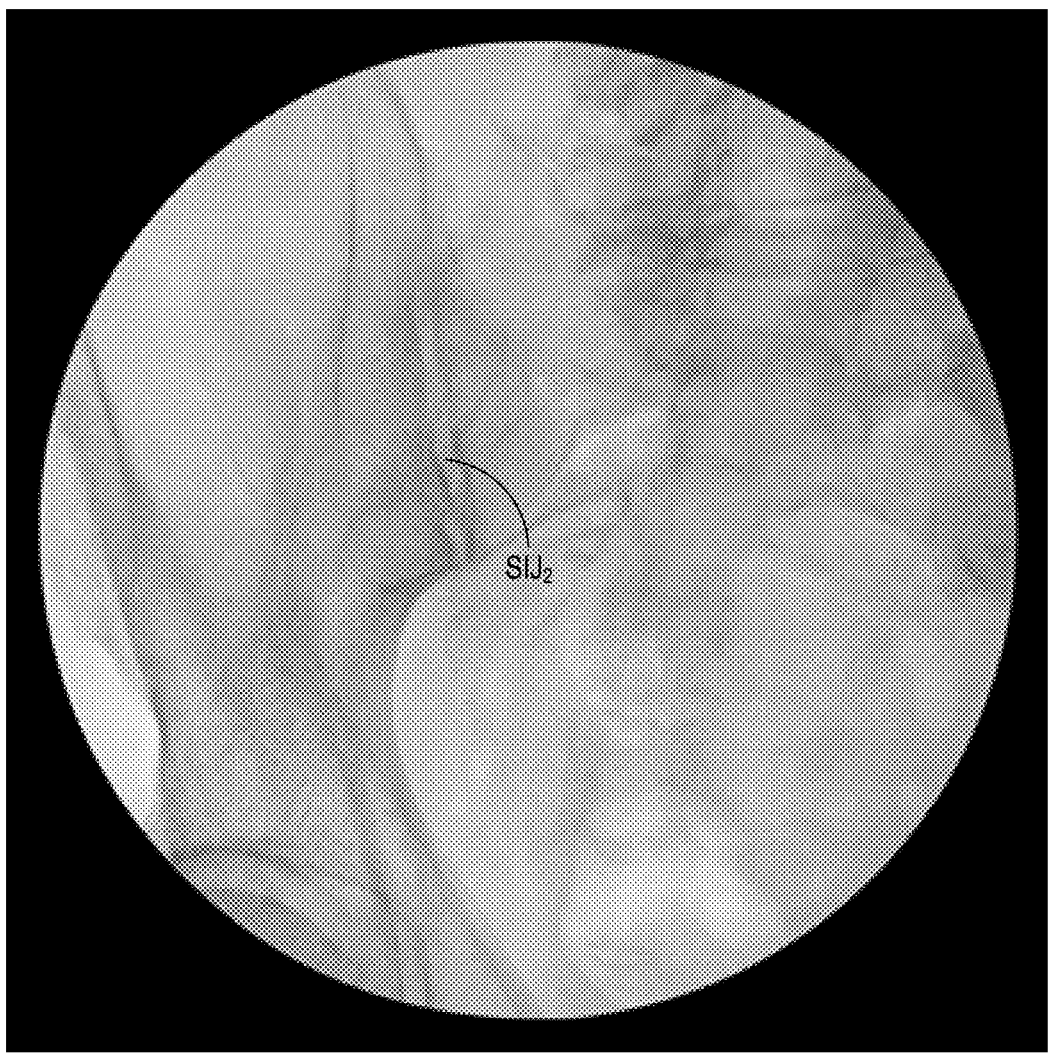
FIG. 9B is a CT scan image showing a modified AP view of a dysfunctional SI joint, in accordance with the invention.
Figure 9C:
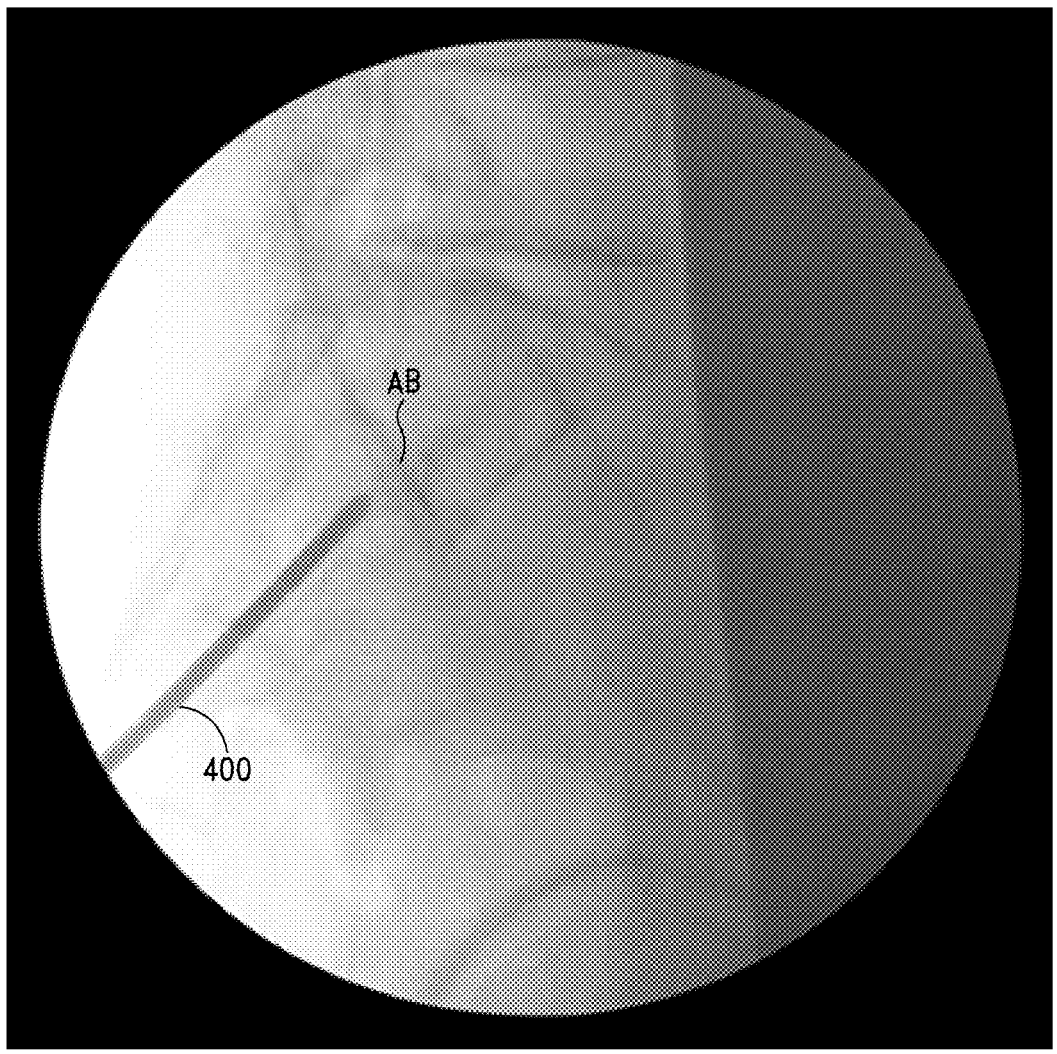
FIG. 9C is a CT scan image showing a tangent lateral view of the dysfunctional SI joint shown in FIG. 9B, showing a guide pin properly positioned therein, in accordance with the invention.
Figure 9D:
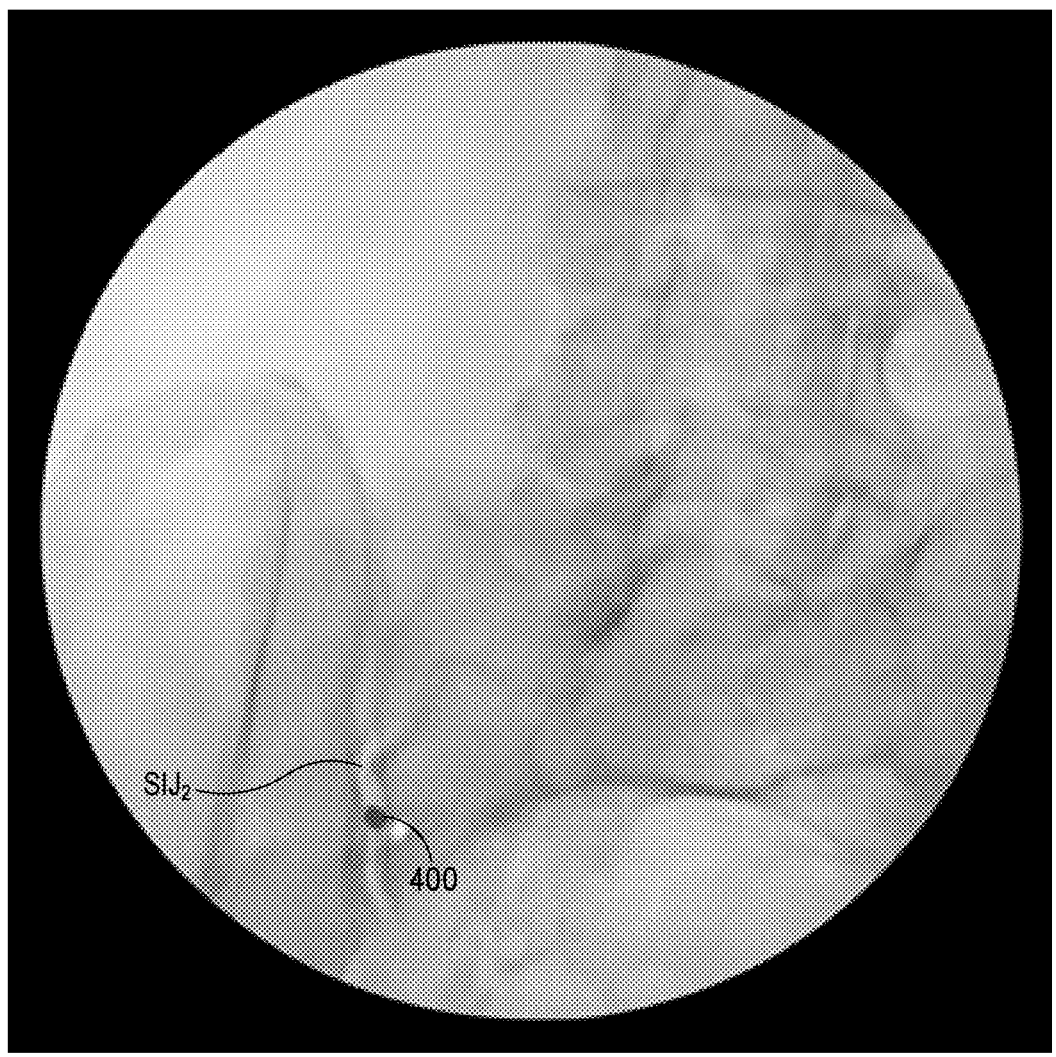
FIG. 9D is a CT scan image showing a trajectory inlet view of the dysfunctional SI joint shown in FIG. 9B, showing a guide pin properly positioned therein, in accordance with the invention.
Figure 9E:
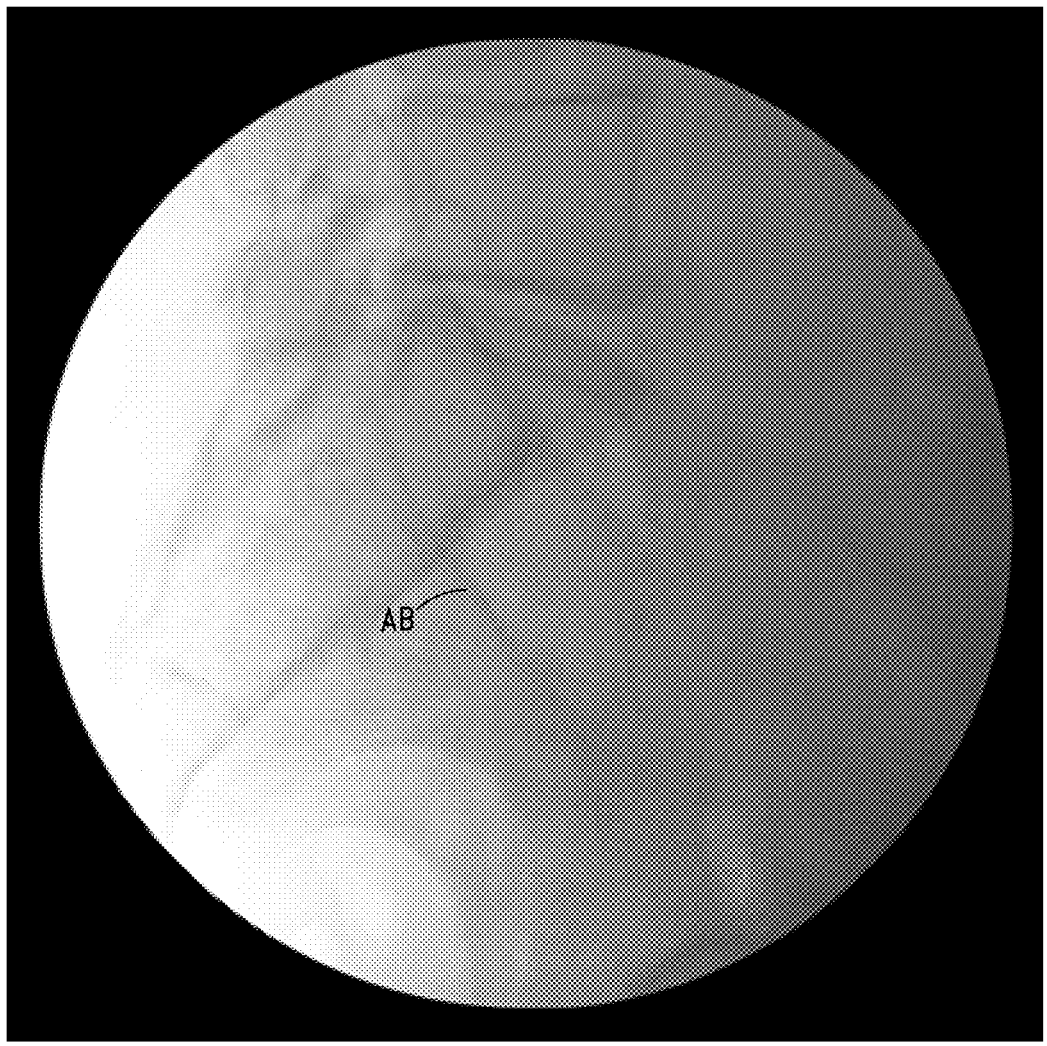
FIG. 9E is a CT scan image showing a lateral view of the dysfunctional SI joint shown in FIG. 9B, showing the alar boundary thereof, in accordance with the invention.
Figure 9F:
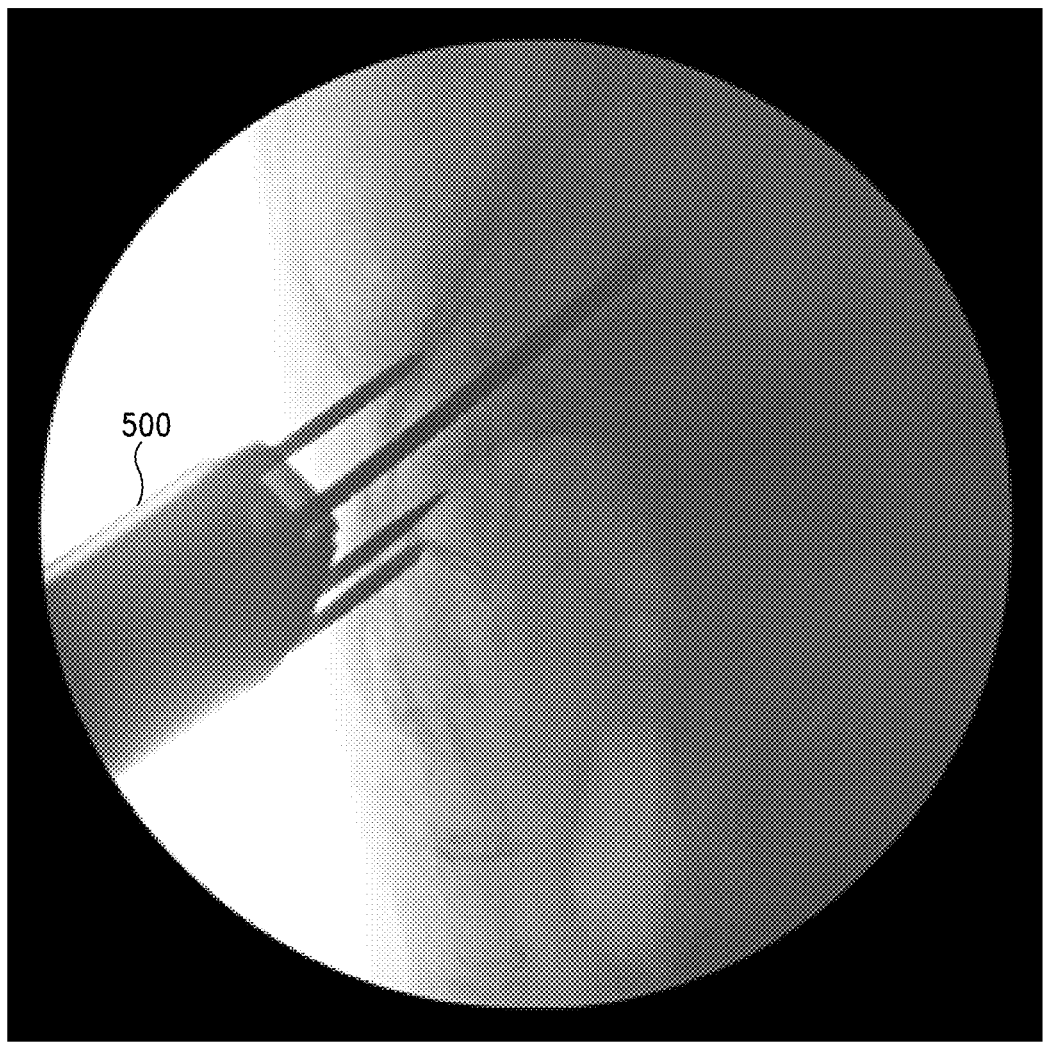
FIG. 9F is a CT scan image showing a lateral view of the drill guide assembly disposed proximate a dysfunctional SI joint, in accordance with the invention.
Figure 9G:
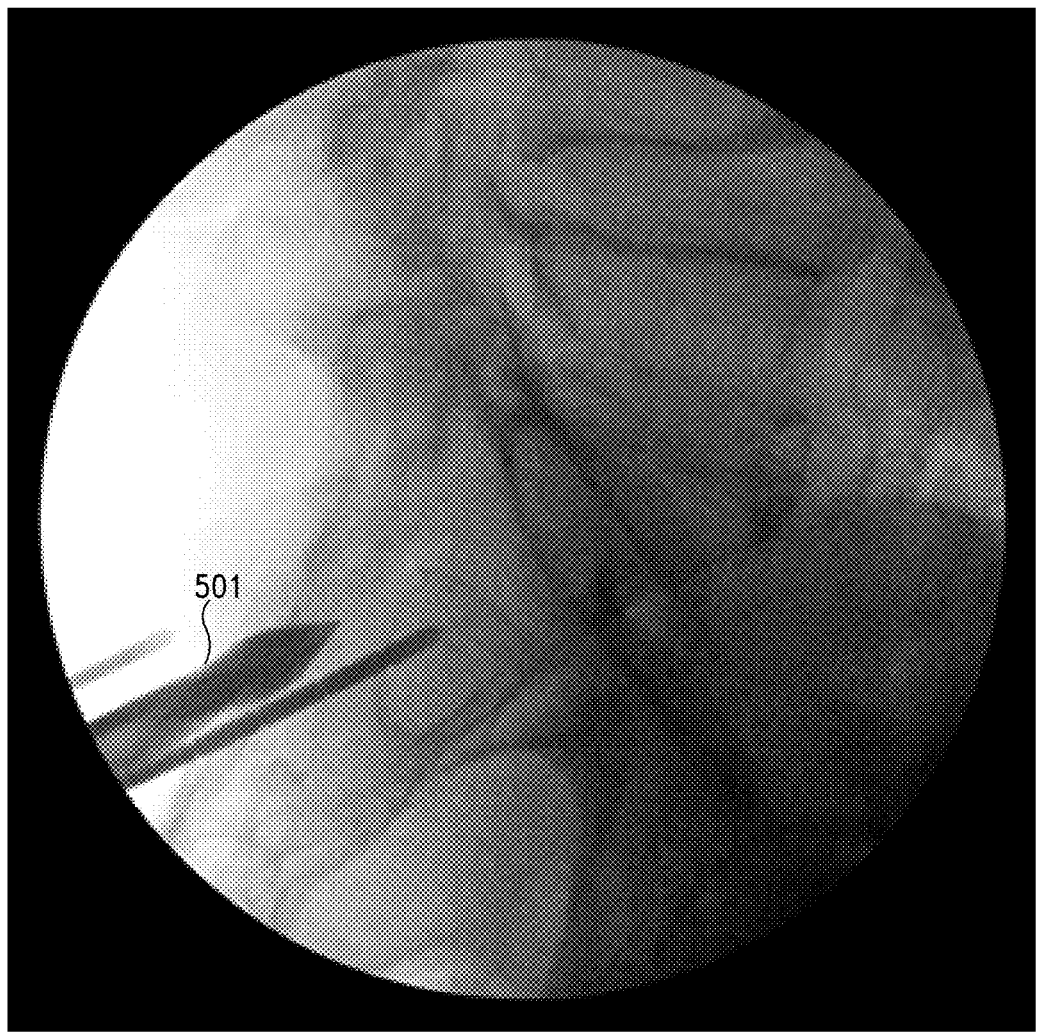
FIG. 9G is a CT scan image showing a lateral view of the drill guide assembly disposed proximate a dysfunctional SI joint, in accordance with the invention.

The guide pin 400 thus ensures (i) proper trajectory of the drill guide assembly and creation of the pilot SI joint opening, e.g., pilot SI joint opening 100, by the drill guide assembly 500, (ii) proper trajectory of the prosthesis deployment assembly 600 and, hence, SI joint prosthesis engaged thereto to and into the pilot SI joint opening created by the drill guide assembly 500 and, thereby, accurate and optimal placement of the SI joint prosthesis in the dysfunctional SI joint; preferably, a predetermined distance away from the SI joint dorsal recess 7, such as shown in FIG. 1D and the CT scan in FIG. 9G.

Referring back to FIGS. 1A-1C, in a preferred embodiment, the guide pin 400 is positioned (along the long arm of the inverted "L" 15) substantially parallel to the floor 21 of the sacrum 2, which, as indicated above, is defined by the region between the anterior sacral promontory 19a and the apex 19b of the sacrum 2.

In a preferred embodiment, the guide pin 400 is positioned in the dysfunctional SI joint at an angle in the range of 25°-35°, more preferably, at an angle of approximately 30° relative to the cephalocaudal axis 27.

As indicated above, the noted position of the guide pin 400 in the dysfunctional SI joint provides a trajectory of the SI joint prosthesis of the invention; particularly, SI joint prosthesis 70, during advancement thereof into the dysfunctional SI joint toward the mid-point of the S1 end plate and the sacral promontory 5 (denoted by arrow "B" in FIG. 1C).

The noted preferred trajectory of the SI joint prosthesis substantially reduces the risk of entry of the SI joint prosthesis into a neuroforamen or injury to a nerve root.

As discussed in detail below, in a preferred embodiment of the invention, the guide pin 400 is advanced into the dysfunctional SI joint to, but no further than, the alar boundary (denoted "AB" in FIG. 1A) and shown in FIG. 9E.

As indicated above and illustrated in FIGS. 2A and 2B, the guide pin 400 comprises a plurality of graduated markings 410, which preferably are readily detectable and, hence, readable via a conventional image capture apparatus, such as a CT and fluoroscope system.

As further indicated above and illustrated in FIGS. 2A and 2B, in a preferred embodiment, the guide pin 400 markings 410 are uniformly spaced 10.0 mm apart, whereby the depth of the guide pin 400 into a dysfunctional SI joint and, hence, a SI joint structure associated therewith can be readily controlled and discerned via a conventional image capture apparatus.

In accordance with the noted embodiment of the invention, after the step of advancing the guide pin 400 into the dysfunctional SI joint, the next steps in the methods for stabilizing a dysfunctional SI joint preferably comprise the following:

the drill guide assembly 500 is assembled, i.e., the drill guide 520 is positioned in the access sleeve 502;

after the drill guide assembly 500 is assembled, the guide pin 400 is inserted into the drill guide medial lumen 526 of the drill guide assembly 500;

the drill guide assembly 500 is then advanced from a posterior approach through the incision site and positioned proximate the dysfunctional SI joint;

after the drill guide assembly 500 is advanced through the incision site and positioned proximate the dysfunctional SI joint, K-wires 509 are inserted into and through lumens 507 of the access sleeve 502 of the drill guide assembly 500 and into dysfunctional SI joint structures, e.g., SI joint soft and hard tissue, to position and stabilize the drill guide assembly 500 proximate the dysfunctional SI joint;

after the K-wires 509 are inserted into and through the lumens 507 of the access sleeve 502 of the drill guide assembly 500 and into the dysfunctional SI joint structures, the drill bit 501 is advanced though a first drill guide internal lumen, i.e., drill guide internal lumen 524a, of the drill guide 520 and into the dysfunctional SI joint;

after the drill bit 501 is advanced though a first drill guide internal lumen and into the dysfunctional SI joint, a first portion of a pilot SI joint opening is created in the dysfunctional SI joint with the drill bit 501 of the drill guide assembly 500;

after the first portion of the pilot SI joint opening is created in the dysfunctional SI joint, the drill bit 501 is retracted out of the dysfunctional SI joint and drill guide internal lumen 524a of the drill guide 520;

after the drill bit 501 is retracted out of the dysfunctional SI joint and drill guide internal lumen 524a of the drill guide 520, the drill alignment pin 530 of the drill guide assembly 500 is inserted into the first portion of the pilot SI joint opening to further stabilize the drill guide assembly 500 proximate the dysfunctional SI joint;

after the drill alignment pin 530 of the drill guide assembly 500 is inserted into the first portion of the pilot SI joint opening, the drill bit 501 is advanced though the second drill guide internal lumen, i.e., drill guide internal lumen 524b, of the drill guide 520 and into the dysfunctional SI joint;

after the drill bit 501 is advanced into the dysfunctional SI joint, a second portion of the pilot SI joint opening is then created in the dysfunctional SI joint with the with the drill bit 501 of the drill guide assembly 500;

after the second portion of the pilot SI joint opening is created in the dysfunctional SI joint, the drill bit 501 is retracted out of the dysfunctional SI joint and drill guide internal lumen 524b of the drill guide 520;

after the drill bit 501 is retracted out of the dysfunctional SI joint and drill guide internal lumen 524b of the drill guide 520, the drill alignment pin 530 is retracted out of the first portion of the pilot SI joint opening;

after the drill alignment pin 530 is retracted out of the first portion of the pilot SI joint opening, the drill guide 520 is removed from the access sleeve 502 of the drill guide assembly 500, wherein the guide pin 400 is also retracted out of the drill guide medial lumen 526;

after the drill guide 520 is removed from the access sleeve 502 of the drill guide assembly 500, the guide pin 400 is retracted out of the dysfunctional SI joint;

after the guide pin 400 is retracted out of the dysfunctional SI joint, the prosthesis deployment assembly 600 is connected to the SI joint prosthesis (in this instance SI joint prosthesis 70), wherein, as indicated above, the prosthesis guide pin 606 of the prosthesis deployment assembly 600 is inserted into the first internal prosthesis engagement member lumen 86a of the first elongated partially cylindrical section 76a of the SI joint prosthesis, i.e., SI joint prosthesis 70, and the threaded distal end 704 of the prosthesis engagement rod 700 is threaded into the second internal prosthesis engagement member lumen 86b of the second elongated partially cylindrical section 76b of the SI joint prosthesis, i.e., SI joint prosthesis 70, or, alternatively, the prosthesis guide pin 606 of the prosthesis deployment assembly 600 is inserted into the second internal prosthesis engagement member lumen 86b of the first elongated partially cylindrical section 76b of the SI joint prosthesis, i.e., SI joint prosthesis 70, and the threaded distal end 704 of the prosthesis engagement rod 700 is threaded into the first internal prosthesis engagement member lumen 86a of the first elongated partially cylindrical section 76a of the SI joint prosthesis, i.e., SI joint prosthesis 70;

after the prosthesis deployment assembly 600 is connected to the SI joint prosthesis, i.e., SI joint prosthesis 70, the SI joint prosthesis, i.e., SI joint prosthesis 70, is inserted into and through the internal opening 506 of the access sleeve 502 and advanced into the pilot SI joint opening with the prosthesis deployment assembly 600, wherein the SI joint prosthesis, i.e., SI joint prosthesis 70, is spaced from the SI joint dorsal recess (such as shown in FIG. 9G);

after the SI joint prosthesis is advanced into the pilot SI joint opening with the prosthesis deployment assembly 600, the prosthesis deployment assembly 600 is retracted out of the dysfunctional SI joint;

after the prosthesis deployment assembly 600 is retracted out of the dysfunctional SI joint, the K-wires 509 are retracted out of the dysfunctional SI joint structures and the lumens 507 of the access sleeve 502 of the drill guide assembly 500; and after the K-wires 509 are retracted out of the dysfunctional SI joint structures and the lumens 507 of the access sleeve 502 of the drill guide assembly 500, the access sleeve 502 is retracted out of the subject's body.

As indicated above, in a preferred embodiment, when the SI joint prosthesis, i.e., SI joint prosthesis 70, is advanced into the pilot SI joint opening with the prosthesis deployment assembly 600, the SI joint prosthesis, i.e., SI joint prosthesis 70, is disposed at a distance in the range of at least 2.0 mm to 6.0 mm away from the SI joint dorsal recess, more preferably, a distance of at least 3.0 mm away from the SI joint dorsal recess.

In a preferred embodiment, when the SI joint prosthesis, i.e., SI joint prosthesis 70, is advanced into the pilot SI joint opening with the prosthesis deployment assembly 600, the SI joint prosthesis, i.e., SI joint prosthesis 70, is press-fit in the pilot SI joint opening and induces a transition of the pilot SI joint opening to a larger post-prosthesis insertion SI joint opening.

In some embodiments of the invention, when the SI joint prosthesis, i.e., SI joint prosthesis 70, is press-fit into the pilot SI joint opening, the cross-sectional shape of the first portion of the pilot SI joint opening transitions to a second cross-sectional shape comprising a larger cross-sectional area, and the cross-sectional shape of the second portion of the pilot SI joint opening similarly transitions to a second cross-sectional shape comprising a larger cross-sectional area.

In a preferred embodiment, a further initial step in the minimally-invasive SI joint stabilization methods of the invention comprises the step of providing an image capture apparatus configured and adapted to capture images of at least the subject's anatomical structure, including the dysfunctional SI joint and the anatomic structure proximate thereto, and the guide pin 400 and SI joint prosthesis 70 during advancement toward and when disposed proximate to the dysfunctional SI joint.

In a preferred embodiment, the image capture apparatus comprises a CT system. However, according to the invention, further suitable image capture apparatus comprise a fluoroscope, radiography system, magnetic resonance imaging system, and an ultrasound system.

In a preferred embodiment, after the step of providing the image capture apparatus, and before the step of making an incision in and through tissue of the subject, a further step in the minimally-invasive SI joint stabilization methods comprises capturing images of the subject's anatomical structure with the image capture apparatus to properly align the patient on the surgical table. According to the invention, standard or classic lateral images via CT scans can be employed to ensure proper alignment, i.e., a true prone position, of the patient.

After the step of ensuring proper alignment of the patient, a further initial step in the minimally-invasive SI joint stabilization methods of the invention comprises determining key SI joint landmarks, e.g., dogleg, dorsal recess, etc., preferably, via CT scans, to establish at least a sagittal line, incision (or skin entry) site, and guide pin trajectory and, thereby, prosthesis trajectory into the dysfunctional SI joint.

Since the SI joint comprises a unique shape and does not align with the axis of the spine (i.e., the plane of the SI joint defined by the region between the sacrum and the ilium is not aligned with (or parallel with) the sagittal plane or anteroposterior axis of the spine), as discussed in detail below, in a preferred embodiment, modified anteroposterior (AP) views or images of at least the subject's dysfunctional SI joint, and the guide pin 400 and SI joint prosthesis when deployed in the subject's body are acquired via CT scans.

As discussed above, advancement of the guide pin into the dysfunctional SI joint is a critical step in the methods for stabilizing a dysfunctional SI joint. The guide pin 400 ensures (i) proper trajectory of the drill guide assembly and creation of the pilot SI joint opening, e.g., pilot SI joint opening 100, by the drill guide assembly 500, (ii) proper trajectory of the prosthesis deployment assembly 600 and, hence, SI joint prosthesis engaged thereto to and into the pilot SI joint opening created by the drill guide assembly 500 and, thereby, accurate and optimal placement of the SI joint prosthesis in the dysfunctional SI joint.

In a preferred embodiment, during the step of advancing the guide pin 400 into the dysfunctional SI joint, a further step in the minimally-invasive SI joint stabilization methods thus comprises capturing images of the guide pin 400 with the image capture apparatus to ensure proper trajectory and placement of the guide pin 400 proximate the dysfunctional SI joint.

As indicated above, since the SI joint comprises a unique shape and does not align with the axis of the spine, in a preferred embodiment, a series modified (or angled) anteroposterior (AP) images of the guide pin 400 and dysfunctional SI joint (and, if necessary, surrounding structures) during advancement of the guide pin 400 toward and, particularly, when disposed proximate to and in the dysfunctional SI joint are preferably acquired via CT scans to ensure proper trajectory and placement of the guide pin 400 proximate the dysfunctional SI joint.

Referring first to FIG. 9A there is shown a conventional AP view image of a dysfunctional SI joint. As illustrated in FIG. 9A the SI joints (denoted "$SIJ_1$" and "$SIJ_2$"), including the dysfunctional SI joint on the left side ("$SIJ_2$"), are represented by multiple non-linear lines, which reflect mis-alignment of the imaged SI joints ("$SIJ_1$" and "$SIJ_2$"). The mis-alignment of the imaged SI joints ("$SIJ_1$" and "$SIJ_2$") in the conventional AP view image makes properly aligning the guide pin 400 in a SI joint, i.e., "$SIJ_1$" or "$SIJ_2$", very difficult. Indeed, one must guess the advancement trajectory of the guide pin 400.

Referring now to FIG. 9B, there is shown a CT scan image showing a modified AP view of the left, i.e., dysfunctional, SI joint ("$SIJ_2$"). As illustrated in FIG. 9B, the dysfunctional SI joint ("$SIJ_2$") is now shown and, hence, represented by a substantially straight line indicating substantial alignment of the imaged dysfunctional SI joint ("$SIJ_2$").

The modified AP view of the dysfunctional SI joint ("$SIJ_2$") shown in FIG. 9B facilitates accurate advancement, trajectory and positioning of the guide pin 400 in the dysfunctional SI joint ("$SIJ_2$"), as shown in the tangent lateral and trajectory inlet views shown in FIGS. 9C and 9D, respectively.

As indicated above, in a preferred embodiment, the guide pin 400 is advanced into the dysfunctional SI joint to, but no further than, the alar boundary (denoted "AB" in FIGS. 1A, 9C and 9E).

A CT scan image showing a tangent lateral view of the dysfunctional SI joint ("$SIJ_2$") also facilitates accurate advancement and, hence, depth of the guide pin 400 in the dysfunctional SI joint ("$SIJ_2$"), as shown in FIG. 9C.

In a preferred embodiment, during the step of advancing the SI joint prosthesis into the pilot SI joint opening with the prosthesis deployment assembly 600, a further step in the minimally-invasive SI joint stabilization methods comprises capturing images of the SI joint prosthesis with the image capture apparatus to ensure proper placement of the SI joint prosthesis in the dysfunctional SI joint.

Figure 9H:
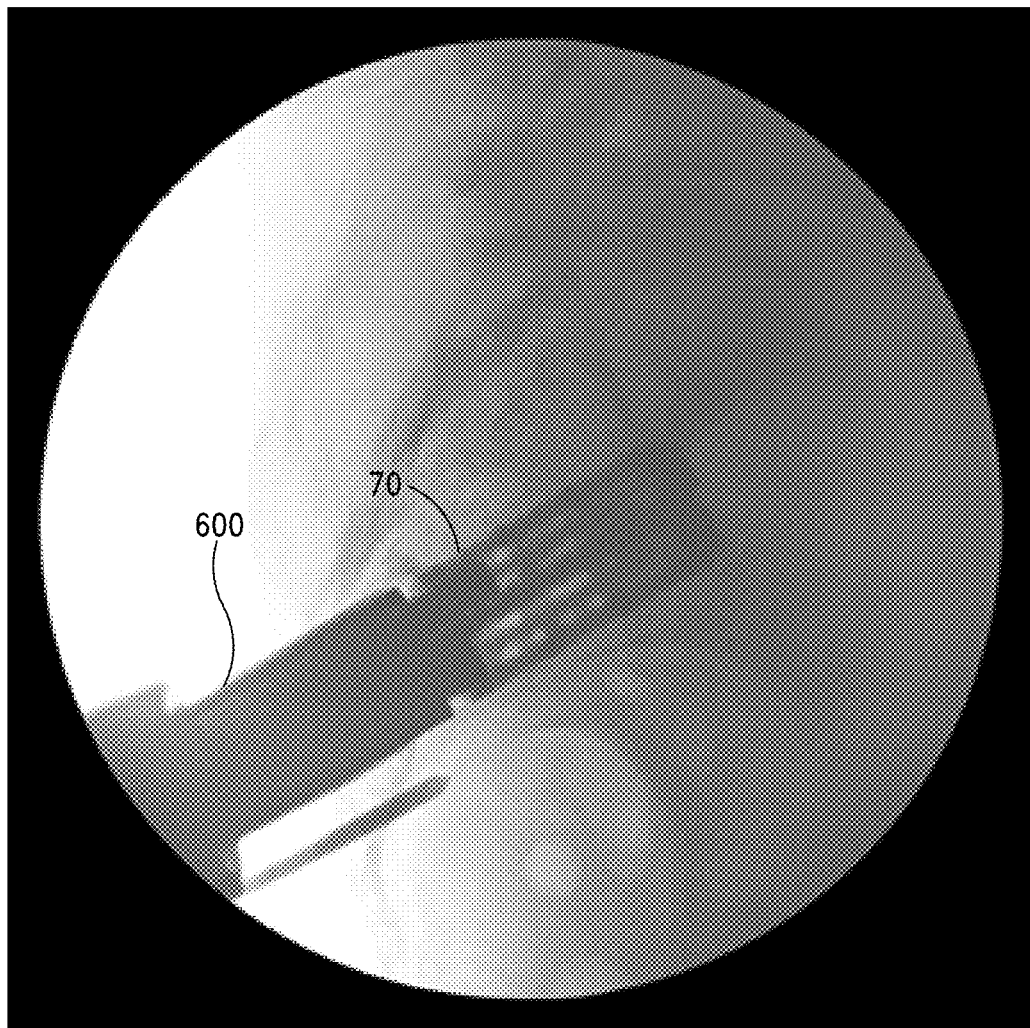
FIG. 9H is a CT scan image showing a lateral view of the prosthesis deployment assembly with a SI joint prosthesis engaged thereto disposed proximate a dysfunctional SI joint, in accordance with the invention.

In a preferred embodiment, CT scan images showing lateral views of the drill guide assembly 500; particularly, the access sleeve 502, K-wires 509 and drill bit 501, and the prosthesis deployment assembly 600 during advancement of the drill guide assembly 500 and prosthesis deployment assembly 600 toward and, particularly, when disposed proximate to the dysfunctional SI joint are acquired to ensure proper trajectory of the drill guide assembly 500; particularly, the access sleeve 502, K-wires 509 and drill bit 501, and the prosthesis deployment assembly 600, such as shown in FIGS. 9F, 9G and 9H.

Figure 9I:
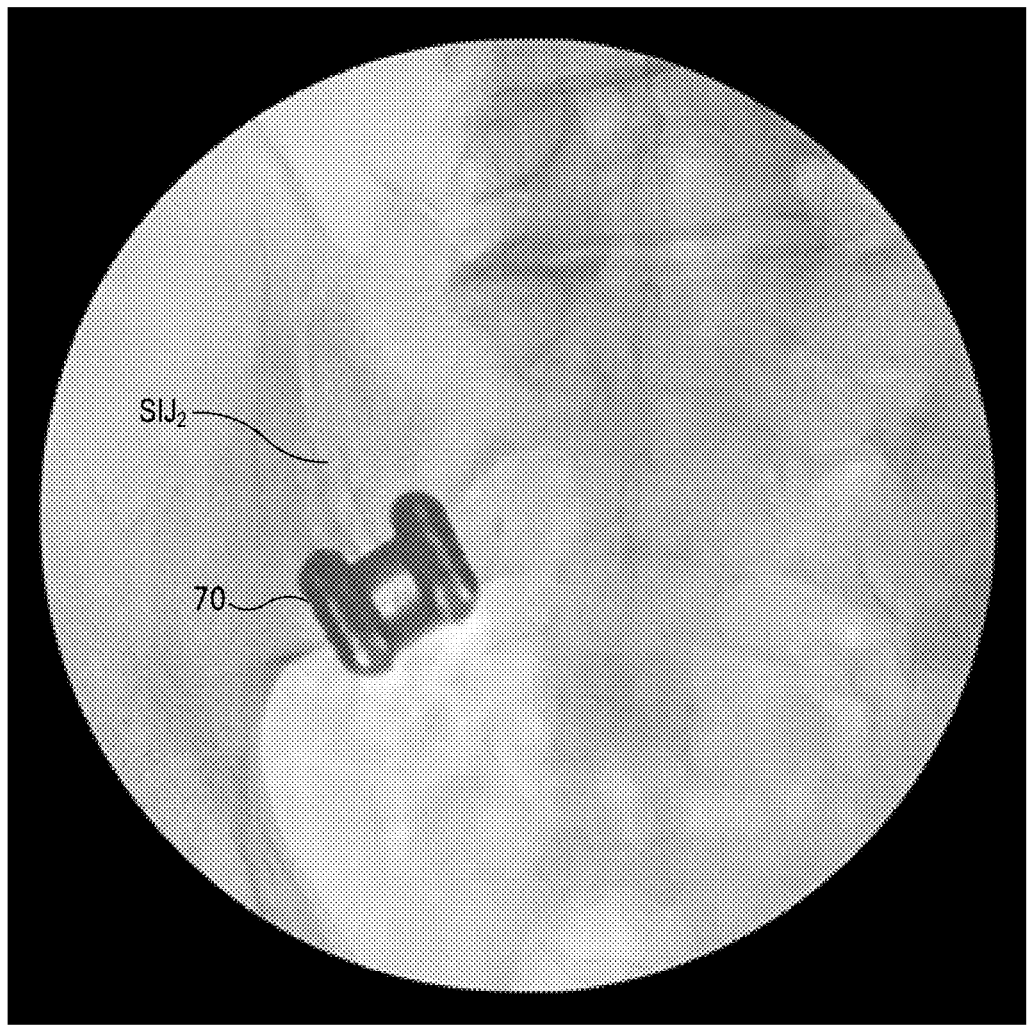
FIG. 9I is a CT scan image showing a modified AP view of the dysfunctional SI joint shown in FIG. 9B, showing a SI joint prosthesis properly positioned therein, in accordance with the invention.
Figure 9J:
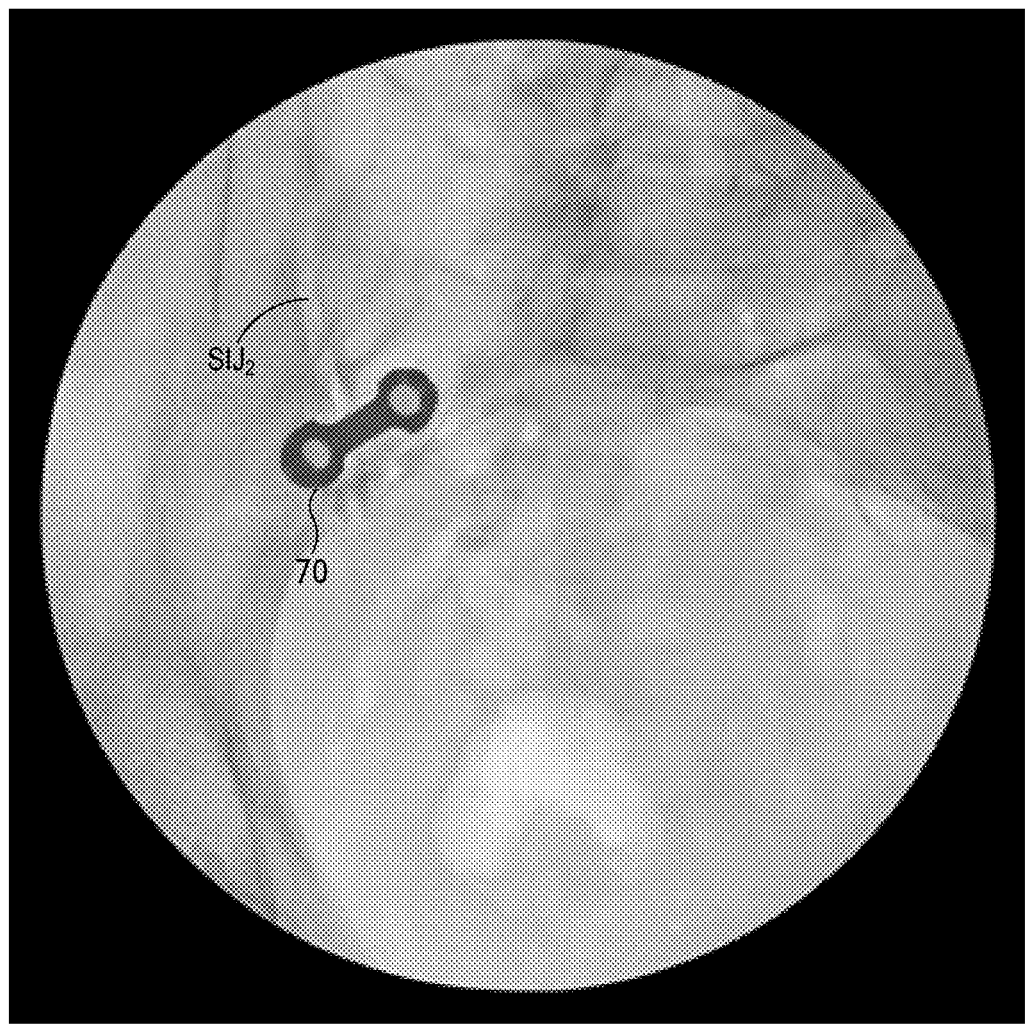
FIG. 9J is a CT scan image showing a trajectory inlet view of the dysfunctional SI joint shown in FIG. 9B, showing a SI joint prosthesis properly positioned therein, in accordance with the invention.

In a preferred embodiment, CT scan images showing modified AP and/or trajectory inlet views of the SI joint prosthesis and dysfunctional SI joint (and, if necessary, surrounding structures) during advancement of the SI joint prosthesis toward and, particularly, when disposed proximate to and in the dysfunctional SI joint are also acquired to ensure proper trajectory and placement of the SI joint prosthesis in the dysfunctional SI joint, such as shown in FIGS. 9I and 9J.

In some embodiments, after the step of creating the pilot SI joint opening with the drill guide assembly 500, the methods for stabilizing a dysfunctional SI joint further comprise the step of collecting the dislodged bone material, e.g., cortical bone, trabecular bone and bone marrow for subsequent use in a biologically active composition of the invention.

In some embodiments of the invention, after the step of retracting the prosthesis deployment assembly 600 out of the dysfunctional SI joint, the minimally-invasive SI joint stabilization methods further comprise the step of placing an osteogenic composition or at least one of the aforementioned biologically active agents and/or one of the aforementioned pharmacological agents in one or both of the internal prosthesis engagement member lumens of the SI joint prosthesis, i.e., internal prosthesis engagement member lumens 86a, 86b of SI joint prosthesis 70, whereby the osteogenic composition or biologically active agent or pharmacological agent is dispersed through the slots 90 and holes 92 of the SI joint prosthesis 70 and administered to the osseous tissue of the SI joint bone structures, i.e., sacrum and ilium bone structures, when the SI joint prosthesis 70 is positioned therein.

In some embodiments, the osteogenic composition comprises a demineralized bone matrix, autograft bone material, allograft bone material, xenograft bone material, polymethyl-methacrylate or calcium-based bone material.

In some embodiments, the osteogenic composition comprises a bone morphogenic protein (BMP).

In some embodiments, the BMP comprises BMP-1, BMP2a, BMP2b, BMP3, BMP4, BMP5, BMP6, BMP7 or BMP8a.

In some embodiments, the biologically active agent comprises a basic fibroblast growth factor (bFGF), a transforming growth factor-β (TGF-β), a vascular endothelial growth factor (VEGF), a platelet derived growth factor (PDGF), an insulin-like growth factor (IGF), an epidermal growth factor (EGF) or a differentiation factor-5 (GDF-5).

In some embodiments, the pharmacological agent comprises one of the aforementioned antibiotics.

In some embodiments, the antibiotic comprises penicillin, a carboxypenicillin, a tetracycline, gentamicin, vancomycin, ciprofloxacin, amikacin, an aminoglycoside, a cephalosporin, clindamycin, erythromycin, a fluoroquinolone, a macrolide, an azolide, metronidazole, trimethoprim-sulfamethoxazole, polymyxin B, oxytetracycline, tobramycin, cefazolin or rifampin.

In some embodiments, the pharmacological agent comprises one of the aforementioned anti-inflammatories.

In some embodiments the anti-inflammatory comprises dexamethasone, betamethasone, prednisone, prednisolone, methylprednisolone sodium succinate, methylprednisolone, cortisone, ketorolac, diclofenac or ibuprofen.

Examples

The following example is provided to enable those skilled in the art to more clearly understand and practice the present invention. The example should not be considered as limiting the scope of the invention, but merely as being illustrated as representative thereof.

An adult male, age 42 presented with a traumatic injury proximate the SI joint, resulting in a dysfunctional SI joint and significant pain associated therewith, i.e., a visual analog pain score (VAS) of approximately 8.0.

CT scans were initially performed to determine the full extent of the patient's injury, check for any SI joint abnormalities, and plan the SI joint stabilization procedure, including determining the incision site, guide pin trajectory, and SI joint prosthesis required to stabilize the dysfunctional SI joint.

Before proceeding with the SI joint stabilization procedure, CT scans were also performed to ensure proper alignment of the patient on the surgical table.

The SI joint stabilization procedure was performed in accord with the method that includes the drill guide assembly 500 summarized above. The specifics of the procedure were as follows:

SI Joint Prosthesis

The SI joint prosthesis selected and, hence, provided for the stabilization procedure comprised SI joint prosthesis 70 illustrated in FIGS. 6A-6H and described in detail above. The SI joint prosthesis comprised a length of 30 mm and the elongated partially cylindrical sections, i.e., barrels, of the SI joint prosthesis comprised a diameter of 7.5 mm. The SI joint prosthesis was sourced from Applicant, i.e., Tenon Medical, Inc., and referred to as a CATAMARAN SIJ Fixation System®.

The SI joint prosthesis included an autograft bone material, which was placed in the barrels of the SI joint prosthesis after the prosthesis was implanted in the dysfunctional SI joint.

Posterior Inferior Surgical Approach

The initial incision was placed along the lateral lip of the posterior third of the iliac crest to the posterior superior spine, which provided a prosthesis entry point into the dysfunctional SI joint through the posterior ligaments at approximately the S3 level. The trajectory of the SI joint prosthesis was toward the mid-point of the S1 end plate and the sacral promontory.

Creation of Pilot SI Joint Opening

The pilot SI joint opening was created with the drill guide assembly 500 shown in FIGS. 3A-3L, and described above.

The pilot SI joint opening, which was similar to pilot SI joint opening 200 described above, was created by drilling a first opening in the sacrum bone structure and a second opening in the ilium bone structure (such as shown in FIG. 4B) with the drill guide assembly 500.

Radiological Assessment

Figure 10A:
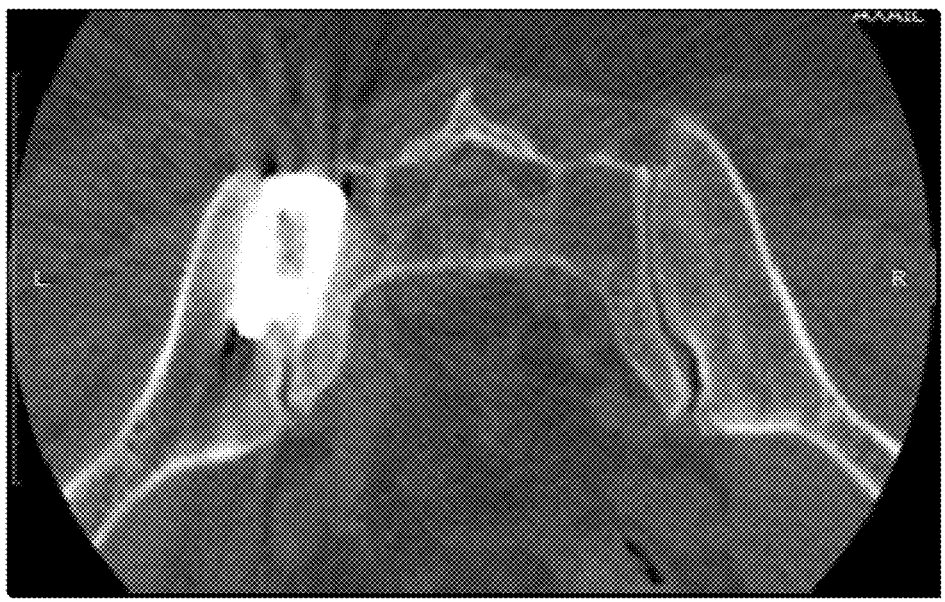
FIGS. 10A and 10B are CT scan images of a patient's SI joint at six (6) months following an SI joint stabilization procedure with the prosthesis shown in FIG. 6A, in accordance with the invention.
Figure 10B:
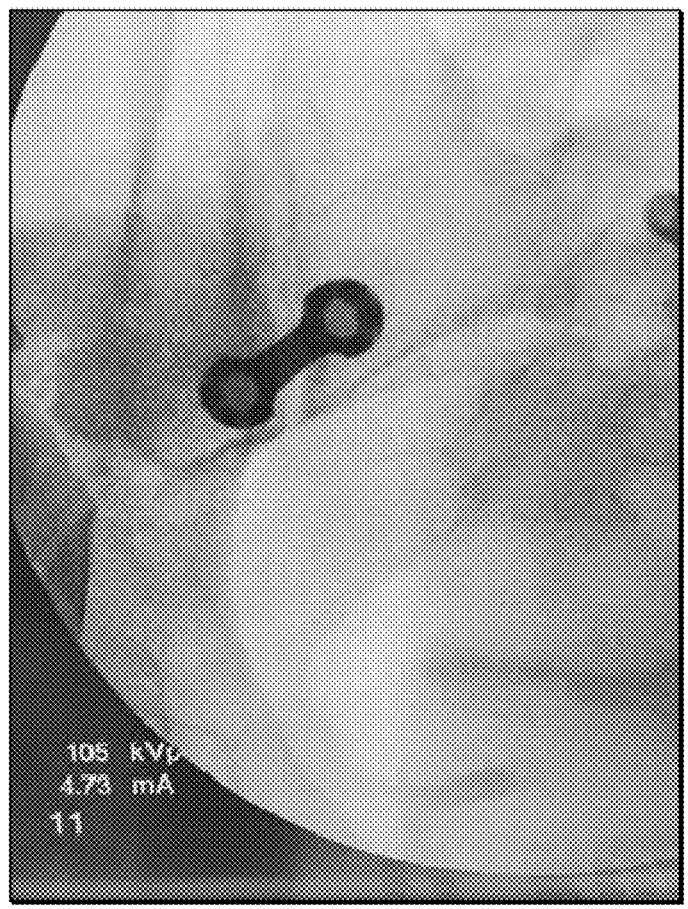

CT scan images of the patient's SI joint six (6) months after the SI joint stabilization procedure, which are shown in FIGS. 10A and 10B, reflect (i) secure and proper placement of the SI joint prosthesis in the SI joint, (ii) substantial solid bridging of osseous tissue, and, hence, bone across the SI joint and, (iii) substantial ossification around the SI joint prosthesis.

Post-Procedure SI Joint Pain Relief and Function

Figure 11:
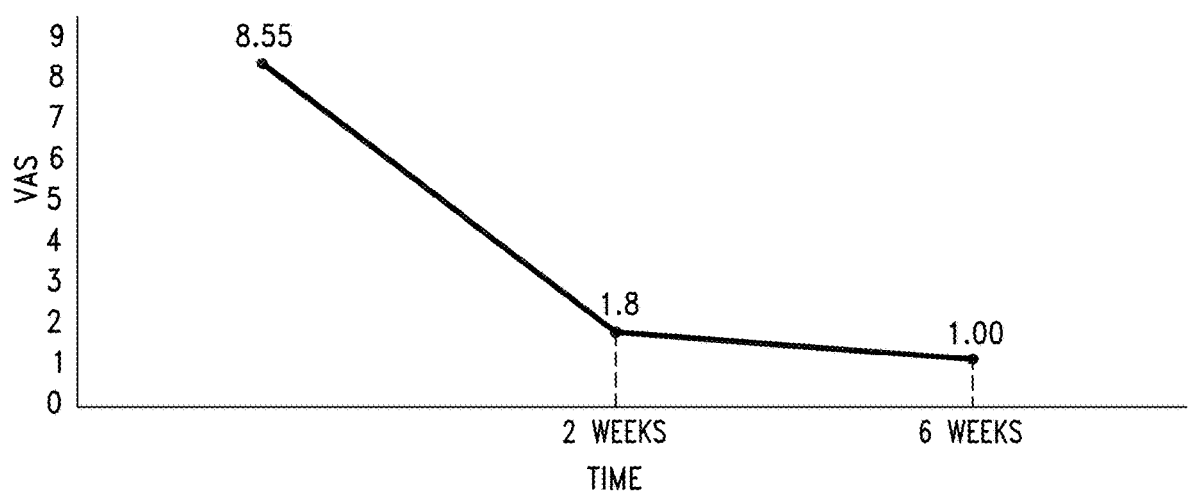
FIG. 11 is a graphical illustration of a patient's visual analog pain score over a six (6) week period of time following an SI joint stabilization procedure with the prosthesis shown in FIG. 6A, in accordance with the invention.

After a recovery period of fourteen (14) days, the patient reported that the pain had been substantially reduced. Indeed, as shown in FIG. 11, fourteen (14) days after the procedure a visual analog pain score (VAS) of 1.8 was achieved.

The patient was also subjected to a series of post procedure tests to determine the stability of the SI joint and mobility of the musculoskeletal structures of the pelvic and lumbar regions proximate the SI joint. The results were very favorable. The patient tested positive to the flexion abduction and external rotation (FABER) test. The patient also responded very favorably to Gaenslen, thigh thrust, compression and distraction tests.

The tests thus confirmed that the post procedure SI joint was stabilized and that the musculoskeletal structures of the pelvic and lumbar regions proximate thereto were restored to a near normal level.

As will readily be appreciated by one having ordinary skill in the art, the present invention provides numerous advantages compared to prior art methods for stabilizing dysfunctional SI joints. Among the advantages are the following:

the provision of improved minimally-invasive SI joint stabilization methods and associated systems and apparatus, which facilitate posterior trajectory placement of SI joint prostheses in dysfunctional SI joints and, thereby, stabilization of the dysfunctional SI joints;

the provision of improved minimally-invasive SI joint stabilization methods that disrupt less tissue and muscles, and avoid nerves and large blood vessels;

the provision of improved minimally-invasive SI joint stabilization methods and associated systems and apparatus, which effectively ameliorate pain associated with SI joint dysfunction;

the provision of improved SI joint prostheses, which can readily be employed in minimally-invasive SI joint stabilization methods and possess optimal structural properties to effectively stabilize dysfunctional SI joints; and the provision of improved SI joint prostheses that can readily be employed in minimally-invasive SI joint stabilization methods, which facilitate remodeling of damaged osseous tissue and regeneration of new osseous tissue and osseous tissue structures.

Without departing from the spirit and scope of this invention, one of ordinary skill can make various changes and modifications to the invention to adapt it to various usages and conditions. As such, these changes and modifications are properly, equitably, and intended to be, within the full range of equivalence of the following claims.

What is claimed is:

1. A method for stabilizing a dysfunctional sacroiliac (SI) joint of a subject, said subject comprising an anatomical structure, said dysfunctional SI joint comprising a dorsal recess, said method comprising the steps of:

a. providing a tool assembly adapted to access said dysfunctional SI joint via a posterior approach, said dysfunctional SI joint being disposed between and defined by a sacrum bone structure and an ilium bone structure, said tool assembly comprising a guide pin configured and adapted to be positioned in said dysfunctional SI joint and a drill guide assembly, said drill guide assembly adapted to create a pilot SI joint opening in said dysfunctional SI joint, said drill guide assembly comprising a guide member lumen that extends through said drill guide assembly, said guide member lumen adapted to receive said guide pin therein, said drill guide assembly further comprising a bone dislodging member comprising a longitudinal axis, said bone dislodging member adapted to dislodge portions of bone in said dysfunctional SI joint, said pilot SI joint opening comprising a first portion disposed in said sacrum bone structure and comprising a first sacrum opening cross-sectional shape and a second portion disposed in said ilium bone structure and comprising a first ilium opening cross-sectional shape, said pilot SI joint opening further comprising a cross-sectional shape in a plane that intersects said sacrum bone structure and said ilium bone structure, said plane being substantially perpendicular to said longitudinal axis of said bone dislodging member when said bone dislodging member is disposed in a pilot SI joint opening creation position in said dysfunctional SI joint;

b. providing a prosthesis deployment assembly, said prosthesis deployment assembly comprising an elongated guide member and a prosthesis engagement rod, said prosthesis engagement rod comprising a threaded distal end, said elongated guide member comprising a guide member proximal end and a guide member distal end disposed opposite said guide member proximal end, said elongated guide member further comprising a prosthesis guide pin that extends from said guide member distal end, said elongated guide member further comprising a prosthesis engagement rod lumen adapted to receive said prosthesis engagement rod therein;

c. providing a SI joint prosthesis configured and adapted to be inserted into said pilot SI joint opening created by said drill guide assembly, said SI joint prosthesis comprising first and second elongated partially cylindrical sections connected to a bridge section, whereby said SI joint prosthesis comprises a continuous exterior surface comprising first and second partially cylindrical surface regions, said first partially cylindrical surface region comprising a first partially cylindrical surface region shape that corresponds to at least a first portion of said first sacrum opening cross-sectional shape, said second partially cylindrical surface region comprising a second partially cylindrical surface region shape that corresponds to at least a first portion of said first ilium opening cross-sectional shape, said bridge section comprising a bridge section proximal end and a bridge section distal end disposed opposite said bridge section proximal end, said bridge section distal end comprising a first tapered region configured and adapted to disrupt at least articular cartilage and cortical bone, said first elongated partially cylindrical section of said SI joint prosthesis comprising a first internal prosthesis engagement member lumen extending from said prosthesis proximal end, said first internal prosthesis engagement member lumen comprising a first threaded surface region, said second elongated partially cylindrical section of said SI joint prosthesis comprising a second internal prosthesis engagement member lumen extending from said prosthesis proximal end, said second internal prosthesis engagement member lumen comprising a second threaded surface region, said first and second internal prosthesis engagement member lumens adapted to receive said prosthesis guide pin and prosthesis engagement rod of said prosthesis deployment assembly therein, said SI joint prosthesis further comprising a first plurality of slots, a second plurality of said first plurality of slots being in communication with said first internal prosthesis engagement member lumen and a third plurality of said first plurality of slots being in communication with said second internal prosthesis engagement member lumen, said SI joint prosthesis being sized and adapted to be inserted into said pilot SI joint opening;

d. making an incision in and through tissue at an incision site on said subject to provide posterior access to said subject's dysfunctional SI joint;

e. advancing said guide pin of said tool assembly from a posterior approach in and through said incision and into said dysfunctional SI joint, wherein said guide pin is positioned in said dysfunctional SI joint at an angle in the range of 25°-35° relative to a cephalocaudal axis of said subject;

f. assembling a drill guide assembly, wherein said drill guide is positioned in an access sleeve of said drill guide assembly;

g. inserting said guide pin of said tool assembly into said drill guide assembly;

h. advancing said drill guide assembly along said guide pin into said dysfunctional SI joint;

i. creating said pilot SI joint opening with said drill guide assembly;

j retracting said drill guide from said access sleeve of said drill guide assembly, wherein said guide pin is also retracted out of said tool assembly;

k. retracting said drill guide from said dysfunctional SI joint;

l. connecting said SI joint prosthesis to said prosthesis deployment assembly, wherein said prosthesis guide pin is inserted into said first internal prosthesis engagement member lumen of said first elongated partially cylindrical section of said SI joint prosthesis and said threaded distal end of said prosthesis engagement rod is threaded into said second internal prosthesis engagement member lumen of said second elongated partially cylindrical section of said SI joint prosthesis;

m. advancing said SI joint prosthesis into said pilot SI joint opening with said prosthesis deployment assembly, wherein said SI joint prosthesis is disposed in said dysfunctional SI joint at least 3.0 mm away from said SI joint dorsal recess;

n. retracting said prosthesis deployment assembly out of said dysfunctional SI joint; and o. retracting said access sleeve of said drill guide assembly out of said dysfunctional SI joint and out of said subject's body.

2. The method of claim 1, wherein said bone dislodging member comprises a drill bit.

3. The method of claim 2, wherein said drill guide assembly further comprises a drill alignment pin and said step of creating said pilot SI joint opening with said drill guide assembly comprises advancing said drill bit though a first drill guide internal lumen of said drill guide and into said dysfunctional SI joint, creating a first portion of said pilot SI joint opening with said drill bit, retracting said drill bit out of said dysfunctional SI joint and said first drill guide internal lumen of said drill guide, inserting said drill alignment pin of said drill guide assembly in said first drill guide internal lumen of said drill guide and into said first portion of said pilot SI joint opening created with said drill bit, advancing said drill bit though a second drill guide internal lumen of said drill guide and into said dysfunctional SI joint, creating a second portion of said pilot SI joint opening in said dysfunctional SI joint with said drill bit of said drill guide assembly.

4. The method of claim 3, wherein prior to said step of retracting said access sleeve of said drill guide assembly out of said dysfunctional SI joint and out of said subject's body, said method further comprises the steps of retracting said drill bit out of said dysfunctional SI joint and said second drill guide internal lumen of said drill guide and retracting said drill alignment pin of said drill guide assembly out of said first portion of said pilot SI joint opening created with said drill bit and said first drill guide internal lumen of said drill guide.

5. The method of claim 1, wherein, when said SI joint prosthesis is said advanced into said pilot SI joint opening with said prosthesis deployment assembly, said SI joint prosthesis is press-fit into said pilot SI joint opening and said first sacrum opening cross-sectional shape transitions to a second sacrum opening cross-sectional shape comprising a larger cross-sectional area, and said first ilium opening cross-sectional shape transitions to a second ilium opening cross-sectional shape comprising a larger cross-sectional area.

6. The method of claim 1, wherein said step of connecting said prosthesis to said prosthesis deployment assembly comprises inserting said prosthesis guide pin into said second internal prosthesis engagement member lumen of said second elongated partially cylindrical section of said prosthesis and said threaded distal end of said prosthesis engagement rod is threaded into said first internal prosthesis engagement member lumen of said first elongated partially cylindrical section of said prosthesis.

7. The method of claim 1, wherein said method further comprises the step of providing an image capture apparatus adapted to at least capture a first plurality of images of said anatomical structure of said subject, a third plurality of images of said guide pin when disposed in said subject, a fourth plurality of images of said drill guide assembly when disposed in said subject, and a fifth plurality of images of said SI joint prosthesis when disposed in said subject.

8. The method of claim 7, wherein said image capture apparatus comprises a computed tomography (CT) system.

9. The method of claim 8, wherein said method further comprises the step of capturing said first plurality of images of said anatomical structure of said subject with said image capture apparatus before said step of making an incision in and through said tissue of said subject, said anatomical structure of said subject comprising said dysfunctional SI joint.

10. The method of claim 9, wherein said method further comprises the step of determining at least one anatomical feature of said dysfunctional SI joint of said subject with said first plurality of images.

11. The method of claim 9, wherein said first plurality of images of said anatomical structure of said subject comprise a second plurality of images of said anatomical structure when said subject is lying on a surgical table, and, wherein, before said step of making an incision in and through said tissue of said subject, said method further comprises the step of positioning said subject on said surgical table based on said second plurality of images.

12. The method of claim 8, wherein said method further comprises the step of capturing said third plurality of images of said guide pin with said image capture apparatus during said step of advancing said guide pin into said dysfunctional SI joint of said subject.

13. The method of claim 12, wherein said method further comprises the steps of determining at least a first trajectory of said guide pin toward said dysfunctional SI joint, determining at least a first position of said guide pin when said guide pin is positioned proximate said dysfunctional SI joint, and determining at least a first orientation of said guide pin with respect to said dysfunctional SI joint when said guide pin is positioned in said dysfunctional SI joint with said third plurality of images of said guide pin.

14. The method of claim 12, wherein said third plurality of images of said guide pin comprise modified anteroposterior (AP) views of said guide pin and said anatomical structure of said subject.

15. The method of claim 8, wherein said method further comprises the step of capturing said fourth plurality of images of said drill guide assembly with said image capture apparatus during said step of advancing said drill guide assembly into said dysfunctional SI joint of said subject.

16. The method of claim 15, wherein said method further comprises the steps of determining at least a first position of said drill guide assembly with respect to said dysfunctional SI joint and determining at least a first orientation of said drill guide assembly with respect to said dysfunctional SI joint with said fourth plurality of images of said drill guide assembly.

17. The method of claim 8, wherein said method further comprises the step of capturing said fifth plurality of images of said SI joint prosthesis with said image capture apparatus during said step of advancing said SI joint prosthesis into said pilot SI joint opening of said dysfunctional joint with said prosthesis deployment assembly.

18. The method of claim 17, wherein said method further comprises the steps of determining at least a first trajectory of said SI joint prosthesis toward said dysfunctional SI joint, determining at least a first position of said SI joint prosthesis with respect to said dysfunctional SI joint, determining at least a first orientation of said SI joint prosthesis with respect to said dysfunctional SI joint when said SI joint prosthesis is disposed proximate said dysfunctional SI joint, and determining at least a second orientation of said SI joint prosthesis when said SI joint prosthesis is disposed in said dysfunctional SI joint with said fifth plurality of images of said SI joint prosthesis.

19. The method of claim 1, wherein said first elongated partially cylindrical section comprises a first elongated partially cylindrical section proximal end and a first elongated partially cylindrical section distal end disposed opposite said first elongated partially cylindrical section proximal end and proximate said prosthesis distal end.

20. The method of claim 19, wherein said first elongated partially cylindrical section distal end comprises a second tapered region.

21. The method of claim 1, wherein said second elongated partially cylindrical section comprises a second elongated partially cylindrical section proximal end and a second elongated partially cylindrical section distal end disposed opposite said second elongated partially cylindrical section proximal end and proximate said prosthesis distal end.

22. The method of claim 21, wherein said second elongated partially cylindrical section distal end comprises a third tapered region.

23. The method of claim 1, wherein said method further comprises the step of inserting an osteogenic composition in said first and second internal prosthesis engagement member lumens of said SI joint prosthesis after said step of retracting said prosthesis deployment assembly out of said dysfunctional SI joint.

24. The method of claim 23, wherein said osteogenic composition is selected from the group consisting of demineralized bone matrix, autograft bone material, allograft bone material, xenograft bone material, polymethyl-methacrylate, calcium-based bone recess filler material, including hydroxyapatite (HA), and tricalcium phosphate.

25. The method of claim 1, wherein said method further comprises the step of inserting a biologically active agent in said first and second internal prosthesis engagement member lumens of said SI joint prosthesis after said step of retracting said prosthesis deployment assembly out of said dysfunctional SI joint.

26. The method of claim 25, wherein said biologically active agent comprises a bone morphogenic protein (BMP) selected from the group consisting of BMP-1, BMP2a, BMP2b, BMP3, BMP4, BMP5, BMP6, BMP7, and BMP8a.

27. The method of claim 25, wherein said biologically active agent comprises a growth factor selected from the group consisting of a platelet derived growth factor (PDGF), an insulin-like growth factor (IGF), a basic fibroblast growth factor (bFGF), a transforming growth factor-β (TGF-62), a transforming growth factor-α(TGF-α), an epidermal growth factor (EGF), a growth and differentiation factor-5 (GDF-5), and a vascular endothelial growth factor (VEGF).

28. The method of claim 25, wherein said biologically active composition comprises a biologically active agent selected from the group consisting of an angiogenin, angiopoietin-1, del-1, follistatin, granulocyte colony-stimulating factor (G-CSF), hepatocyte growth factor/scatter factor (HGF/SF), interleukin-8 (IL-8), interleukin-10 (IL-10), leptin, midkine, placental growth factor, platelet-derived endothelial cell growth factor (PD-ECGF), platelet-derived growth factor-BB (PDGF-BB), pleiotrophin (PTN), progranulin, proliferin, a matrix metalloproteinase (MMP), angiopoietin 1 (ang1), angiopoietin 2 (ang2), and delta-like ligand 4 (DLL4).

29. The method of claim 1, wherein said method further comprises the step of inserting a pharmacological agent in said first and second internal prosthesis engagement member lumens of said SI joint prosthesis after said step of retracting said prosthesis deployment assembly out of said dysfunctional SI joint.

30. The method of claim 29, wherein said pharmacological agent comprises an antibiotic selected from the group consisting of penicillin, a carboxypenicillin, a tetracycline, gentamicin, vancomycin, ciprofloxacin, amikacin, an aminoglycoside, a cephalosporin, clindamycin, erythromycin, a fluoroquinolone, a macrolide, an azolide, metronidazole, trimethoprim-sulfamethoxazole, polymyxin B, oxytetracycline, tobramycin, cefazolin, and rifampin.

31. The method of claim 29, wherein said pharmacological agent comprises an anti-inflammatory selected from the group consisting of dexamethasone, betamethasone, prednisone, prednisolone, methylprednisolone sodium succinate, methylprednisolone, cortisone, ketorolac, diclofenac, and ibuprofen.

32. The method of claim 1, wherein said prosthesis further comprises an outer coating comprising a poly(glycerol sebacate) (PGS) based composition.

33. The method of claim 32, wherein said PGS based composition comprises PGS and an antibiotic selected from the group consisting of penicillin, a carboxypenicillin, a tetracycline, gentamicin, vancomycin, ciprofloxacin, amikacin, an aminoglycoside, a cephalosporin, clindamycin, erythromycin, a fluoroquinolone, a macrolide, an azolide, metronidazole, trimethoprim-sulfamethoxazole, polymyxin B, oxytetracycline, tobramycin, cefazolin, and rifampin.

34. The method of claim 32, wherein said PGS based composition comprises PGS and an anti-inflammatory selected from the group consisting of dexamethasone, betamethasone, prednisone, prednisolone, methylprednisolone sodium succinate, methylprednisolone, cortisone, ketorolac, diclofenac, and ibuprofen.

* * * * *

UNITED STATES PATENT AND TRADEMARK OFFICE
CERTIFICATE OF CORRECTION

| | | |
|---|---|---|
| PATENT NO. | : 12,472,069 B2 | Page 1 of 1 |
| APPLICATION NO. | : 17/740568 | |
| DATED | : November 18, 2025 | |
| INVENTOR(S) | : Richard S Ginn | |

It is certified that error appears in the above-identified patent and that said Letters Patent is hereby corrected as shown below:

In the Claims

Column 40, Line 35 (Claim 27):
"transforming growth factor-β (TGF-62 )" should recite --transforming growth factor-β (TGF-β)--.

Signed and Sealed this
Twenty-third Day of December, 2025

John A. Squires
*Director of the United States Patent and Trademark Office*